United States Patent
Han et al.

(10) Patent No.: US 12,386,428 B2
(45) Date of Patent: Aug. 12, 2025

(54) USER INTERFACES FOR DEVICE CONTROLS

(71) Applicant: Apple Inc., Cupertino, CA (US)

(72) Inventors: Yoonju Han, San Francisco, CA (US); Joanna Arreaza-Taylor, Seattle, WA (US); Hannah G. Coleman, Albuquerque, NM (US); Elizabeth C. Cranfill, San Francisco, CA (US); Christopher B. Fleizach, Gilroy, CA (US); Charles Maalouf, Seattle, WA (US); Tu K. Nguyen, Fountain Valley, CA (US); Jennifer D. Patton, Cupertino, CA (US); James N. Cartwright, Campbell, CA (US); Jeremiah R. Johnson, Costa Mesa, CA (US); Ibrahim Yusuf, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/197,681

(22) Filed: May 15, 2023

(65) Prior Publication Data

US 2023/0376193 A1 Nov. 23, 2023

Related U.S. Application Data

(60) Provisional application No. 63/343,076, filed on May 17, 2022.

(51) Int. Cl.
*G06F 3/01* (2006.01)
*G06F 1/16* (2006.01)
(Continued)

(52) U.S. Cl.
CPC ............. *G06F 3/017* (2013.01); *G06F 1/163* (2013.01); *G06F 3/0482* (2013.01);
(Continued)

(58) Field of Classification Search
CPC ........ G06F 3/017; G06F 1/163; G06F 3/0482; G06F 3/0485; G06F 3/04883; G06F 3/14;
(Continued)

(56) References Cited

U.S. PATENT DOCUMENTS

| 4,803,487 A | 2/1989 | Willard et al. |
| 5,483,261 A | 1/1996 | Yasutake |

(Continued)

FOREIGN PATENT DOCUMENTS

| AU | 2015101019 A4 | 9/2015 |
| CN | 1556955 A | 12/2004 |

(Continued)

OTHER PUBLICATIONS

Accessibility by design: An Apple Watch for everyone, Available Online at: https://developer.apple.com/videos/play/wwdc2021/10308/, Jun. 10, 2021, 2 pages.

(Continued)

*Primary Examiner* — Michael J Jansen, II
(74) *Attorney, Agent, or Firm* — DLA Piper LLP (US)

(57) ABSTRACT

The present disclosure generally relates to displaying user interfaces with device controls.

60 Claims, 26 Drawing Sheets

(51) Int. Cl.
*G06F 3/0362* (2013.01)
*G06F 3/0482* (2013.01)
*G06F 3/0485* (2022.01)
*G06F 3/0488* (2022.01)
*G06F 3/04883* (2022.01)
*G06F 3/14* (2006.01)

(52) U.S. Cl.
CPC ........ *G06F 3/0485* (2013.01); *G06F 3/04883* (2013.01); *G06F 3/14* (2013.01); *G06F 3/0362* (2013.01); *G06F 3/0488* (2013.01); *G06F 3/1423* (2013.01); *G09G 2354/00* (2013.01)

(58) Field of Classification Search
CPC .... G06F 3/0362; G06F 3/0488; G06F 3/1423; G09G 2354/00
See application file for complete search history.

(56) References Cited

U.S. PATENT DOCUMENTS

| | | |
|---|---|---|
| 5,488,204 A | 1/1996 | Mead et al. |
| 5,617,031 A | 4/1997 | Tuttle |
| 5,793,366 A | 8/1998 | Mano et al. |
| 5,825,352 A | 10/1998 | Bisset et al. |
| 5,825,353 A | 10/1998 | Will |
| 5,835,079 A | 11/1998 | Shieh |
| 5,853,327 A | 12/1998 | Gilboa |
| 5,880,411 A | 3/1999 | Gillespie et al. |
| 6,008,807 A | 12/1999 | Bretschneider et al. |
| 6,016,248 A | 1/2000 | Anzai et al. |
| 6,031,531 A | 2/2000 | Kimble |
| 6,128,010 A | 10/2000 | Baxter et al. |
| 6,167,353 A | 12/2000 | Piernot et al. |
| 6,188,391 B1 | 2/2001 | Seely et al. |
| 6,190,174 B1 | 2/2001 | Lam et al. |
| 6,232,972 B1 | 5/2001 | Arcuri et al. |
| 6,310,610 B1 | 10/2001 | Beaton et al. |
| 6,323,846 B1 | 11/2001 | Westerman et al. |
| 6,359,837 B1 | 3/2002 | Tsukamoto |
| 6,429,896 B1 | 8/2002 | Aruga et al. |
| 6,522,347 B1 | 2/2003 | Sakai et al. |
| 6,690,387 B2 | 2/2004 | Zimmerman et al. |
| 6,809,724 B1 | 10/2004 | Shiraishi et al. |
| 6,809,759 B1 | 10/2004 | Chiang |
| 6,819,867 B2 | 11/2004 | Mayer et al. |
| 6,857,105 B1 | 2/2005 | Fox et al. |
| 6,889,138 B1 | 5/2005 | Krull et al. |
| 7,015,894 B2 | 3/2006 | Morohoshi |
| 7,184,064 B2 | 2/2007 | Zimmerman et al. |
| 7,463,304 B2 | 12/2008 | Murray |
| 7,537,162 B1 | 5/2009 | Siu |
| 7,571,014 B1 | 8/2009 | Lambourne et al. |
| 7,616,110 B2 | 11/2009 | Crump et al. |
| 7,653,883 B2 | 1/2010 | Hotelling et al. |
| 7,656,393 B2 | 2/2010 | King et al. |
| 7,663,607 B2 | 2/2010 | Hotelling et al. |
| 7,843,471 B2 | 11/2010 | Doan et al. |
| 7,905,815 B2 | 3/2011 | Ellis et al. |
| 8,170,656 B2 | 5/2012 | Tan et al. |
| 8,189,087 B2 | 5/2012 | Misawa et al. |
| 8,196,043 B2 | 6/2012 | Crow et al. |
| 8,290,603 B1 | 10/2012 | Lambourne |
| 8,341,537 B2 | 12/2012 | Ray et al. |
| 8,378,811 B2 | 2/2013 | Crump et al. |
| 8,447,704 B2 | 5/2013 | Tan et al. |
| 8,479,122 B2 | 7/2013 | Hotelling et al. |
| 8,508,472 B1 | 8/2013 | Wieder |
| 8,618,930 B2 | 12/2013 | Papadopoulos et al. |
| 8,624,836 B1 | 1/2014 | Miller et al. |
| 8,634,808 B1 | 1/2014 | Zhong et al. |
| 8,675,084 B2 | 3/2014 | Bolton et al. |
| 8,742,890 B2 | 6/2014 | Gocho et al. |
| 8,762,895 B2 | 6/2014 | Mehta et al. |
| 8,769,554 B2 | 7/2014 | Onda et al. |
| 8,872,760 B2 | 10/2014 | Tsurumi |
| 8,894,462 B2 | 11/2014 | Huang et al. |
| 8,924,894 B1 | 12/2014 | Yaksick et al. |
| 8,963,806 B1 | 2/2015 | Starner et al. |
| 8,983,539 B1 | 3/2015 | Kim et al. |
| 9,071,945 B1 | 6/2015 | Rubin et al. |
| 9,112,849 B1 | 8/2015 | Werkelin Ahlin et al. |
| 9,146,124 B2 | 9/2015 | Parada et al. |
| 9,171,268 B1 | 10/2015 | Penilla et al. |
| 9,172,866 B2 | 10/2015 | Ito et al. |
| 9,195,219 B2 | 11/2015 | Hong et al. |
| 9,223,296 B2 * | 12/2015 | Yang ...................... G04C 3/008 |
| 9,329,831 B1 | 5/2016 | Fullerton et al. |
| 9,369,537 B1 | 6/2016 | Mathew et al. |
| 9,389,694 B2 | 7/2016 | Ataee et al. |
| D765,118 S | 8/2016 | Bachman et al. |
| 9,405,766 B2 | 8/2016 | Robbin et al. |
| 9,414,115 B1 | 8/2016 | Mao et al. |
| 9,423,868 B2 | 8/2016 | Iwasaki |
| 9,451,144 B2 | 9/2016 | Dye |
| 9,462,340 B1 | 10/2016 | Mathurin |
| 9,495,575 B2 * | 11/2016 | Kim ................... G06V 40/1365 |
| D773,510 S | 12/2016 | Foss et al. |
| 9,532,723 B2 | 1/2017 | Kim et al. |
| 9,544,563 B1 | 1/2017 | Cheng et al. |
| 9,547,419 B2 | 1/2017 | Yang et al. |
| 9,560,629 B2 | 1/2017 | Migicovsky et al. |
| 9,574,896 B2 | 2/2017 | Mcgavran et al. |
| 9,594,354 B1 | 3/2017 | Kahn et al. |
| 9,628,950 B1 | 4/2017 | Noeth et al. |
| 9,652,741 B2 | 5/2017 | Goldberg et al. |
| D789,381 S | 6/2017 | Okumura et al. |
| 9,668,676 B2 | 6/2017 | Culbert |
| 9,704,386 B2 * | 7/2017 | Yoon ........................ G06F 3/017 |
| 9,753,543 B2 * | 9/2017 | Jeon ......................... G06F 3/014 |
| 9,820,323 B1 | 11/2017 | Young et al. |
| 9,832,697 B2 | 11/2017 | Kotecha et al. |
| 9,892,715 B2 | 2/2018 | Komulainen et al. |
| 9,927,957 B1 | 3/2018 | Sagar et al. |
| 9,939,899 B2 | 4/2018 | Allec et al. |
| 9,942,463 B2 | 4/2018 | Kuo et al. |
| 9,973,674 B2 | 5/2018 | Dye et al. |
| 9,977,566 B2 | 5/2018 | Jitkoff et al. |
| 10,001,817 B2 | 6/2018 | Zambetti et al. |
| 10,019,599 B1 | 7/2018 | Moran et al. |
| 10,135,905 B2 | 11/2018 | Chaudhri et al. |
| 10,182,138 B2 | 1/2019 | Motika et al. |
| 10,216,392 B2 | 2/2019 | Zhao |
| 10,261,595 B1 | 4/2019 | Kin |
| 10,299,300 B1 | 5/2019 | Young |
| 10,310,697 B2 | 6/2019 | Roberts et al. |
| 10,318,034 B1 | 6/2019 | Hauenstein et al. |
| 10,324,590 B2 | 6/2019 | Yang et al. |
| 10,356,070 B2 | 7/2019 | Cha et al. |
| 10,466,881 B2 | 11/2019 | Sasaki et al. |
| 10,524,300 B2 | 12/2019 | Ueda et al. |
| 10,627,914 B2 * | 4/2020 | Ang ......................... G06F 3/016 |
| 10,643,246 B1 | 5/2020 | Suprasadachandran Pillai |
| 10,656,720 B1 | 5/2020 | Holz |
| 10,671,174 B2 * | 6/2020 | Ang ..................... G02B 27/0172 |
| 10,684,693 B2 * | 6/2020 | Kletsov .................. G06F 18/217 |
| 10,691,332 B2 * | 6/2020 | Offenberg ............. G06F 3/0237 |
| 10,721,711 B2 | 7/2020 | Kirov et al. |
| 10,802,598 B2 * | 10/2020 | Ang .......................... H04N 23/69 |
| 10,895,979 B1 | 1/2021 | Boyers |
| 10,926,135 B1 | 2/2021 | Mckirdy |
| 10,936,067 B1 | 3/2021 | Chand et al. |
| 10,966,149 B2 * | 3/2021 | Yoon ................. H04N 21/43615 |
| 11,048,334 B2 * | 6/2021 | Rothberg ............... G06F 3/0346 |
| 11,050,873 B2 | 6/2021 | Kim et al. |
| 11,099,647 B2 * | 8/2021 | Ang ........................ G06F 3/016 |
| 11,150,730 B1 | 10/2021 | Anderson et al. |
| 11,331,045 B1 | 5/2022 | Moschella et al. |
| 11,347,320 B1 | 5/2022 | Shin et al. |
| 11,543,887 B2 * | 1/2023 | Ang ....................... G06F 3/0482 |
| 11,868,531 B1 * | 1/2024 | Tasci ......................... G06N 20/00 |
| 2001/0030597 A1 | 10/2001 | Inoue et al. |
| 2001/0031622 A1 | 10/2001 | Kivela et al. |
| 2002/0024500 A1 | 2/2002 | Howard |

(56) References Cited

U.S. PATENT DOCUMENTS

| | | |
|---|---|---|
| 2002/0068600 A1 | 6/2002 | Chihara et al. |
| 2002/0140803 A1 | 10/2002 | Gutta et al. |
| 2002/0142734 A1 | 10/2002 | Wickstead |
| 2002/0171737 A1 | 11/2002 | Tullis et al. |
| 2003/0025802 A1 | 2/2003 | Mayer, Jr. et al. |
| 2003/0128237 A1 | 7/2003 | Sakai |
| 2003/0151982 A1 | 8/2003 | Brewer et al. |
| 2003/0158927 A1 | 8/2003 | Sagey et al. |
| 2003/0171984 A1 | 9/2003 | Wodka et al. |
| 2004/0044953 A1 | 3/2004 | Watkins et al. |
| 2004/0100389 A1 | 5/2004 | Naito et al. |
| 2004/0264916 A1 | 12/2004 | Van et al. |
| 2005/0117601 A1 | 6/2005 | Anderson et al. |
| 2005/0134695 A1 | 6/2005 | Deshpande et al. |
| 2005/0198319 A1 | 9/2005 | Chan et al. |
| 2005/0237194 A1 | 10/2005 | Voba et al. |
| 2005/0246642 A1 | 11/2005 | Valderas et al. |
| 2006/0010402 A1 | 1/2006 | Undasan |
| 2006/0079973 A1 | 4/2006 | Bacharach et al. |
| 2006/0107226 A1 | 5/2006 | Matthews et al. |
| 2006/0135064 A1 | 6/2006 | Cho et al. |
| 2006/0197753 A1 | 9/2006 | Hotelling |
| 2006/0217104 A1 | 9/2006 | Cho |
| 2007/0021153 A1 | 1/2007 | Novak |
| 2007/0025711 A1 | 2/2007 | Marcus et al. |
| 2007/0040810 A1 | 2/2007 | Dowe et al. |
| 2007/0096283 A1 | 5/2007 | Ljung et al. |
| 2007/0109417 A1 | 5/2007 | Hyttfors et al. |
| 2007/0143495 A1 | 6/2007 | Porat |
| 2007/0165103 A1 | 7/2007 | Arima et al. |
| 2007/0180392 A1 | 8/2007 | Russo |
| 2007/0191008 A1 | 8/2007 | Bucher et al. |
| 2007/0236451 A1 | 10/2007 | Ofek et al. |
| 2007/0254640 A1 | 11/2007 | Bliss |
| 2007/0259654 A1 | 11/2007 | Oijer |
| 2008/0004113 A1 | 1/2008 | Avery et al. |
| 2008/0052643 A1 | 2/2008 | Ike et al. |
| 2008/0077673 A1 | 3/2008 | Thomas et al. |
| 2008/0120029 A1 | 5/2008 | Zelek et al. |
| 2008/0122796 A1 | 5/2008 | Jobs et al. |
| 2008/0165136 A1 | 7/2008 | Christie et al. |
| 2008/0214191 A1 | 9/2008 | Yach et al. |
| 2008/0259829 A1 | 10/2008 | Rosenblatt |
| 2008/0284855 A1 | 11/2008 | Umeyama et al. |
| 2008/0300055 A1 | 12/2008 | Lutnick et al. |
| 2008/0320394 A1 | 12/2008 | Womack |
| 2009/0060170 A1 | 3/2009 | Coughlan et al. |
| 2009/0068984 A1 | 3/2009 | Burnett |
| 2009/0088207 A1 | 4/2009 | Sweeney et al. |
| 2009/0102933 A1 | 4/2009 | Harris et al. |
| 2009/0143114 A1 | 6/2009 | Vargas et al. |
| 2009/0144391 A1 | 6/2009 | Jung et al. |
| 2009/0176532 A1 | 7/2009 | Chae et al. |
| 2009/0195402 A1 | 8/2009 | Izadi et al. |
| 2009/0195497 A1 | 8/2009 | Fitzgerald et al. |
| 2009/0203315 A1 | 8/2009 | Kawabata et al. |
| 2009/0207743 A1 | 8/2009 | Huq et al. |
| 2009/0222748 A1 | 9/2009 | Lejeune et al. |
| 2009/0225060 A1 | 9/2009 | Rizoiu et al. |
| 2009/0228868 A1 | 9/2009 | Forstall et al. |
| 2009/0231960 A1 | 9/2009 | Hutcheson |
| 2009/0239587 A1 | 9/2009 | Negron et al. |
| 2009/0251410 A1 | 10/2009 | Mori et al. |
| 2009/0284476 A1 | 11/2009 | Bull et al. |
| 2009/0306487 A1 | 12/2009 | Crowe et al. |
| 2009/0311993 A1 | 12/2009 | Horodezky |
| 2009/0315671 A1 | 12/2009 | Gocho et al. |
| 2009/0325630 A1 | 12/2009 | Tiitola et al. |
| 2010/0026626 A1 | 2/2010 | Macfarlane |
| 2010/0026640 A1 | 2/2010 | Kim et al. |
| 2010/0054497 A1 | 3/2010 | Bull et al. |
| 2010/0088182 A1 | 4/2010 | Ryder et al. |
| 2010/0125785 A1 | 5/2010 | Moore et al. |
| 2010/0138764 A1 | 6/2010 | Hatambeiki et al. |
| 2010/0149090 A1 | 6/2010 | Morris et al. |
| 2010/0162160 A1 | 6/2010 | Stallings et al. |
| 2010/0169790 A1 | 7/2010 | Vaughan et al. |
| 2010/0178873 A1 | 7/2010 | Lee et al. |
| 2010/0182126 A1 | 7/2010 | Martis et al. |
| 2010/0199232 A1 | 8/2010 | Mistry et al. |
| 2010/0228836 A1 | 9/2010 | Lehtovirta et al. |
| 2010/0284389 A1 | 11/2010 | Ramsay et al. |
| 2010/0287513 A1 | 11/2010 | Singh et al. |
| 2010/0289740 A1* | 11/2010 | Kim ............ G06F 3/046 345/157 |
| 2010/0289772 A1 | 11/2010 | Miller |
| 2010/0289910 A1 | 11/2010 | Kamshilin et al. |
| 2010/0321201 A1 | 12/2010 | Huang et al. |
| 2011/0016425 A1 | 1/2011 | Homburg et al. |
| 2011/0029750 A1 | 2/2011 | Jang et al. |
| 2011/0037712 A1 | 2/2011 | Kim et al. |
| 2011/0054360 A1 | 3/2011 | Son et al. |
| 2011/0058052 A1 | 3/2011 | Bolton et al. |
| 2011/0059769 A1 | 3/2011 | Brunolli |
| 2011/0081860 A1 | 4/2011 | Brown et al. |
| 2011/0090407 A1 | 4/2011 | Friedman |
| 2011/0106921 A1 | 5/2011 | Brown et al. |
| 2011/0111735 A1 | 5/2011 | Pietrow |
| 2011/0115932 A1 | 5/2011 | Shin et al. |
| 2011/0130168 A1 | 6/2011 | Vendrow et al. |
| 2011/0138284 A1 | 6/2011 | Wigdor et al. |
| 2011/0148568 A1 | 6/2011 | Lim et al. |
| 2011/0153435 A1 | 6/2011 | Pisaris-Henderson |
| 2011/0153628 A1 | 6/2011 | Basu et al. |
| 2011/0159469 A1 | 6/2011 | Hwang et al. |
| 2011/0159927 A1 | 6/2011 | Choi |
| 2011/0173204 A1 | 7/2011 | Murillo et al. |
| 2011/0181520 A1 | 7/2011 | Boda et al. |
| 2011/0183613 A1 | 7/2011 | Nocera |
| 2011/0210931 A1 | 9/2011 | Shai |
| 2011/0225492 A1 | 9/2011 | Boettcher et al. |
| 2011/0235926 A1 | 9/2011 | Yokono |
| 2011/0237221 A1 | 9/2011 | Prakash et al. |
| 2011/0252318 A1 | 10/2011 | Helms |
| 2011/0316884 A1 | 12/2011 | Giambalvo et al. |
| 2012/0019400 A1 | 1/2012 | Patel et al. |
| 2012/0044062 A1 | 2/2012 | Jersa et al. |
| 2012/0051560 A1 | 3/2012 | Sanders |
| 2012/0069206 A1 | 3/2012 | Hsieh |
| 2012/0071146 A1 | 3/2012 | Shrivastava et al. |
| 2012/0089300 A1 | 4/2012 | Wolterman et al. |
| 2012/0115608 A1 | 5/2012 | Pfeifer et al. |
| 2012/0120277 A1 | 5/2012 | Tsai et al. |
| 2012/0127070 A1 | 5/2012 | Ryoo et al. |
| 2012/0188158 A1 | 7/2012 | Tan et al. |
| 2012/0192094 A1 | 7/2012 | Goertz et al. |
| 2012/0197419 A1 | 8/2012 | Dhruv et al. |
| 2012/0198531 A1 | 8/2012 | Ort et al. |
| 2012/0236037 A1 | 9/2012 | Lessing et al. |
| 2012/0266093 A1 | 10/2012 | Park et al. |
| 2012/0287290 A1 | 11/2012 | Jain et al. |
| 2012/0290965 A1 | 11/2012 | Ignor et al. |
| 2012/0306748 A1 | 12/2012 | Fleizach et al. |
| 2012/0316777 A1 | 12/2012 | Kitta et al. |
| 2012/0320141 A1 | 12/2012 | Bowen et al. |
| 2013/0016048 A1 | 1/2013 | So et al. |
| 2013/0016818 A1 | 1/2013 | Cohn |
| 2013/0017846 A1 | 1/2013 | Schoppe |
| 2013/0027341 A1 | 1/2013 | Mastandrea |
| 2013/0038771 A1 | 2/2013 | Brunner et al. |
| 2013/0057472 A1 | 3/2013 | Dizac et al. |
| 2013/0065482 A1 | 3/2013 | Trickett et al. |
| 2013/0076591 A1 | 3/2013 | Sirpal et al. |
| 2013/0085931 A1 | 4/2013 | Runyan |
| 2013/0093904 A1 | 4/2013 | Wagner et al. |
| 2013/0106603 A1 | 5/2013 | Weast et al. |
| 2013/0111550 A1 | 5/2013 | Naveh et al. |
| 2013/0117693 A1 | 5/2013 | Anderson et al. |
| 2013/0125016 A1 | 5/2013 | Pallakoff et al. |
| 2013/0134212 A1 | 5/2013 | Chang et al. |
| 2013/0135203 A1 | 5/2013 | Croughwell, III |
| 2013/0138272 A1 | 5/2013 | Louise-Babando et al. |
| 2013/0141325 A1 | 6/2013 | Bailey et al. |
| 2013/0141331 A1 | 6/2013 | Shiu et al. |

(56) References Cited

U.S. PATENT DOCUMENTS

| | | |
|---|---|---|
| 2013/0141362 A1 | 6/2013 | Asanuma et al. |
| 2013/0143512 A1 | 6/2013 | Hernandez et al. |
| 2013/0145316 A1 | 6/2013 | Heo |
| 2013/0154913 A1 | 6/2013 | Genc et al. |
| 2013/0162411 A1 | 6/2013 | Moses et al. |
| 2013/0166679 A1 | 6/2013 | Kuwahara et al. |
| 2013/0168444 A1 | 7/2013 | Hsieh et al. |
| 2013/0201098 A1 | 8/2013 | Schilit et al. |
| 2013/0219285 A1 | 8/2013 | Iwasaki et al. |
| 2013/0219303 A1 | 8/2013 | Eriksson et al. |
| 2013/0222270 A1 | 8/2013 | Winkler et al. |
| 2013/0223279 A1 | 8/2013 | Tinnakornsrisuphap et al. |
| 2013/0225152 A1 | 8/2013 | Matthews et al. |
| 2013/0234926 A1 | 9/2013 | Rauber |
| 2013/0239046 A1 | 9/2013 | Platzer et al. |
| 2013/0244633 A1 | 9/2013 | Jacobs et al. |
| 2013/0286251 A1 | 10/2013 | Wood et al. |
| 2013/0300651 A1 | 11/2013 | Lim |
| 2013/0314204 A1 | 11/2013 | Ho et al. |
| 2013/0325524 A1 | 12/2013 | Boudville |
| 2013/0329074 A1 | 12/2013 | Zhang et al. |
| 2013/0329924 A1 | 12/2013 | Fleizach et al. |
| 2013/0331130 A1 | 12/2013 | Lee |
| 2013/0339436 A1 | 12/2013 | Gray |
| 2013/0346882 A1 | 12/2013 | Shiplacoff et al. |
| 2014/0006949 A1 | 1/2014 | Briand et al. |
| 2014/0007021 A1 | 1/2014 | Akiyama et al. |
| 2014/0015546 A1 | 1/2014 | Frederick et al. |
| 2014/0022399 A1 | 1/2014 | Rashid et al. |
| 2014/0028546 A1* | 1/2014 | Jeon .................. G06F 3/04842 345/156 |
| 2014/0031698 A1 | 1/2014 | Moon et al. |
| 2014/0033100 A1 | 1/2014 | Noda et al. |
| 2014/0037107 A1 | 2/2014 | Marino et al. |
| 2014/0040831 A1 | 2/2014 | Akasaka et al. |
| 2014/0057569 A1 | 2/2014 | Toivanen et al. |
| 2014/0068526 A1* | 3/2014 | Figelman .............. G06F 3/167 715/863 |
| 2014/0068755 A1 | 3/2014 | King et al. |
| 2014/0073252 A1 | 3/2014 | Lee et al. |
| 2014/0075003 A1 | 3/2014 | Tanaka et al. |
| 2014/0075311 A1 | 3/2014 | Boettcher et al. |
| 2014/0078318 A1 | 3/2014 | Alameh |
| 2014/0078371 A1 | 3/2014 | Kinoshita |
| 2014/0084857 A1 | 3/2014 | Liu et al. |
| 2014/0095225 A1 | 4/2014 | Williams et al. |
| 2014/0104180 A1 | 4/2014 | Schaffer |
| 2014/0104449 A1 | 4/2014 | Masarik et al. |
| 2014/0118563 A1 | 5/2014 | Mehta et al. |
| 2014/0122331 A1 | 5/2014 | Vaish et al. |
| 2014/0123043 A1 | 5/2014 | Schmidt et al. |
| 2014/0135612 A1 | 5/2014 | Yuen et al. |
| 2014/0139454 A1 | 5/2014 | Mistry et al. |
| 2014/0139637 A1 | 5/2014 | Mistry et al. |
| 2014/0141721 A1 | 5/2014 | Kim et al. |
| 2014/0142851 A1 | 5/2014 | Larmo et al. |
| 2014/0143678 A1 | 5/2014 | Mistry et al. |
| 2014/0143737 A1 | 5/2014 | Mistry et al. |
| 2014/0143784 A1 | 5/2014 | Mistry et al. |
| 2014/0149859 A1 | 5/2014 | Van Dyken et al. |
| 2014/0155705 A1 | 6/2014 | Papadopoulos et al. |
| 2014/0156801 A1 | 6/2014 | Fernandes et al. |
| 2014/0160033 A1 | 6/2014 | Brikman et al. |
| 2014/0160078 A1 | 6/2014 | Seo et al. |
| 2014/0160304 A1 | 6/2014 | Galor et al. |
| 2014/0164544 A1 | 6/2014 | Gagneraud |
| 2014/0164907 A1 | 6/2014 | Jung et al. |
| 2014/0164930 A1 | 6/2014 | Lieb et al. |
| 2014/0167986 A1 | 6/2014 | Parada et al. |
| 2014/0168056 A1 | 6/2014 | Swaminathan et al. |
| 2014/0173455 A1 | 6/2014 | Shimizu et al. |
| 2014/0180582 A1 | 6/2014 | Pontarelli et al. |
| 2014/0181654 A1 | 6/2014 | Kumar et al. |
| 2014/0184524 A1 | 7/2014 | Schiefer et al. |
| 2014/0191715 A1 | 7/2014 | Wechlin et al. |
| 2014/0195943 A1 | 7/2014 | Zheng et al. |
| 2014/0204229 A1 | 7/2014 | Leung et al. |
| 2014/0210708 A1 | 7/2014 | Simmons et al. |
| 2014/0218599 A1 | 8/2014 | Nakamura et al. |
| 2014/0228063 A1 | 8/2014 | Harris et al. |
| 2014/0237389 A1 | 8/2014 | Ryall et al. |
| 2014/0240216 A1 | 8/2014 | Bukurak et al. |
| 2014/0240577 A1 | 8/2014 | Masugi |
| 2014/0269614 A1 | 9/2014 | Maguire et al. |
| 2014/0273975 A1 | 9/2014 | Barat et al. |
| 2014/0282068 A1 | 9/2014 | Levkovitz et al. |
| 2014/0282270 A1 | 9/2014 | Slonneger |
| 2014/0293755 A1 | 10/2014 | Geiser et al. |
| 2014/0302834 A1 | 10/2014 | Jones |
| 2014/0310350 A1 | 10/2014 | Borggaard et al. |
| 2014/0310598 A1 | 10/2014 | Sprague et al. |
| 2014/0320387 A1 | 10/2014 | Eriksson et al. |
| 2014/0320434 A1 | 10/2014 | Pantel |
| 2014/0328147 A1* | 11/2014 | Yang .................. G04C 3/004 368/69 |
| 2014/0331314 A1 | 11/2014 | Fujioka |
| 2014/0333602 A1 | 11/2014 | Yang et al. |
| 2014/0337450 A1 | 11/2014 | Choudhary et al. |
| 2014/0337748 A1 | 11/2014 | Lee |
| 2014/0343843 A1 | 11/2014 | Yanku |
| 2014/0344951 A1 | 11/2014 | Brewer |
| 2014/0358707 A1 | 12/2014 | Perkins et al. |
| 2014/0359124 A1 | 12/2014 | Adimatyam et al. |
| 2014/0359481 A1 | 12/2014 | Graham et al. |
| 2014/0359522 A1 | 12/2014 | Kim et al. |
| 2014/0365113 A1 | 12/2014 | Yue et al. |
| 2014/0365979 A1 | 12/2014 | Yoon et al. |
| 2014/0368719 A1 | 12/2014 | Kaneko et al. |
| 2014/0370807 A1 | 12/2014 | Pierce et al. |
| 2014/0375985 A1 | 12/2014 | Deliwala |
| 2014/0380187 A1 | 12/2014 | Gardenfors et al. |
| 2015/0011199 A1 | 1/2015 | Lee et al. |
| 2015/0017956 A1 | 1/2015 | Jeong |
| 2015/0019135 A1 | 1/2015 | Kacyvenski et al. |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0022674 A1 | 1/2015 | Koss et al. |
| 2015/0026615 A1 | 1/2015 | Choi et al. |
| 2015/0026647 A1 | 1/2015 | Park et al. |
| 2015/0033136 A1 | 1/2015 | Sasaki et al. |
| 2015/0035762 A1 | 2/2015 | Lu |
| 2015/0036853 A1 | 2/2015 | Solum et al. |
| 2015/0049033 A1 | 2/2015 | Kim et al. |
| 2015/0049233 A1 | 2/2015 | Choi |
| 2015/0061842 A1* | 3/2015 | Yoon .................. G04G 21/04 340/12.5 |
| 2015/0061972 A1 | 3/2015 | Kang et al. |
| 2015/0065035 A1 | 3/2015 | Son et al. |
| 2015/0067580 A1 | 3/2015 | Um et al. |
| 2015/0084660 A1 | 3/2015 | Knierim et al. |
| 2015/0084860 A1 | 3/2015 | Aleem et al. |
| 2015/0094031 A1 | 4/2015 | Liu |
| 2015/0094050 A1 | 4/2015 | Bowles et al. |
| 2015/0094093 A1 | 4/2015 | Pierce et al. |
| 2015/0100621 A1 | 4/2015 | Pan |
| 2015/0106221 A1 | 4/2015 | Tapley et al. |
| 2015/0121231 A1 | 4/2015 | Edwardson et al. |
| 2015/0131121 A1 | 5/2015 | Kang |
| 2015/0156803 A1 | 6/2015 | Ballard et al. |
| 2015/0169171 A1 | 6/2015 | Fotland |
| 2015/0185877 A1 | 7/2015 | Watanabe et al. |
| 2015/0189162 A1 | 7/2015 | Kuo et al. |
| 2015/0193130 A1 | 7/2015 | Cho et al. |
| 2015/0193138 A1 | 7/2015 | Relyea et al. |
| 2015/0194050 A1 | 7/2015 | Lee |
| 2015/0199780 A1 | 7/2015 | Beyk |
| 2015/0205358 A1 | 7/2015 | Lyren |
| 2015/0205511 A1 | 7/2015 | Vinna et al. |
| 2015/0220149 A1 | 8/2015 | Plagemann et al. |
| 2015/0242065 A1 | 8/2015 | Ko et al. |
| 2015/0242083 A1 | 8/2015 | Rainisto |
| 2015/0243246 A1 | 8/2015 | Mun et al. |

(56) References Cited

U.S. PATENT DOCUMENTS

| | | |
|---|---|---|
| 2015/0248235 A1* | 9/2015 | Offenberg .............. G06F 3/0237 715/773 |
| 2015/0261310 A1 | 9/2015 | Walmsley et al. |
| 2015/0261493 A1 | 9/2015 | Lemmon et al. |
| 2015/0264202 A1 | 9/2015 | Pawlowski |
| 2015/0268821 A1 | 9/2015 | Ramsby et al. |
| 2015/0286295 A1 | 10/2015 | Pepe |
| 2015/0287403 A1 | 10/2015 | Holzer Zaslansky et al. |
| 2015/0297185 A1 | 10/2015 | Mccormack et al. |
| 2015/0312617 A1 | 10/2015 | Chen et al. |
| 2015/0324057 A1 | 11/2015 | Chaji et al. |
| 2015/0332031 A1 | 11/2015 | Mistry et al. |
| 2015/0339261 A1 | 11/2015 | Jha et al. |
| 2015/0346834 A1 | 12/2015 | Martinez Fernandez et al. |
| 2015/0350029 A1 | 12/2015 | Skrobotov |
| 2015/0358043 A1 | 12/2015 | Jeong et al. |
| 2015/0370333 A1 | 12/2015 | Ataee et al. |
| 2015/0373172 A1 | 12/2015 | Boesen |
| 2016/0011724 A1 | 1/2016 | Wheeler et al. |
| 2016/0014266 A1 | 1/2016 | Bhatt |
| 2016/0018846 A1 | 1/2016 | Zenoff |
| 2016/0021168 A1 | 1/2016 | Chaudhri et al. |
| 2016/0026425 A1 | 1/2016 | Lee et al. |
| 2016/0028869 A1 | 1/2016 | Bhatt |
| 2016/0029899 A1 | 2/2016 | Kim et al. |
| 2016/0034742 A1* | 2/2016 | Kim ........................ G06F 21/35 382/124 |
| 2016/0041580 A1 | 2/2016 | Inoue et al. |
| 2016/0041680 A1 | 2/2016 | Chi et al. |
| 2016/0043905 A1 | 2/2016 | Fiedler |
| 2016/0048215 A1 | 2/2016 | Shin et al. |
| 2016/0048369 A1 | 2/2016 | Zenoff |
| 2016/0048370 A1 | 2/2016 | Zenoff |
| 2016/0050476 A1 | 2/2016 | Patil |
| 2016/0054710 A1 | 2/2016 | Jo et al. |
| 2016/0061613 A1 | 3/2016 | Jung et al. |
| 2016/0062567 A1 | 3/2016 | Yang et al. |
| 2016/0062572 A1 | 3/2016 | Yang et al. |
| 2016/0062582 A1 | 3/2016 | Wilson et al. |
| 2016/0062606 A1 | 3/2016 | Vega et al. |
| 2016/0062719 A1 | 3/2016 | Romano et al. |
| 2016/0085266 A1 | 3/2016 | Lee et al. |
| 2016/0091980 A1 | 3/2016 | Baranski et al. |
| 2016/0092053 A1 | 3/2016 | Loganathan et al. |
| 2016/0094698 A1 | 3/2016 | Lee et al. |
| 2016/0098137 A1 | 4/2016 | Kim et al. |
| 2016/0116941 A1 | 4/2016 | Kuwabara et al. |
| 2016/0124514 A1 | 5/2016 | Cha et al. |
| 2016/0134737 A1 | 5/2016 | Pulletikurty |
| 2016/0142763 A1 | 5/2016 | Kim et al. |
| 2016/0156597 A1 | 6/2016 | Meng et al. |
| 2016/0156957 A1 | 6/2016 | Yun |
| 2016/0165037 A1 | 6/2016 | Youn et al. |
| 2016/0191511 A1 | 6/2016 | Tijerina et al. |
| 2016/0195864 A1 | 7/2016 | Kim |
| 2016/0196692 A1 | 7/2016 | Kjallstrom et al. |
| 2016/0202866 A1 | 7/2016 | Zambetti |
| 2016/0209939 A1 | 7/2016 | Zambetti et al. |
| 2016/0246566 A1 | 8/2016 | Fullerton et al. |
| 2016/0248899 A1 | 8/2016 | Lee et al. |
| 2016/0259489 A1 | 9/2016 | Yang |
| 2016/0260414 A1 | 9/2016 | Yang |
| 2016/0269176 A1 | 9/2016 | Pang et al. |
| 2016/0283194 A1 | 9/2016 | Patil et al. |
| 2016/0291768 A1 | 10/2016 | Cho et al. |
| 2016/0296142 A1 | 10/2016 | Culbert |
| 2016/0313798 A1 | 10/2016 | Connor |
| 2016/0313875 A1 | 10/2016 | Williams et al. |
| 2016/0327911 A1 | 11/2016 | Eim et al. |
| 2016/0328108 A1 | 11/2016 | Li |
| 2016/0337206 A1 | 11/2016 | Bugenhagen et al. |
| 2016/0345039 A1 | 11/2016 | Billmeyer |
| 2016/0357507 A1 | 12/2016 | Decker et al. |
| 2017/0006210 A1 | 1/2017 | Dye et al. |
| 2017/0011210 A1 | 1/2017 | Cheong et al. |
| 2017/0031453 A1 | 2/2017 | Presura |
| 2017/0031648 A1 | 2/2017 | So et al. |
| 2017/0034253 A1 | 2/2017 | Jiang et al. |
| 2017/0046872 A1 | 2/2017 | Geselowitz et al. |
| 2017/0053542 A1 | 2/2017 | Wilson et al. |
| 2017/0065184 A1 | 3/2017 | Barak |
| 2017/0083188 A1 | 3/2017 | Yang et al. |
| 2017/0090567 A1 | 3/2017 | Allec et al. |
| 2017/0123487 A1 | 5/2017 | Hazra et al. |
| 2017/0134553 A1 | 5/2017 | Jeon et al. |
| 2017/0134872 A1 | 5/2017 | Silva et al. |
| 2017/0149795 A1 | 5/2017 | Day, II |
| 2017/0156110 A1 | 6/2017 | Ueno et al. |
| 2017/0160098 A1 | 6/2017 | Mcgavran et al. |
| 2017/0160819 A1 | 6/2017 | Yi et al. |
| 2017/0180843 A1 | 6/2017 | Perianu et al. |
| 2017/0185373 A1 | 6/2017 | Kim et al. |
| 2017/0192743 A1 | 7/2017 | Chun et al. |
| 2017/0195772 A1 | 7/2017 | Han et al. |
| 2017/0205854 A1 | 7/2017 | Zenoff |
| 2017/0205878 A1 | 7/2017 | Hoste et al. |
| 2017/0212590 A1 | 7/2017 | Vanblon et al. |
| 2017/0220224 A1 | 8/2017 | Kodali et al. |
| 2017/0230236 A1 | 8/2017 | Kim et al. |
| 2017/0308227 A1 | 10/2017 | Park |
| 2017/0308292 A1 | 10/2017 | Choi |
| 2017/0322711 A1 | 11/2017 | Robinson et al. |
| 2017/0322713 A1 | 11/2017 | Hwang et al. |
| 2017/0331901 A1 | 11/2017 | Sarlandie De La Robertie et al. |
| 2017/0357426 A1 | 12/2017 | Wilson et al. |
| 2017/0357477 A1 | 12/2017 | Im et al. |
| 2018/0013815 A1 | 1/2018 | Gold |
| 2018/0036469 A1 | 2/2018 | Crnkovich et al. |
| 2018/0046788 A1 | 2/2018 | Ohtani et al. |
| 2018/0059894 A1 | 3/2018 | Kim |
| 2018/0062691 A1 | 3/2018 | Barnett, Jr. |
| 2018/0067712 A1 | 3/2018 | Behzadi et al. |
| 2018/0069957 A1 | 3/2018 | Mushikabe et al. |
| 2018/0081453 A1 | 3/2018 | Ely |
| 2018/0101235 A1 | 4/2018 | Bodensteiner et al. |
| 2018/0121036 A1 | 5/2018 | Moore et al. |
| 2018/0137266 A1 | 5/2018 | Kim et al. |
| 2018/0153430 A1 | 6/2018 | Ang et al. |
| 2018/0181261 A1 | 6/2018 | Saurabh |
| 2018/0199137 A1 | 7/2018 | Mate et al. |
| 2018/0218636 A1 | 8/2018 | Alaouf et al. |
| 2018/0253151 A1* | 9/2018 | Kletsov .................. A61B 5/004 |
| 2018/0259915 A1 | 9/2018 | Hosoi et al. |
| 2018/0262677 A1 | 9/2018 | Dye et al. |
| 2018/0267773 A1 | 9/2018 | Kim et al. |
| 2018/0288560 A1 | 10/2018 | Naik et al. |
| 2018/0294844 A1 | 10/2018 | Choi et al. |
| 2018/0307303 A1 | 10/2018 | Powderly et al. |
| 2018/0321842 A1 | 11/2018 | Lee et al. |
| 2018/0329585 A1 | 11/2018 | Carrigan et al. |
| 2018/0329586 A1 | 11/2018 | Sundstrom et al. |
| 2018/0335903 A1 | 11/2018 | Coffman et al. |
| 2018/0341448 A1 | 11/2018 | Behzadi et al. |
| 2018/0352435 A1 | 12/2018 | Donley et al. |
| 2019/0018506 A1 | 1/2019 | Bernstein et al. |
| 2019/0028865 A1 | 1/2019 | Raleigh et al. |
| 2019/0033964 A1 | 1/2019 | Kulkarni et al. |
| 2019/0037004 A1 | 1/2019 | Chaudhri et al. |
| 2019/0113889 A1 | 4/2019 | Kumar et al. |
| 2019/0121300 A1 | 4/2019 | Peterson et al. |
| 2019/0121522 A1 | 4/2019 | Davis et al. |
| 2019/0129661 A1 | 5/2019 | Hirota et al. |
| 2019/0138696 A1 | 5/2019 | Carpenter et al. |
| 2019/0146219 A1 | 5/2019 | Rodriguez, II |
| 2019/0146422 A1 | 5/2019 | Meyer et al. |
| 2019/0179423 A1 | 6/2019 | Rose et al. |
| 2019/0182749 A1 | 6/2019 | Breaux et al. |
| 2019/0187861 A1 | 6/2019 | Yang |
| 2019/0191208 A1 | 6/2019 | Coenen et al. |
| 2019/0196600 A1* | 6/2019 | Rothberg ............... G06V 40/20 |
| 2019/0220040 A1 | 7/2019 | Wu et al. |
| 2019/0238675 A1 | 8/2019 | Soni et al. |
| 2019/0265849 A1 | 8/2019 | Yang et al. |
| 2019/0268771 A1 | 8/2019 | Seo et al. |

(56) References Cited

U.S. PATENT DOCUMENTS

| | | | |
|---|---|---|---|
| 2019/0281547 A1* | 9/2019 | Yoon | H04N 21/42684 |
| 2019/0297439 A1 | 9/2019 | Maeda | |
| 2019/0306607 A1 | 10/2019 | Clayton et al. | |
| 2019/0317608 A1 | 10/2019 | Ono et al. | |
| 2019/0340348 A1 | 11/2019 | Yu et al. | |
| 2019/0347181 A1 | 11/2019 | Cranfill et al. | |
| 2019/0349469 A1 | 11/2019 | Skogen et al. | |
| 2019/0357787 A1 | 11/2019 | Barachant et al. | |
| 2019/0370094 A1* | 12/2019 | Louch | G06F 3/04842 |
| 2019/0372862 A1 | 12/2019 | Carrigan et al. | |
| 2020/0042087 A1* | 2/2020 | Ang | G06F 3/0482 |
| 2020/0042088 A1* | 2/2020 | Ang | G06F 3/167 |
| 2020/0042089 A1* | 2/2020 | Ang | G06F 3/016 |
| 2020/0042094 A1* | 2/2020 | Ang | G06F 3/16 |
| 2020/0042095 A1 | 2/2020 | Ang et al. | |
| 2020/0042145 A1 | 2/2020 | Williams et al. | |
| 2020/0042311 A1 | 2/2020 | Shin | |
| 2020/0067245 A1 | 2/2020 | Maley | |
| 2020/0073483 A1 | 3/2020 | Berenzweig et al. | |
| 2020/0097081 A1 | 3/2020 | Stone et al. | |
| 2020/0097082 A1 | 3/2020 | Berenzweig et al. | |
| 2020/0111260 A1 | 4/2020 | Osborn et al. | |
| 2020/0150772 A1 | 5/2020 | Quinn et al. | |
| 2020/0159340 A1 | 5/2020 | Bernstein et al. | |
| 2020/0159374 A1 | 5/2020 | Yang et al. | |
| 2020/0213437 A1 | 7/2020 | Bhatt | |
| 2020/0228646 A1 | 7/2020 | Hotes et al. | |
| 2020/0249752 A1 | 8/2020 | Parshionikar | |
| 2020/0264764 A1 | 8/2020 | Seymour et al. | |
| 2020/0285379 A1 | 9/2020 | George-Svahn | |
| 2020/0301509 A1 | 9/2020 | Liu et al. | |
| 2020/0310540 A1 | 10/2020 | Hussami et al. | |
| 2020/0310541 A1 | 10/2020 | Reisman et al. | |
| 2020/0342144 A1 | 10/2020 | Alameh et al. | |
| 2020/0356252 A1 | 11/2020 | Ko et al. | |
| 2020/0356687 A1 | 11/2020 | Salzman et al. | |
| 2020/0359204 A1 | 11/2020 | Hawkins et al. | |
| 2020/0379712 A1 | 12/2020 | Carrigan | |
| 2020/0379713 A1 | 12/2020 | Carrigan | |
| 2020/0379716 A1* | 12/2020 | Carrigan | G06F 3/0362 |
| 2020/0401292 A1 | 12/2020 | Lorenz et al. | |
| 2021/0064132 A1 | 3/2021 | Rubin et al. | |
| 2021/0076091 A1 | 3/2021 | Shohara | |
| 2021/0103338 A1* | 4/2021 | Ang | G06F 3/04815 |
| 2021/0124417 A1 | 4/2021 | Ma | |
| 2021/0216654 A1 | 7/2021 | Ko et al. | |
| 2021/0232225 A1 | 7/2021 | Cipoletta et al. | |
| 2021/0255750 A1 | 8/2021 | Al et al. | |
| 2021/0263702 A1* | 8/2021 | Carrigan | G06F 3/0481 |
| 2021/0349552 A1 | 11/2021 | Bernstein et al. | |
| 2021/0373718 A1 | 12/2021 | Yang et al. | |
| 2021/0405760 A1 | 12/2021 | Schoen | |
| 2021/0407507 A1 | 12/2021 | Zhou et al. | |
| 2022/0019284 A1 | 1/2022 | Kaifosh et al. | |
| 2022/0043626 A1 | 2/2022 | Carrigan | |
| 2022/0044309 A1 | 2/2022 | Jose | |
| 2022/0050425 A1 | 2/2022 | Connor | |
| 2022/0083183 A1 | 3/2022 | Patton | |
| 2022/0101719 A1 | 3/2022 | Bojic et al. | |
| 2022/0121344 A1 | 4/2022 | Pastrana Vicente et al. | |
| 2022/0129068 A1 | 4/2022 | Anderson et al. | |
| 2022/0156353 A1 | 5/2022 | Duffy et al. | |
| 2022/0179497 A1 | 6/2022 | Jung et al. | |
| 2022/0240408 A1 | 7/2022 | Faulkner et al. | |
| 2022/0253146 A1 | 8/2022 | Erivantcev et al. | |
| 2022/0276780 A1 | 9/2022 | Ko et al. | |
| 2022/0291753 A1 | 9/2022 | Erivantcev et al. | |
| 2022/0326779 A1 | 10/2022 | Chung et al. | |
| 2022/0374085 A1 | 11/2022 | Nguyen et al. | |
| 2023/0024627 A1 | 1/2023 | Bernstein et al. | |
| 2023/0052490 A1 | 2/2023 | Chaudhri et al. | |
| 2023/0072423 A1 | 3/2023 | Osborn et al. | |
| 2023/0074476 A1 | 3/2023 | Bae et al. | |
| 2023/0090410 A1 | 3/2023 | Sharma et al. | |
| 2023/0113991 A1 | 4/2023 | Ang et al. | |
| 2023/0131489 A1 | 4/2023 | Marzorati et al. | |
| 2023/0177870 A1 | 6/2023 | Chao et al. | |
| 2023/0179700 A1 | 6/2023 | Bhatt | |
| 2023/0195237 A1 | 6/2023 | Nguyen et al. | |
| 2023/0214089 A1 | 7/2023 | Yang et al. | |
| 2023/0252737 A1 | 8/2023 | Dreyer et al. | |
| 2023/0259207 A1 | 8/2023 | Lam et al. | |
| 2023/0270363 A1 | 8/2023 | Qazi et al. | |
| 2023/0335139 A1 | 10/2023 | Breton et al. | |
| 2023/0376268 A1 | 11/2023 | Carrigan et al. | |
| 2024/0061513 A1 | 2/2024 | Reisman et al. | |
| 2024/0085992 A1 | 3/2024 | Bernstein et al. | |
| 2024/0094819 A1 | 3/2024 | Nie et al. | |
| 2024/0220009 A1 | 7/2024 | Dryer et al. | |
| 2024/0310982 A1 | 9/2024 | Chaudhri et al. | |
| 2024/0370093 A1 | 11/2024 | Nie et al. | |
| 2024/0385691 A1 | 11/2024 | Nie et al. | |
| 2025/0047777 A1 | 2/2025 | Bhatt | |
| 2025/0085791 A1 | 3/2025 | Bernstein et al. | |
| 2025/0094021 A1 | 3/2025 | Yang et al. | |

FOREIGN PATENT DOCUMENTS

| | | |
|---|---|---|
| CN | 1705346 A | 12/2005 |
| CN | 101243383 A | 8/2008 |
| CN | 101427574 A | 5/2009 |
| CN | 101433034 A | 5/2009 |
| CN | 202309894 U | 7/2012 |
| CN | 102830795 A | 12/2012 |
| CN | 102833345 A | 12/2012 |
| CN | 103415084 A | 11/2013 |
| CN | 103778082 A | 5/2014 |
| CN | 103839023 A | 6/2014 |
| CN | 103914238 A | 7/2014 |
| CN | 103970208 A | 8/2014 |
| CN | 104024987 A | 9/2014 |
| CN | 203930358 U | 11/2014 |
| CN | 104205785 A | 12/2014 |
| CN | 104272854 A | 1/2015 |
| CN | 104281430 A | 1/2015 |
| CN | 104346297 A | 2/2015 |
| CN | 104423581 A | 3/2015 |
| CN | 104956182 A | 9/2015 |
| CN | 105208511 A | 12/2015 |
| CN | 105388998 A | 3/2016 |
| CN | 105657465 A | 6/2016 |
| CN | 105959906 A | 9/2016 |
| CN | 106060772 A | 10/2016 |
| CN | 103914238 B | 2/2017 |
| CN | 106797415 A | 5/2017 |
| CN | 106851528 A | 6/2017 |
| CN | 106936929 A | 7/2017 |
| CN | 107637073 A | 1/2018 |
| CN | 107683470 A | 2/2018 |
| CN | 107852572 A | 3/2018 |
| CN | 107949879 A | 4/2018 |
| CN | 108289239 A | 7/2018 |
| CN | 108292203 A | 7/2018 |
| CN | 108958608 A | 12/2018 |
| CN | 208188782 U | 12/2018 |
| CN | 109347581 A | 2/2019 |
| CN | 109461462 A | 3/2019 |
| CN | 109584879 A | 4/2019 |
| CN | 109584879 B | 7/2021 |
| CN | 108958608 B | 7/2022 |
| EP | 0836074 A2 | 4/1998 |
| EP | 1406176 A1 | 4/2004 |
| EP | 1614992 A1 | 1/2006 |
| EP | 1705883 A1 | 9/2006 |
| EP | 1858238 A2 | 11/2007 |
| EP | 1953663 A1 | 8/2008 |
| EP | 2096413 A1 | 9/2009 |
| EP | 2290583 A1 | 3/2011 |
| EP | 2306692 A1 | 4/2011 |
| EP | 2367098 A2 | 9/2011 |
| EP | 2428947 A2 | 3/2012 |
| EP | 2466260 A1 | 6/2012 |
| EP | 2523439 A1 | 11/2012 |
| EP | 2565765 A1 | 3/2013 |

(56) References Cited

FOREIGN PATENT DOCUMENTS

| | | |
|---|---|---|
| EP | 2629483 A1 | 8/2013 |
| EP | 2632131 A1 | 8/2013 |
| EP | 1614992 B1 | 10/2013 |
| EP | 2698686 A2 | 2/2014 |
| EP | 2703972 A1 | 3/2014 |
| EP | 2720442 A1 | 4/2014 |
| EP | 2813921 A1 | 12/2014 |
| EP | 2892240 A1 | 7/2015 |
| EP | 2980715 A1 | 2/2016 |
| EP | 2999208 A1 | 3/2016 |
| EP | 3001282 A1 | 3/2016 |
| EP | 3032537 A2 | 6/2016 |
| EP | 3057342 A1 | 8/2016 |
| EP | 3073703 A1 | 9/2016 |
| EP | 3125097 A2 | 2/2017 |
| EP | 3276905 A1 | 1/2018 |
| EP | 3379853 A1 | 9/2018 |
| GB | 0412212 | 7/2004 |
| GB | 2402105 A | 12/2004 |
| JP | 11-183183 A | 7/1999 |
| JP | 2000-163031 A | 6/2000 |
| JP | 2001-216069 A | 8/2001 |
| JP | 2001-309455 A | 11/2001 |
| JP | 2002-342033 A | 11/2002 |
| JP | 2006-209563 A | 8/2006 |
| JP | 2009-502048 A | 1/2009 |
| JP | 2011-217000 A | 10/2011 |
| JP | 2013-146557 A | 8/2013 |
| JP | 2014-53692 A | 3/2014 |
| JP | 2014-123169 A | 7/2014 |
| JP | 2014-143575 A | 8/2014 |
| JP | 2015-61318 A | 3/2015 |
| JP | 2016-13151 A | 1/2016 |
| JP | 2017-34563 A | 2/2017 |
| JP | 2017-143357 A | 8/2017 |
| JP | 2018-113544 A | 7/2018 |
| JP | 2018-147265 A | 9/2018 |
| JP | 2018-536933 A | 12/2018 |
| KR | 10-2016-0000330 A | 1/2016 |
| KR | 10-2016-0092363 A | 8/2016 |
| KR | 10-2017-0027435 A | 3/2017 |
| KR | 10-2017-0032471 A | 3/2017 |
| KR | 10-2017-0082022 A | 7/2017 |
| KR | 10-2017-0124954 A | 11/2017 |
| KR | 10-2019-0020850 A | 3/2019 |
| KR | 10-2019-0022883 A | 3/2019 |
| TW | 201012152 A | 3/2010 |
| TW | 201215086 A | 4/2012 |
| TW | M474482 U | 3/2014 |
| TW | 201509168 A | 3/2015 |
| WO | 2007/008321 A2 | 1/2007 |
| WO | 2007/105937 A1 | 9/2007 |
| WO | 2007/142703 A1 | 12/2007 |
| WO | 2007/149731 A1 | 12/2007 |
| WO | 2009/137419 A2 | 11/2009 |
| WO | 2009/140095 A2 | 11/2009 |
| WO | 2011/063516 A1 | 6/2011 |
| WO | 2012/138663 A2 | 10/2012 |
| WO | 2012/172970 A1 | 12/2012 |
| WO | 2013/169849 A2 | 11/2013 |
| WO | 2013/169875 A2 | 11/2013 |
| WO | 2014/117125 A1 | 7/2014 |
| WO | 2014/171734 A2 | 10/2014 |
| WO | 2015/060856 A1 | 4/2015 |
| WO | 2015/061831 A1 | 5/2015 |
| WO | 2015/065402 A1 | 5/2015 |
| WO | 2015/119637 A1 | 8/2015 |
| WO | 2015/121100 A1 | 8/2015 |
| WO | 2015/185123 A1 | 12/2015 |
| WO | 2016/022203 A1 | 2/2016 |
| WO | 2016/022205 A1 | 2/2016 |
| WO | 2016/036472 A1 | 3/2016 |
| WO | 2016/036541 A2 | 3/2016 |
| WO | 2016/053459 A1 | 4/2016 |
| WO | 2016/200603 A1 | 12/2016 |
| WO | 2016/204186 A1 | 12/2016 |
| WO | 2017/062621 A1 | 4/2017 |
| WO | 2017/112003 A1 | 6/2017 |
| WO | 2018/032085 A1 | 2/2018 |
| WO | 2018/048510 A1 | 3/2018 |
| WO | 2018/084802 A1 | 5/2018 |
| WO | 2018/098136 A1 | 5/2018 |
| WO | 2019/173136 A1 | 9/2019 |
| WO | 2019/200350 A1 | 10/2019 |
| WO | 2019/217086 A2 | 11/2019 |
| WO | 2020/063762 A | 4/2020 |
| WO | 2021/006903 A1 | 1/2021 |

OTHER PUBLICATIONS

Applicant Initiated Interview Summary received for U.S. Appl. No. 17/746,807, mailed on Jun. 9, 2023, 2 pages.
Applicant-Initiated Interview Summary received for U.S. Appl. No. 16/773,536, mailed on Mar. 26, 2021, 4 pages.
Applicant-Initiated Interview Summary received for U.S. Appl. No. 17/975,141, mailed on Aug. 30, 2023, 4 pages.
Corrected Notice of Allowance received for U.S. Appl. No. 17/509,356, mailed on Jun. 13, 2023, 2 pages.
Corrected Notice of Allowance received for U.S. Appl. No. 17/950,943, mailed on Jul. 10, 2023, 2 pages.
Intention to Grant received for European Patent Application No. 16708003.5, mailed on Jun. 14, 2023, 9 pages.
Intention to Grant received for European Patent Application No. 20729346.5, mailed on Jul. 10, 2023, 9 pages.
International Preliminary Report on Patentability received for PCT Patent Application No. PCT/US2018/038823, mailed on Jan. 23, 2020, 20 pages.
International Search Report and Written Opinion received for PCT Patent Application No. PCT/US2018/038823, mailed on Oct. 23, 2018, 30 pages.
International Search Report and Written Opinion received for PCT Patent Application No. PCT/US2023/012260, mailed on Aug. 2, 2023, 22 pages.
Invitation to Pay Additional Fees and Partial International Search Report received for PCT Patent Application No. PCT/US2023/012260, mailed on Jun. 7, 2023, 11 pages.
Invitation to Pay Additional Fees received for PCT Patent Application No. PCT/US2018/038823, mailed on Sep. 5, 2018, 22 pages.
Minutes of the Oral Proceedings received for European Patent Application No. 20729346.5, mailed on Jul. 4, 2023, 6 pages.
Non-Final Office Action received for U.S. Appl. No. 15/937,716, mailed on Apr. 22, 2019, 28 pages.
Non-Final Office Action received for U.S. Appl. No. 16/773,536, mailed on Dec. 18, 2020, 19 pages.
Office Action received for U.S. Appl. No. 17/746,807, mailed on Jul. 20, 2023, 14 pages.
Office Action received for U.S. Appl. No. 17/975,141, mailed on Jul. 6, 2023, 22 pages.
Of Allowance received for U.S. Appl. No. 15/937,716, mailed on Oct. 23, 2019, 19 pages.
Of Allowance received for U.S. Appl. No. 16/773,536, mailed on Apr. 8, 2021, 16 pages.
Of Allowance received for U.S. Appl. No. 17/383,880, mailed on Aug. 29, 2022, 17 pages.
Of Allowance received for U.S. Appl. No. 17/383,880, mailed on Jun. 20, 2022, 17 pages.
Of Allowance received for U.S. Appl. No. 17/950,943, mailed on Jul. 5, 2023, 18 pages.
Nishiya et al., "Gesture Estimation Using Deep Learning from PPG Signal", Information Processing Society of Japan Kansai Branch Convention Proceedings [online], Japan, Information Processing Society of Japan, Available on http:id.nii.ac.jp/1001/0020708, 2020, 4 pages (Official Copy only) See Communication Under Rule 37 CFR § 1.98(a) (3).
Office Action received for European Patent Application No. 20720310.0, mailed on Jul. 25, 2023, 11 pages.
Office Action received for European Patent Application No. 22729964.1, mailed on May 22, 2023, 9 pages.

(56) References Cited

OTHER PUBLICATIONS

Office Action received for Japanese Patent Application No. 2023-513867, mailed on Jul. 31, 2023, 11 pages (5 pages of English Translation and 6 pages of Official Copy).
Result of Consultation received for European Patent Application No. 20729346.5, mailed on Jun. 21, 2023, 3 pages.
Zhang et al., "FinDroidHR: Smartwatch Gesture Input with Optical Heartrate Monitor", Proceedings of the ACM on Interactive Mobile, Wearable and Ubiquitous Technologies, Available Online at: https://dl.acm.org/doi/10.1145/3191788, vol. 2, No. 1, Mar. 2018, 42 pages.
Applicant-Initiated Interview Summary received for U.S. Appl. No. 17/746,807, mailed on Nov. 3, 2023, 2 pages.
Applicant-Initiated Interview Summary received for U.S. Appl. No. 17/747,613, mailed on Dec. 14, 2023, 2 pages.
Applicant-Initiated Interview Summary received for U.S. Appl. No. 18/088,309, mailed on Oct. 27, 2023, 2 pages.
Applicant-Initiated Interview Summary received for U.S. Appl. No. 18/109,808, mailed on Nov. 22, 2023, 5 pages.
Applicant-Initiated Interview Summary received for U.S. Appl. No. 18/109,808, mailed on Sep. 25, 2023, 5 pages.
Decision to Grant received for European Patent Application No. 16708003.5, mailed on Oct. 19, 2023, 2 pages.
To Grant received for European Patent Application No. 20729346.5, mailed on Nov. 16, 2023, 2 pages.
Final Office Action received for U.S. Appl. No. 18/109,808, mailed on Oct. 31, 2023, 54 pages.
Intention to Grant received for European Patent Application No. 19722280.5, mailed on Sep. 26, 2023, 9 pages.
International Preliminary Report on Patentability received for PCT Patent Application No. PCT/US2022/030021, mailed on Nov. 30, 2023, 14 pages.
International Search Report and Written Opinion received for PCT Patent Application No. PCT/US2023/022410, mailed on Aug. 31, 2023, 21 pages.
Office Action received for U.S. Appl. No. 17/410,169, mailed on Dec. 5, 2023, 48 pages.
Office Action received for U.S. Appl. No. 17/747,613, mailed on Nov. 16, 2023, 28 pages.
Office Action received for U.S. Appl. No. 18/088,309, mailed on Sep. 21, 2023, 11 pages.
Office Action received for U.S. Appl. No. 18/109,808, mailed on Sep. 12, 2023, 49 pages.
Office Action received for U.S. Appl. No. 18/122,625, mailed on Nov. 15, 2023, 14 pages.
Of Allowance received for U.S. Appl. No. 17/950,943, mailed on Oct. 20, 2023, 18 pages.
Of Allowance received for U.S. Appl. No. 17/975,141, mailed on Dec. 7, 2023, 10 pages.
Office Action received for Australian Patent Application No. 2023201920, mailed on Nov. 10, 2023, 2 pages.
Office Action received for European Patent Application No. 20746429.8, mailed on Sep. 20, 2023, 10 pages.
Office Action received for Japanese Patent Application No. 2022-149476, mailed on Nov. 2, 2023, 9 pages (4 pages of English Translation and 5 pages of Official Copy).
Office Action received for Japanese Patent Application No. 2023-513867, mailed on Dec. 4, 2023, 6 pages (3 pages of English Translation and 3 pages of Official Copy).
Summons to Attend Oral Proceedings received for European Patent Application No. 22729964.1, mailed on Nov. 6, 2023, 7 pages.
3C Blogger Kisplay Share, Samsung Galaxy Tab S Hands-on SideSync 3.0 Is Amazing, http://www.samsung.com/tw/article/galaxy-tab-s-blogger-kisplay., Jul. 4, 2014, 4 pages.
Axiang's Network Notebook, Deep Analysis on Samsung's 2013 New Flagship: tell you what kind of mobile phone Galaxy S4 is!, available at: https://axiang.cc/archives/6115, Apr. 22, 2013, 4 pages.
GT-19500(Galaxy S4) User Manual, Samsung, Rev.1.1, http://org.downloadcenter.samsung.com/downloadfile/ContentsFile.aspx?CDSite=UNI_TW&CttFileID=5406113&CDCttType=UM&ModelType=N&ModelName=GTI9500&VPath=UM/201305/20130520173017063/GTI9500UM_Open_Taiwan_Jellybean_Chi_Rev.1.1_130520.pdf., May 2013, 14 pages.
Notice of Allowance received for Taiwanese Patent Application No. 104107328, mailed on Jun. 12, 2017, 3 pages.
Notice of Allowance received for Taiwanese Patent Application No. 104128700, mailed on Mar. 27, 2017, 3 pages.
Notice of Allowance received for Taiwanese Patent Application No. 104133757, mailed on Jan. 18, 2017, 3 pages.
Office Action received for Chinese Patent Application No. 201620119869.2, mailed on Nov. 22, 2016, 2 pages.
Nozawa Naoki et al., "iPad Perfect Manual for IOS 4", JPN, SOTEC Ltd., YANAGISAWA Junichi, Dec. 31, 2010, pp. 189-190.
3C Blogger Kisplay Share, Samsung Galaxy Tab S Hands-on SideSync 3.0 Is Amazing, http://www.samsung.com/tw/article/galaxy-tab-s-blogger-kisplay, Jul. 4, 2014, 4 pages. (Official Copy Only) (See Communication Under Rule 37 CFR § 1.98(a) (3)).
Advisory Action received for U.S. Appl. No. 14/863,099, mailed on Sep. 8, 2016, 3 pages.
Apple Previews Powerful Software Updates Designed for People With Disabilities, Available online at: https://www.apple.com/newsroom/2021/05/apple-previews-powerful-software-updates-designed-for-people-with-disabilities/, May 19, 2021, 10 pages.
Applicant Initiated Interview Summary received for U.S. Appl. No. 14/973,573, mailed on Jul. 10, 2017, 3 pages.
Applicant Initiated Interview Summary received for U.S. Appl. No. 16/583,994, mailed on Apr. 3, 2020, 5 pages.
Applicant Initiated Interview Summary received for U.S. Appl. No. 17/188,228, mailed on Jun. 14, 2022, 9 pages.
Applicant Initiated Interview Summary received for U.S. Appl. No. 17/746,807, mailed on Mar. 31, 2023, 2 pages.
Applicant-Initiated Interview Summary received for U.S. Appl. No. 16/144,264, mailed on Jul. 22, 2020, 5 pages.
Applicant-Initiated Interview Summary received for U.S. Appl. No. 16/147,523, mailed on Apr. 27, 2020, 3 pages.
Applicant-Initiated Interview Summary received for U.S. Appl. No. 16/147,523, mailed on Dec. 10, 2021, 4 pages.
Applicant-Initiated Interview Summary received for U.S. Appl. No. 16/147,523, mailed on Jun. 13, 2022, 4 pages.
Applicant-Initiated Interview Summary received for U.S. Appl. No. 16/147,523, mailed on Oct. 26, 2020, 3 pages.
Applicant-Initiated Interview Summary received for U.S. Appl. No. 16/147,523, mailed on Sep. 14, 2021, 3 pages.
Applicant-Initiated Interview Summary received for U.S. Appl. No. 16/281,838, mailed on Jun. 2, 2020, 5 pages.
Applicant-Initiated Interview Summary received for U.S. Appl. No. 16/583,981, mailed on Mar. 9, 2020, 5 pages.
Applicant-Initiated Interview Summary received for U.S. Appl. No. 16/583,981, mailed on Sep. 14, 2020, 6 pages.
Applicant-Initiated Interview Summary received for U.S. Appl. No. 16/583,994, mailed on May 28, 2021, 5 pages.
Applicant-Initiated Interview Summary received for U.S. Appl. No. 16/583,994, mailed on Nov. 24, 2020, 4 pages.
Applicant-Initiated Interview Summary received for U.S. Appl. No. 16/653,857, mailed on Dec. 14, 2020, 3 pages.
Applicant-Initiated Interview Summary received for U.S. Appl. No. 16/653,857, mailed on May 3, 2021, 4 pages.
Applicant-Initiated Interview Summary received for U.S. Appl. No. 16/679,967, mailed on Feb. 10, 2022, 2 pages.
Applicant-Initiated Interview Summary received for U.S. Appl. No. 16/679,967, mailed on Jun. 1, 2022, 2 pages.
Applicant-Initiated Interview Summary received for U.S. Appl. No. 16/679,967, mailed on Oct. 25, 2021, 2 pages.
Applicant-Initiated Interview Summary received for U.S. Appl. No. 16/723,583, mailed on Dec. 28, 2020, 6 pages.
Applicant-Initiated Interview Summary received for U.S. Appl. No. 16/749,929, mailed on Oct. 13, 2020, 4 pages.
Applicant-Initiated Interview Summary received for U.S. Appl. No. 17/041,350, mailed on Aug. 18, 2021, 2 pages.
Applicant-Initiated Interview Summary received for U.S. Appl. No. 17/041,350, mailed on Feb. 2, 2022, 2 pages.
Applicant-Initiated Interview Summary received for U.S. Appl. No. 17/188,228, mailed on Sep. 23, 2022, 2 pages.

(56) References Cited

OTHER PUBLICATIONS

Applicant-Initiated Interview Summary received for U.S. Appl. No. 17/314,948, mailed on Oct. 21, 2022, 6 pages.
Applicant-Initiated Interview Summary received for U.S. Appl. No. 17/410,169, mailed on Apr. 25, 2023, 6 pages.
Applicant-Initiated Interview Summary received for U.S. Appl. No. 17/410,169, mailed on Nov. 7, 2022, 5 pages.
Applicant-Initiated Interview Summary received for U.S. Appl. No. 17/509,356, mailed on Feb. 3, 2023, 3 pages.
Axiang's Network Notebook, Deep Analysis on Samsung's 2013 New Flagship: tell you what kind of mobile phone Galaxy S4 is!, available at: https://axiang.cc/archives/6115, Apr. 22, 2013, 4 pages. (Official Copy Only) (See Communication Under Rule 37 CFR § 1.98(a) (3)).
Brief Communication regarding Oral Proceedings received for European Patent Application No. 16708003.5, mailed on May 8, 2023, 1 pages.
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Brief Communication regarding Oral Proceedings received for European Patent Application No. 20192404.0, mailed on May 4, 2022, 3 pages.
Brief Communication regarding Oral Proceedings received for European Patent Application No. 20192404.0, mailed on May 18, 2023, 1 pages.
Corrected Notice of Allowance received for U.S. Appl. No. 14/641,251, mailed on Jun. 17, 2016, 2 pages.
Corrected Notice of Allowance received for U.S. Appl. No. 14/839,897, mailed on Jan. 213, 2019, 6 pages.
Corrected Notice of Allowance received for U.S. Appl. No. 14/839,903, mailed on Feb. 13, 2019, 2 pages.
Corrected Notice of Allowance received for U.S. Appl. No. 14/839,903, mailed on Mar. 1, 2019, 2 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 16/281,838, mailed on Oct. 30, 2020, 2 pages.
Corrected Notice of Allowance received for U.S. Appl. No. 16/583,981, mailed on Apr. 6, 2021, 3 pages.
Corrected Notice of Allowance received for U.S. Appl. No. 16/583,981, mailed on May 17, 2021, 3 pages.
Corrected Notice of Allowance received for U.S. Appl. No. 16/583,994, mailed on Jul. 6, 2021, 3 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Corrected Notice of Allowance received for U.S. Appl. No. 17/509,356, mailed on May 24, 2023, 2 pages.
Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision on Appeal received for Danish Patent Application No. PA201570664, mailed on Feb. 20, 2017., 2 pages.
Decision on Appeal received for Danish Patent Application No. PA201570788, mailed on Jul. 10, 2017, 2 pages.
Decision on Appeal received for Danish Patent Application No. PA201570791, mailed on Jun. 7, 2017, 2 pages.
Decision on Appeal received for Danish Patent Application No. PA201570609, mailed on May 3, 2021, 2 pages.
Decision to Grant received for European Patent Application No. 15712218.5, mailed on Jun. 7, 2018, 2 pages.
Decision to Grant received for European Patent Application No. 15787091.6, mailed on Dec. 3, 2020, 2 pages.
Decision to Refuse received for European Patent Application No. 17184710.6, mailed on Jun. 16, 2020, 9 pages.
Decision to Refuse received for European Patent Application No. 20192404.0, mailed on Jun. 14, 2022, 15 pages.
European Search Report received for European Patent Application No. 20192404.0, mailed on Nov. 20, 2020, 4 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Final Office Action received for U.S. Appl. No. 14/774,664, mailed on Aug. 25, 2017, 23 pages.
Final Office Action received for U.S. Appl. No. 14/839,897, mailed on Jan. 10, 2018, 16 pages.
Office Action received for U.S. Appl. No. 14/863,099, mailed on Apr. 21, 2016, 20 pages.
Final Office Action received for U.S. Appl. No. 15/268,115, mailed on Oct. 11, 2017., 48 pages.
Final Office Action received for U.S. Appl. No. 16/147,523, mailed on Aug. 4, 2020, 15 pages.
Final Office Action received for U.S. Appl. No. 16/147,523, mailed on Oct. 14, 2021, 22 pages.
Final Office Action received for U.S. Appl. No. 16/583,981, mailed on Apr. 16, 2020, 19 pages.
Final Office Action received for U.S. Appl. No. 16/583,994, mailed on Jul. 23, 2020, 16 pages.
Final Office Action received for U.S. Appl. No. 16/653,857, mailed on Feb. 10, 2021, 43 pages.
Final Office Action received for U.S. Appl. No. 16/679,967, mailed on Nov. 10, 2021, 14 pages.
Final Office Action received for U.S. Appl. No. 16/723,583, mailed on Feb. 5, 2021, 15 pages.
Final Office Action received for U.S. Appl. No. 17/041,350, mailed on Sep. 17, 2021, 25 pages.
Final Office Action received for U.S. Appl. No. 17/188,228, mailed on Jul. 6, 2022, 13 pages.
Final Office Action received for U.S. Appl. No. 17/314,948, mailed on Mar. 7, 2023, 31 pages.
Final Office Action received for U.S. Appl. No. 17/410,169, mailed on Feb. 6, 2023, 47 pages.
Final Office Action received for U.S. Appl. No. 17/746,807, mailed on Apr. 26, 2023, 16 pages.
Final Office Action received for U.S. Appl. No. 14/839,903, mailed on Sep. 18, 2018, 11 pages.
Final Office Action received for U.S. Appl. No. 15/135,328 mailed on Nov. 9, 2018, 55 pages.
Final Office Action received for U.S. Appl. No. 14/616,573 mailed Mar. 10, 2017, 5 pages.
GT-19500(Galaxy S4) User Manual, Samsung, Rev.1.1, http://org.downloadcenter.samsung.com/downloadfile/ContentsFile.aspx?CDSite=UNI_TW&CttFileID=5406113&CDCttType=UM&Modeltype=N&ModelName=GTI9500& VPath=UM/201305/20130520173017063/GTI9500_UM_Open_Taiwan_Jellybean_Chi_Rev.1.1_130520.pdf., May 2013, 14 pages. (Official Copy Only) (See Communication Under Rule 37 CFR § 1.98(a) (3)).
Intention to Grant received for Danish Patent Application No. PA201570773, mailed on Mar. 9, 2018, 2 pages.
Intention to Grant received for Danish Patent Application No. PA201570788, mailed on Mar. 27, 2017., 2 pages.
Intention to Grant received for Danish Patent Application No. PA201570791, mailed on Mar. 7, 2017., 2 pages.
Intention to Grant received for Danish Patent Application No. PA202070609, mailed on Jan. 14, 2021, 2 pages.
Intention to Grant received for European Patent Application No. 15712218.5, mailed on Jan. 24, 2018, 7 pages.
Intention to Grant received for European Patent Application No. 15787091.6, mailed on Apr. 23, 2020, 7 pages.
Intention to Grant received for European Patent Application No. 15787091.6, mailed on Sep. 30, 2020, 7 pages.

(56) References Cited

OTHER PUBLICATIONS

International Preliminary Report on Patentability received for PCT Patent Application No. PCT/US2014/027882, mailed on Sep. 24, 2015, 8 pages.
International Preliminary Report on Patentability received for PCT Patent Application No. PCT/US2015/019298, mailed on Mar. 16, 2017., 12 pages.
International Preliminary Report on Patentability received for PCT Patent Application No. PCT/US2015/041424, mailed on Feb. 2, 2017., 13 Pages.
International Preliminary Report on Patentability received for PCT Patent Application No. PCT/US2015/047507, mailed on Mar. 16, 2017, 16 pages.
International Preliminary Report on Patentability received for PCT Patent Application No. PCT/US2015/055165, mailed on Sep. 21, 2017, 15 pages.
International Preliminary Report on Patentability received for PCT Patent Application No. PCT/US2016/016621, mailed on Aug. 24, 2017, 8 pages.
International Preliminary Report on Patentability received for PCT Patent Application No. PCT/US2019/024792, mailed on Dec. 17, 2020, 9 pages.
International Preliminary Report on Patentability received for PCT Patent Application No. PCT/US2020/026044, mailed on Dec. 9, 2021, 18 pages.
International Preliminary Report on Patentability received for PCT Patent Application No. PCT/US2020/031536, mailed on Nov. 18, 2021, 11 pages.
International Preliminary Report on Patentability received for PCT Patent Application No. PCT/US2020/035446, mailed on Dec. 9, 2021, 14 pages.
International Search Report and written opinion received for PCT Application No. PCT/US2016/048582 mailed on Sep. 13, 2016, 11 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2016/016621, mailed on May 9, 2016, 12 pages.
International Search Report and Written Opinion received for PCT Patent Application No. PCT/US2019/024792, mailed on Jul. 18, 2019, 13 pages.
International Search Report and Written Opinion received for PCT Patent Application No. PCT/US2020/026044, mailed on Sep. 9, 2020, 26 pages.
International Search Report and Written Opinion received for PCT Patent Application No. PCT/US2020/031536, mailed on Sep. 23, 2020, 16 pages.
International Search Report and Written Opinion received for PCT Patent Application No. PCT/US2020/035446, mailed on Nov. 10, 2020, 20 pages.
International Search Report and Written Opinion received for PCT Patent Application No. PCT/US2022/030021, mailed on Nov. 9, 2022, 19 pages.
International Search Report and Written Opinion received for PCT Patent Application No. PCT/US2022/044236, mailed on Mar. 27, 2023, 17 pages.
International Search Report received for PCT Application No. PCT/US2015/042976 mailed on Aug. 18, 2015, 22 pages.
Invitation to Pay Additional Fees and Partial International Search Report received for PCT Patent Application No. PCT/US2022/030021, mailed on Sep. 15, 2022, 13 pages.
Invitation to Pay Additional Fees received for PCT Patent Application No. PCT/US2014/027882, mailed on Aug. 5, 2014, 2 pages.
Invitation to Pay Additional Fees received for PCT Patent Application No. PCT/US2020/026044, mailed on Jun. 25, 2020, 12 pages.
Invitation to Pay Additional Fees received for PCT Patent Application No. PCT/US2020/031536, mailed on Jul. 31, 2020, 9 pages.
To Pay Additional Fees received for PCT Patent Application No. PCT/US2020/035446, mailed on Sep. 11, 2020, 12 pages.
To Pay Search Fees received for European Patent Application No. 15753796.0, mailed on Mar. 24, 2020, 3 pages.
Office Action received for U.S. Appl. No. 16/679,967, mailed on Sep. 2, 2021, 12 pages.
Office Action received for U.S. Appl. No. 14/805,403, mailed on Nov. 16, 2017, 21 pages.
Office Action received for U.S. Appl. No. 14/616,573, mailed Jun. 16, 2016, 12 pages.
Office Action received for U.S. Appl. No. 14/616,573, mailed on Jun. 14, 2017, 13 pages.
Office Action received for U.S. Appl. No. 14/774,664, mailed on Mar. 7, 2017, 23 pages.
Office Action received for U.S. Appl. No. 14/839,897, mailed on May 18, 2017, 11 pages.
Office Action received for U.S. Appl. No. 14/839,903, mailed on Feb. 26, 2018, 10 pages.
Office Action received for U.S. Appl. No. 14/839,913, mailed on Jul. 28, 2016., 12 pages.
Office Action received for U.S. Appl. No. 14/863,099, mailed on Dec. 2, 2015, 12 pages.
Non-final Office Action received for U.S. Appl. No. 14/864,011, mailed on Jun. 10, 2016, 10 pages.
Non-Final Office Action received for U.S. Appl. No. 14/973,573, mailed on Apr. 20, 2017, 34 pages.
Non-Final Office Action received for U.S. Appl. No. 15/038,419, mailed Dec. 21, 2016, 13 pages.
Non-Final Office Action received for U.S. Appl. No. 15/135,328 mailed on Apr. 11, 2018, 64 pages.
Non-Final Office Action received for U.S. Appl. No. 15/268,115, mailed on Apr. 13, 2017, 44 pages.
Non-Final Office Action received for U.S. Appl. No. 15/433,238, mailed on Nov. 3, 2017, 6 pages.
Non-Final Office Action received for U.S. Appl. No. 16/144,264, mailed on May 1, 2020, 30 pages.
Non-Final Office Action received for U.S. Appl. No. 16/147,523, mailed on Apr. 26, 2022, 22 pages.
Non-Final Office Action received for U.S. Appl. No. 16/147,523, mailed on Dec. 27, 2019, 11 pages.
Non-Final Office Action received for U.S. Appl. No. 16/147,523, mailed on Jul. 21, 2021, 20 pages.
Non-Final Office Action received for U.S. Appl. No. 16/281,838, mailed on Mar. 26, 2020, 18 pages.
Non-Final Office Action received for U.S. Appl. No. 16/407,584, mailed on Jul. 10, 2019, 8 pages.
Non-Final Office Action received for U.S. Appl. No. 16/583,981, mailed on Dec. 6, 2019, 14 pages.
Non-Final Office Action received for U.S. Appl. No. 16/583,994, mailed on Dec. 23, 2020, 17 pages.
Office Action received for U.S. Appl. No. 16/583,994, mailed on Dec. 30, 2019, 14 pages.
Office Action received for U.S. Appl. No. 16/653,857, mailed on Jul. 9, 2020, 35 pages.
Office Action received for U.S. Appl. No. 16/653,857, mailed on Jul. 22, 2021, 45 pages.
Office Action received for U.S. Appl. No. 16/679,967, mailed on Apr. 19, 2022, 13 pages.
Non-Final Office Action received for U.S. Appl. No. 16/723,583, mailed on Aug. 13, 2020, 13 pages.
Non-Final Office Action received for U.S. Appl. No. 16/749,929, mailed on May 13, 2020, 11 pages.
Non-Final Office Action received for U.S. Appl. No. 17/041,350, mailed on Jun. 10, 2021, 24 pages.
Non-Final Office Action received for U.S. Appl. No. 17/188,228, mailed on Dec. 21, 2021, 14 pages.
Non-Final Office Action received for U.S. Appl. No. 17/314,948, mailed on Aug. 1, 2022, 33 pages.

(56) References Cited

OTHER PUBLICATIONS

Non-Final Office Action received for U.S. Appl. No. 17/410,169, mailed on Sep. 16, 2022, 42 pages.
Non-Final Office Action received for U.S. Appl. No. 17/509,356, mailed on Dec. 22, 2022, 16 pages.
Non-Final Office Action received for U.S. Appl. No. 17/746,807, mailed on Feb. 2, 2023, 14 pages.
Notice of Acceptance received for Australian Patent Application No. 2015385757, mailed on Jul. 16, 2018, 3 pages.
Notice of Acceptance received for Australian Patent Application No. 2016218318, mailed on Jul. 3, 2019, 3 pages.
Notice of Acceptance received for Australian Patent Application No. 2018247345, mailed on May 15, 2019, 3 pages.
Notice of Acceptance received for Australian Patent Application No. 2020239670, mailed on Jul. 2, 2021, 3 pages.
Notice of Acceptance received for Australian Patent Application No. 2020285524, mailed on Dec. 17, 2021, 3 pages.
Notice of Acceptance received for Australian Patent Application No. 2021250863, mailed on Jan. 13, 2023, 3 pages.
Notice of Acceptance received for Australian Patent Application No. 2022201369, mailed on Mar. 17, 2022, 3 pages.
Notice of Acceptance received for Australian Patent Application No. 2022204555, mailed on May 11, 2023, 3 pages.
Notice of Allowance received for Chinese Patent Application No. 201580046237.6, mailed on Aug. 29, 2018, 4 pages (1 page of English Translation and 3 pages of Official copy).
Notice of Allowance received for Chinese Patent Application No. 201580077218.X, mailed on Nov. 13, 2020, 2 pages (1 page of English Translation and 1 page of Official Copy).
Notice of Allowance received for Chinese Patent Application No. 201610084974.1, mailed on Aug. 5, 2019, 2 pages (1 page of English Translation and 1 page of Official Copy).
Notice of Allowance received for Chinese Patent Application No. 201710657424.9, mailed on May 8, 2020, 2 pages (1 page of English Translation and 1 page of Official Copy).
Notice of Allowance received for Chinese Patent Application No. 201810321928.8, mailed on Sep. 11, 2019, 2 pages (1 page of English Translation and 1 page of Official Copy).
Notice of Allowance received for Chinese Patent Application No. 201910990432.4, mailed on Apr. 27, 2021, 2 pages (1 page of English Translation and 1 page of Official Copy).
Notice of Allowance received for Chinese Patent Application No. 201980036737.X, mailed on Apr. 20, 2021, 10 pages (5 pages of English Translation and 5 pages of Official Copy).
Notice of Allowance received for Chinese Patent Application No. 202080039642.6, mailed on Apr. 17, 2023, 6 pages (2 pages of English Translation and 4 pages of Official Copy).
Notice of Allowance received for Chinese Patent Application No. 202110011509.6, mailed on Mar. 2, 2022, 2 pages (1 page of English Translation and 1 page of Official Copy).
Notice of Allowance received for Chinese Patent Application No. 202111612841.4, mailed on Jan. 5, 2023, 3 pages (2 pages of English Translation & 1 page of Official Copy).
Notice of Allowance received for Danish Patent Application No. PA201570771, mailed on Sep. 2, 2016, 2 pages.
Notice of Allowance received for Danish Patent Application No. PA201570773, mailed on Apr. 26, 2018, 2 pages.
Notice of Allowance received for Japanese Patent Application No. 2017-545733, mailed on Jun. 1, 2018, 4 pages (1 page of English Translation and 3 pages of Official copy).
Notice of Allowance received for Japanese Patent Application No. 2018-126311, mailed on Feb. 1, 2019, 4 pages (1 page of English Translation and 3 pages of Official copy).
Notice of Allowance received for Japanese Patent Application No. 2020-551465, mailed on Jun. 28, 2021, 4 pages (1 page of English Translation and 3 pages of Official Copy).
Notice of Allowance received for Japanese Patent Application No. 2021-122610, mailed on Aug. 5, 2022, 4 pages (1 page of English Translation and 3 pages of Official Copy).
Notice of Allowance received for Japanese Patent Application No. 2021-571464, mailed on May 30, 2022, 4 pages (1 page of English Translation and 3 pages of Official Copy).
Notice of Allowance received for Japanese Patent Application No. 2022-102840, mailed on Aug. 19, 2022, 4 pages (1 page of English Translation and 3 pages of Official Copy).
Notice of Allowance received for Japanese Patent Application No. 2022-139320, mailed on Jan. 6, 2023, 4 pages (1 page of English Translation and 3 pages of Official Copy).
Notice of Allowance received for Korean Patent Application No. 10-2020-7028759, mailed on Oct. 19, 2021, 4 pages (1 page of English Translation and 3 pages of Official Copy).
Notice of Allowance received for Korean Patent Application No. 10-2021-7039234, mailed on Dec. 20, 2021, 4 pages (1 page of English Translation and 3 pages of Official Copy).
Notice of Allowance received for Korean Patent Application No. 10-2022-7001721, mailed on Feb. 28, 2022, 5 pages (1 page of English Translation and 4 pages of Official Copy).
Notice of Allowance received for Korean Patent Application No. 10-2022-7008567, mailed on Jul. 4, 2022, 9 pages (2 pages of English Translation and 7 pages of Official Copy).
Notice of Allowance received for Taiwanese Patent Application No. 104107328, mailed on Jun. 12, 2017, 3 pages (Official Copy Only) (See Communication Under Rule 37 CFR § 1.98(a) (3)).
Notice of Allowance received for Taiwanese Patent Application No. 104123593, mailed on Oct. 1, 2018, 4 pages (1 pages of English Translation and 3 pages Official Copy).
Notice of Allowance received for Taiwanese Patent Application No. 104128700, mailed on Mar. 27, 2017, 3 pages (Official Copy only) (See Communication Under Rule 37 CFR § 1.98(a) (3)).
Notice of Allowance received for Taiwanese Patent Application No. 104133756, mailed on Nov. 30, 2017, 5 pages (2 pages of English Translation and 3 pages of Official Copy).
Notice of Allowance received for Taiwanese Patent Application No. 104133757, mailed on Jan. 18, 2017, 3 pages (Official Copy only) (See Communication Under Rule 37 CFR § 1.98(a) (3)).
Notice of Allowance received for U.S. Appl. No. 14/641,251, mailed on May 18, 2016, 13 pages.
Notice of Allowance received for U.S. Appl. No. 14/805,403, mailed on Jul. 11, 2018, 15 pages.
Notice of Allowance received for U.S. Appl. No. 14/839,897, mailed on Jun. 8, 2018, 11 pages.
Notice of Allowance received for U.S. Appl. No. 14/839,903, mailed on Jan. 3, 2019, 7 pages.
Notice of Allowance received for U.S. Appl. No. 14/839,913, mailed on Aug. 11, 2016, 5 pages.
Notice of Allowance received for U.S. Appl. No. 14/864,011, mailed on Apr. 28, 2016, 5 pages.
Notice of Allowance received for U.S. Appl. No. 14/973,573, mailed on Nov. 30, 201, 8 pages.
Notice of Allowance received for U.S. Appl. No. 15/038,419, mailed on Apr. 3, 2017, 10 pages.
Notice of Allowance received for U.S. Appl. No. 15/135,328, mailed on Jul. 1, 2019, 25 pages.
Notice of Allowance received for U.S. Appl. No. 15/268,115, mailed on Mar. 7, 2018, 15 pages.
Notice of Allowance received for U.S. Appl. No. 15/366,607, mailed on Apr. 2, 2019, 2 pages.
Notice of Allowance received for U.S. Appl. No. 15/366,607, mailed on Feb. 21, 2019, 9 pages.
Notice of Allowance received for U.S. Appl. No. 15/433,238, mailed on May 17, 2018, 7 pages.
Notice of Allowance received for U.S. Appl. No. 15/975,581, mailed on Oct. 3, 2018, 25 pages.
Notice of Allowance received for U.S. Appl. No. 16/144,264, mailed on Nov. 16, 2020, 10 pages.
Notice of Allowance received for U.S. Appl. No. 16/147,523, mailed on Aug. 4, 2022, 9 pages.
Notice of Allowance received for U.S. Appl. No. 16/147,523, mailed on Nov. 28, 2022, 8 pages.
Notice of Allowance received for U.S. Appl. No. 16/147,523, mailed on Oct. 4, 2022, 8 pages.

(56) References Cited

OTHER PUBLICATIONS

Notice of Allowance received for U.S. Appl. No. 16/281,838, mailed on Aug. 26, 2020, 9 pages.
Notice of Allowance received for U.S. Appl. No. 16/281,838, mailed on May 20, 2021, 9 pages.
Notice of Allowance received for U.S. Appl. No. 16/407,584, mailed on Oct. 28, 2019, 5 pages.
Notice of Allowance received for U.S. Appl. No. 16/583,981, mailed on Mar. 26, 2021, 10 pages.
Notice of Allowance received for U.S. Appl. No. 16/583,994, mailed on Jun. 24, 2021, 10 pages.
Notice of Allowance received for U.S. Appl. No. 16/653,857, mailed on Feb. 16, 2022, 34 pages.
Notice of Allowance received for U.S. Appl. No. 16/679,967, mailed on Jun. 15, 2022, 7 pages.
Notice of Allowance received for U.S. Appl. No. 16/679,967, mailed on Nov. 2, 2022, 7 pages.
Notice of Allowance received for U.S. Appl. No. 16/749,929, mailed on Dec. 16, 2020, 2 pages.
Notice of Allowance received for U.S. Appl. No. 16/749,929, mailed on Nov. 4, 2020, 5 pages.
Notice of Allowance received for U.S. Appl. No. 16/867,002, mailed on Aug. 20, 2021, 12 pages.
Notice of Allowance received for U.S. Appl. No. 16/867,002, mailed on Mar. 1, 2022, 7 pages.
Notice of Allowance received for U.S. Appl. No. 17/041,350, mailed on Feb. 24, 2022, 6 pages.
Notice of Allowance received for U.S. Appl. No. 17/188,228, mailed on Feb. 1, 2023, 5 pages.
Notice of Allowance received for U.S. Appl. No. 17/188,228, mailed on Oct. 19, 2022, 6 pages.
Notice of Allowance received for U.S. Appl. No. 17/509,356, mailed on Apr. 7, 2023, 11 pages.
Office Action received for Australian Patent Application No. 2015385757, mailed on Sep. 11, 2017, 3 pages.
Office Action received for Australian Patent Application No. 2016218318, mailed on Aug. 24, 2018, 5 pages.
Office Action received for Australian Patent Application No. 2016218318, mailed on Sep. 26, 2018, 3 pages.
Office Action received for Australian Patent Application No. 2018247345, mailed on May 6, 2019, 2 pages.
Office Action received for Australian Patent Application No. 2020239670, mailed on Mar. 3, 2021, 4 pages.
Office Action received for Australian Patent Application No. 2021250863, mailed on Oct. 6, 2022, 6 pages.
Office Action received for Australian Patent Application No. 2022204555, mailed on Feb. 17, 2023, 5 pages.
Office Action received for Chinese Patent Application No. 201580046237.6, mailed on Feb. 6, 2018, 10 pages (5 pages of English Translation and 5 pages of Official Copy).
Office Action received for Chinese Patent Application No. 201580077218.X, mailed on Feb. 3, 2020, 23 pages (8 pages of English Translation and 15 pages of Official Copy).
Office Action received for Chinese Patent Application No. 201610084974.1, mailed on Dec. 5, 2018, 6 pages (3 pages of English Translation and 3 pages of Official Copy).
Office Action received for Chinese Patent Application No. 201610084974.1, mailed on May 3, 2018, 12 pages (5 pages of English Translation and 7 pages of Official Copy).
Office Action received for Chinese Patent Application No. 201620119869.2, mailed on Jun. 3, 2016, 2 pages (1 page of English Translation and 1 page of Official copy).
Office Action received for Chinese Patent Application No. 201620119869.2, mailed on Nov. 22, 2016, 2 pages (Official Copy only) (See Communication Under Rule 37 CFR § 1.98(a) (3)).
Office Action received for Chinese Patent Application No. 201710657424.9, mailed on Sep. 17, 2019, 23 pages (11 pages of English Translation and 12 pages of Official Copy).
Office Action received for Chinese Patent Application No. 201810321928.8, mailed on Jul. 2, 2019, 10 pages (5 pages of English Translation and 5 pages of Official Copy).
Office Action received for Chinese Patent Application No. 201910990432.4, mailed on Dec. 28, 2020, 6 pages (3 pages of English Translation and 3 pages of Official Copy).
Office Action received for Chinese Patent Application No. 201910990432.4, mailed on May 18, 2020, 15 pages (9 pages of English Translation and 6 pages of Official Copy).
Office Action received for Chinese Patent Application No. 202080039642.6, mailed on Sep. 5, 2022, 12 pages (6 pages of English Translation and 6 pages of Official Copy).
Office Action received for Chinese Patent Application No. 202110011509.6, mailed on Oct. 11, 2021, 10 pages (5 pages of English Translation and 5 pages of Official Copy).
Office Action received for Chinese Patent Application No. 202111612841.4, mailed on Jul. 22, 2022, 13 pages (7 pages of English Translation and 6 pages of Official Copy).
Office Action received for Danish Patent Application No. PA201570664, mailed on Dec. 14, 2016, 2 pages.
Office Action received for Danish Patent Application No. PA201570664, mailed on Jun. 3, 2016, 3 pages.
Office Action received for Danish Patent Application No. PA201570771, mailed on Jun. 13, 2016, 3 pages.
Office Action received for Danish Patent Application No. PA201570773, mailed on Aug. 28, 2017, 3 pages.
Office Action received for Danish Patent Application No. PA201570773, mailed on Feb. 15, 2017, 3 pages.
Office Action received for Danish Patent Application No. PA201570773, mailed on Sep. 12, 2016, 3 pages.
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Sep. 6, 2016, 4 pages.
Office Action received for Danish Patent Application No. PA201670074, mailed on Jun. 28, 2016, 5 pages.
Office Action received for Danish Patent Application No. PA201670074, mailed on Mar. 16, 2017, 2 pages.
Office Action received for Danish Patent Application No. PA201970533, mailed on Apr. 20, 2021, 2 pages.
Office Action received for Danish Patent Application No. PA201970533, mailed on Jul. 17, 2020, 6 pages.
Office Action received for Danish Patent Application No. PA202070609, mailed on Dec. 10, 2020, 8 pages.
Office Action received for Danish Patent Application No. PA202070610, mailed on Jun. 18, 2021, 8 pages.
Office Action received for Danish Patent Application No. PA202070610, mailed on Mar. 14, 2022, 7 pages.
Office Action received for European Patent Application No. 15712218.5, mailed on Aug. 3, 2017, 4 pages.
Office Action received for European Patent Application No. 15753796.0, mailed on Aug. 4, 2020, 9 pages.
Office Action received for European Patent Application No. 15753796.0, mailed on Jun. 2, 2022, 2 pages.
Office Action received for European Patent Application No. 15787091.6, mailed on Aug. 2, 2019, 8 pages.
Office Action received for European Patent Application No. 15787091.6, mailed on Oct. 8, 2018, 7 pages.
Office Action received for European Patent Application No. 16708003.5, mailed on Feb. 22, 2021, 10 pages.
Office Action received for European Patent Application No. 17184710.6, mailed on Dec. 21, 2018, 7 pages.
Office Action received for European Patent Application No. 19722280.5, mailed on Oct. 4, 2021, 7 pages.
Office Action received for European Patent Application No. 20192404.0, mailed on Dec. 2, 2020, 8 pages.
Office Action received for European Patent Application No. 20192404.0, mailed on Jun. 8, 2021, 7 pages.
Office Action received for European Patent Application No. 20720310.0, mailed on Apr. 11, 2023, 8 pages.

(56) References Cited

OTHER PUBLICATIONS

Office Action received for European Patent Application No. 20720310.0, mailed on Oct. 4, 2022, 9 pages.
Office Action received for European Patent Application No. 20729346.5, mailed on Jan. 17, 2022, 8 pages.
Office Action received for European Patent Application No. 20729346.5, mailed on Jul. 28, 2022, 9 pages.
Office Action received for Indian Patent Application No. 202017041557, mailed on Dec. 8, 2021, 8 pages.
Office Action received for Japanese Patent Application No. 2018-126311, mailed on Nov. 2, 2018, 4 pages (2 pages of English Translation and 2 pages of official copy).
Office Action received for Japanese Patent Application No. 2017-545733, mailed on Feb. 13, 2018, 7 pages (3 pages of English Translation and 4 pages of Official Copy).
Office Action received for Korean Patent Application No. 10-2020-7028759, mailed on Jun. 29, 2021, 12 pages (5 pages of English Translation and 7 pages of Official Copy).
Office Action received for Korean Patent Application No. 10-2022-7008567, mailed on Mar. 28, 2022, 5 pages (2 pages of English Translation and 3 pages of Official Copy).
Office Action received for Taiwanese Patent Application No. 104123593, mailed on May 24, 2016, 57 pages (26 pages of English Translation and 31 pages of Official Copy).
Office Action received for Taiwanese Patent Application No. 104123593, mailed on Sep. 13, 2016, 8 pages (3 pages of English Translation and 5 pages of Official Copy).
Office Action received for Taiwanese Patent Application No. 104128700, mailed on Aug. 31, 2016, 13 pages (6 pages of English Translation and 7 pages of Official Copy).
Office Action received for Taiwanese Patent Application No. 104133756, issued on May 17, 2017, 13 pages (6 pages of English Translation and 7 pages of Official Copy).
Office Action received for Taiwanese Patent Application No. 104133757, issued on Jul. 6, 2016, 22 pages (9 pages of English Translation and 13 pages of Official Copy).
Office Action received for Taiwanese Patent Application No. 104107328, mailed on Dec. 28, 2016., 4 pages (1 page of Search Report and 3 pages of Official Copy).
Remote Shot for Smartwatch 2, Available online at:— https://play.google.com/store/apps/details?id=net.watea.sw2.rshot&hl=en, Nov. 21, 2017, 3 pages.
Result of Consultation received for European Patent Application No. 16708003.5, mailed on Apr. 18, 2023, 9 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Search Report and Opinion received for Danish Patent Application No. PA201970533, mailed on Oct. 25, 2019, 9 pages.
Search Report and Opinion received for Danish Patent Application No. PA202070610, mailed on Jan. 8, 2021, 9 pages.
Summons to Attend Oral Proceedings received for European Patent Application No. 16708003.5, mailed on Dec. 13, 2022, 11 pages.
Summons to Attend Oral Proceedings received for European Patent Application No. 17184710.6, mailed on Sep. 17, 2019, 7 pages.
Summons to Attend Oral Proceedings received for European Patent Application No. 20192404.0, mailed on Feb. 2, 2022, 11 pages.
Summons to Attend Oral Proceedings received for European Patent Application No. 20729346.5, mailed on Jan. 23, 2023, 11 pages.
Summons to Oral Proceedings received for European Patent Application No. 17184710.6, mailed on May 10, 2023, 3 pages.
Supplemental Notice of Allowance received for U.S. Appl. No. 14/805,403, mailed on Oct. 4, 2018, 3 pages.
Supplemental Notice of Allowance received for U.S. Appl. No. 15/433,238, mailed on Jun. 20, 2018, 2 pages.
Supplemental Notice of Allowance received for U.S. Appl. No. 16/147,523, mailed on Aug. 23, 2022, 2 pages.
Supplemental Notice of Allowance received for U.S. Appl. No. 16/867,002, mailed on Mar. 16, 2022, 2 pages.
Supplemental Notice of Allowance received for U.S. Appl. No. 16/867,002, mailed on Sep. 9, 2021, 2 pages.
Jean, "Our Pact Parental Control Review", Available online at: https://www.bewebsmart.com/parental-controls/our-pact-parental-control-review/, Jun. 25, 2016, 25 pages.
Non-Final Office Action received for U.S. Appl. No. 14/839,913, mailed on Mar. 2, 2016, 11 pages.
Non-Final Office Action received for U.S. Appl. No. 14/864,011, mailed on Jan. 21, 2016, 10 pages.
Office Action received for Australian Patent Application No. 2016100155, mailed on May 4, 2016, 7 pages.
Baar Marius, "Fitbit Ace—Unboxing, Setup and 24 Hour Test", YouTube [online] [video], Retrieved from: <https://youtu.be/ekvkfqOyrls>. See especially 4:44., Oct. 24, 2018, 3 pages.
Chenzai, "Apple, please don't screw up notifications on the Apple Watch", Available online at:—https://digi.tech.qq.com/a/20140918/060747.htm. also published on the English webpage https://www.theverge.com/2014/9/9/6127913/apple-please-dont-screw-up-notifications-on-the-apple-watch, Sep. 18, 2014, 8 pages (4 pages of English Translation and 4 pages of Official Copy).
Dharmasena Anusha, "iMessage-send as text message Option", YouTube, Available online at: <https://www.youtube.com/watch?v=hXG-MdlW6FA>, Feb. 18, 2013, 1 page.
Eisenstein et al., "Analysis of Clustering Techniques to Detect Hand Signs", Intelligent Multimedia, Video and Speech Processing, of 2001 International Symposium, Piscataway, NJ, USA, IEEE, 2001, 4 pages.
Farmboyreef, "Apple watch controlling your tv", Available online at: https://www.youtube.com/watch?v=xaJPG0Wm3Tg, Jun. 23, 2015, 3 pages.
Franks Tech Help, "DSLR Camera Remote Control on Android Tablet, DSLR Dashboard, Nexus 10, Canon Camera, OTG Host Cable", Available online at : https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gil Lory, "How to control Apple TV with your Apple Watch", Available online at: https://www.imore.com/how-control-your-apple-tv-remote-app%ADapple-watch, Jun. 6, 2016, 24 pages.
Han Sangwoo, "AR Glasses interaction prototype", Available Online at: https://sangwoohan.cargo.site/AR-Glasses-interaction-prototype, Oct. 2020, 4 pages.
Hobbyistsoftwareltd, "VLC Remote", Online available at: https://watchaware.com/watch-apps/297244048, 2016, 7 pages.
Itjungles, "iPhone 6: How to Pair with Another Bluetooth Device", Available Online at: https://www.youtube.com/watch?v=9setanYtHAk, Aug. 5, 2015, 3 pages.
Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
My Mate Vince, "Setting up the Fitbit Alta HR Activity Tracker on Apple IOS", Online available at:—<https://youtu.be/FdwRF4IfvFc>, Jun. 18, 2017, 3 pages.
Nikolov Anton, "Design principle: Consistency", Available online at: https://uxdesign.cc/design-principle-consistency-6b0cf7e7339f, Apr. 8, 2017, 9 pages.
Nozawa Naoki et al., "iPad Perfect Manual for IOS 4", JPN, Sotec Ltd., Yanagisawa Junichi, Dec. 31, 2010, pp. 189-190 (Official Copy Only) (See Communication Under Rule 37 CFR § 1.98(a) (3)).
Ojeda-Zapata Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
Action received for Danish Patent Application No. PA201570664, mailed on Mar. 15, 2016, 10 pages.
Action received for Danish Patent Application No. PA201570771, mailed on Mar. 17, 2016, 8 pages.

(56) References Cited

OTHER PUBLICATIONS

Action Received for Danish Patent Application No. PA201570773, mailed on Mar. 18, 2016, 9 pages.
Action received for Danish Patent Application No. PA201570791, mailed on Apr. 6, 2016, 12 pages.
Office Action received for Danish Patent Application No. PA201670074, mailed on Apr. 7, 2016, 8 pages.
International Search Report and Written Opinion received for PCT Patent Application No. PCT/US2015/019298, mailed on Jul. 13, 2015, 17 pages.
International Search Report and Written Opinion received for PCT Patent Application No. PCT/US2015/041424, mailed on Mar. 31, 2016, 18 pages.
Invitation to Pay Additional Fees received for PCT Patent Application No. PCT/US2015/041424, mailed on Nov. 12, 2015, 6 pages.
International Search Report and Written Opinion received for PCT Application No. PCT/US2015/047507, mailed on Feb. 22, 2016, 22 pages.
Invitation to Pay Additional Fees received for PCT Patent Application No. PCT/US2015/047507, mailed on Jan. 4, 2016, 8 pages.
International Search Report and Written Opinion received for PCT Patent Application No. PCT/US2015/055165, mailed on Apr. 20, 2016, 22 pages.
Invitation to Pay Additional Fees received for PCT Patent Application No. PCT/US2015/055165, mailed on Jan. 18, 2016, 6 pages.
Playmemories Camera Apps, "Play Memories Camera Apps Help Guide", available at <https://www.playmemoriescameraapps.com/portal/manual/IS9104-NPIA09014_00-F00002/en/index.html>, 2012, 3 pages.
Reuss et al., "Period Domain Analysis In Fetal Pulse Oximetry", Proceedings of t11e Second Joint EMBS/BMES Conference, Houston, TX,, Oct. 23-26, 2002, 2 pages.
Rubine Dean, "Combining Gestures and Direct Manipulation", CHI '92, May 3-7, 1992, pp. 659-660.
Rubine Deanh. , "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Pairing Your Apple Watch with Your Apple TV, Available online at: https://www.youtube.com/watch?v=C418YFSJ-UY, Apr. 27, 2015, 3 pages.
Singh Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Techsmith, "Snagit ® 11 Snagit 11.4 Help", available at <http://assets.techsmith.com/Downloads/ua-tutorials-snagit-11/Snagit_11.pdf>, Jan. 2014, 146 pages.
Walker Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.
Wearablezone, "How To Set Up Your Fitbit Profile", Online available at:—<https://youtu.be/jsWPtcDWiJM>, Jun. 6, 2016, 3 pages.
Westerman Wayne, "Hand Tracking, Finger Identification and Chordic Manipulation on A Multi-Touch Surface", Doctoral Dissertation, 1999, 363 Pages.
Whitney Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.
Xdream, "TickTalk Video User Manual", YouTube [online] [video], Online available at: <https://youtu.be/jYhq3DwmVzo>, Mar. 17, 2017, 3 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.

Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Zhao et al., "Wireless Photoplethysmograph Knuckle Sensor System for Measuring Finger Motions", 2014 International Symposium on Optomechatronic Technologies, IEEE, 2014, pp. 205-209.
Zheng et al., "An Efficient User Verification System via Mouse Movements", Computer am1 Communications Security, ACM, New York, NY, USA, Dec. 17, 2011, pp. 139-150.
Brief Communication Regarding Oral Proceedings received for European Patent Application No. 22729964.1, mailed on Mar. 21, 2024, 1 page.
International Search Report and Written Opinion received for PCT Patent Application No. PCT/US2023/032794, mailed on Jan. 8, 2024, 19 pages.
Invitation to Pay Additional Fees and Partial International Search Report received for PCT Patent Application No. PCT/US2023/032794, mailed on Nov. 9, 2023, 12 pages.
Advisory Action received for U.S. Appl. No. 17/747,613, mailed on Feb. 14, 2024, 3 pages.
Final Office Action received for U.S. Appl. No. 17/746,807, mailed on Feb. 20, 2024, 24 pages.
Office Action received for Chinese Patent Application No. 202211558100.7, mailed on Jan. 8, 2024, 12 pages (6 pages of English Translation and 6 pages of Official Copy).
Applicant-Initiated Interview Summary received for U.S. Appl. No. 18/088,309, mailed on Feb. 28, 2024, 2 pages.
Final Office Action received for U.S. Appl. No. 17/410,169, mailed on Feb. 23, 2024, 49 pages.
Final Office Action received for U.S. Appl. No. 18/109,808, mailed on Mar. 5, 2024, 52 pages.
Notice of Acceptance received for Australian Patent Application No. 2023201920, mailed on Feb. 9, 2024, 3 pages.
Supplemental Notice of Allowance received for U.S. Appl. No. 17/975,141, mailed on Feb. 26, 2024, 2 pages.
Applicant-Initiated Interview Summary received for U.S. Appl. No. 18/109,808, mailed on Jan. 23, 2024, 5 pages.
Applicant-Initiated Interview Summary received for U.S. Appl. No. 18/122,625, mailed on Jan. 19, 2024, 2 pages.
Applicant-Initiated Interview Summary received for U.S. Appl. No. 17/747,613. mailed on Jan. 31, 2024, 3 pages.
Applicant-Initiated Interview Summary received for U.S. Appl. No. 17/410,169. mailed on Jan. 26, 2024, 5 pages.
Decision to Grant received for European Patent Application No. 19722280.5, mailed on Feb. 1, 2024, 2 pages.
Final Office Action received for U.S. Appl. No. 17/747,613, mailed on Jan. 11, 2024, 28 pages.
Final Office Action received for U.S. Appl. No. 18/088,309, mailed on Jan. 9, 2024, 13 pages.
Intention to Grant received for European Patent Application No. 15753796.0, mailed on Jan. 12, 2024, 9 pages.
Non-Final Office Action received for U.S. Appl. No. 18/109,808, mailed on Jan. 4, 2024, 45 pages.
Summons to Attend Oral Proceedings received for European Patent Application No. 20720310.0, mailed on Jan. 3, 2024, 12 pages.
Communication for Board of Appeal received for European Patent Application No. 17184710.6, mailed on Feb. 29, 2024, 13 pages.
Applicant-Initiated Interview Summary received for U.S. Appl. No. 18/122,625, mailed on May 22, 2024, 2 pages.
Minutes of the Oral Proceedings received for European Patent Application No. 17184710.6, mailed on May 22, 2024, 4 pages.
Applicant-Initiated Interview Summary received for U.S. Appl. No. 17/747,613, mailed on Mar. 18, 2025, 2 pages.
Applicant-Initiated Interview Summary received for U.S. Appl. No. 18/228,597, mailed on Apr. 1, 2025, 5 pages.
Final Office Action received for U.S. Appl. No. 18/102,036, mailed on Apr. 21, 2025, 19 pages.
Intention to Grant received for European Patent Application No. 24211972.5, mailed on Apr. 10, 2025, 9 pages.

(56) References Cited

OTHER PUBLICATIONS

International Preliminary Report on Patentability received for PCT Patent Application No. PCT/US2023/032794, mailed on Apr. 3, 2025, 13 pages.
Non-Final Office Action received for U.S. Appl. No. 18/441,971, mailed on Apr. 10, 2025, 39 pages.
Non-Final Office Action received for U.S. Appl. No. 18/499,970, mailed on Mar. 14, 2025, 7 pages.
Office Action received for Japanese Patent Application No. 2024-023002, mailed on Apr. 11, 2025, 12 pages (6 pages of English Translation and 6 pages of Official Copy).
Written Opinion received for PCT Patent Application No. PCT/US2024/020743, mailed on Apr. 1, 2025, 14 pages.
Applicant-Initiated Interview Summary received for U.S. Appl. No. 17/410,169, mailed on Nov. 6, 2024, 5 pages.
Applicant-Initiated Interview Summary received for U.S. Appl. No. 18/088,309, mailed on Aug. 27, 2024, 2 pages.
Applicant-Initiated Interview Summary received for U.S. Appl. No. 18/088,309, mailed on Jun. 7, 2024, 2 pages.
Applicant-Initiated Interview Summary received for U.S. Appl. No. 18/102,036, mailed on Nov. 8, 2024, 4 pages.
Applicant-Initiated Interview Summary received for U.S. Appl. No. 18/109,808, mailed on Aug. 19, 2024, 6 pages.
Applicant-Initiated Interview Summary received for U.S. Appl. No. 18/228,597, mailed on Aug. 8, 2024, 4 pages.
Applicant-Initiated Interview Summary received for U.S. Appl. No. 18/499,970, mailed on Sep. 18, 2024, 3 pages.
Decision to Grant received for European Patent Application No. 15753796.0, mailed on Sep. 26, 2024, 3 pages.
Decision to Grant received for European Patent Application No. 22729964.1, mailed on Aug. 29, 2024, 3 pages.
Extended European Search Report received for European Patent Application No. 24194531.0, mailed on Nov. 12, 2024, 8 pages.
Extended European Search Report received for European Patent Application No. 24194994.0, mailed on Nov. 28, 2024, 9 pages.
Final Office Action received for U.S. Appl. No. 17/410,169, mailed on Dec. 3, 2024, 56 pages.
Final Office Action received for U.S. Appl. No. 18/088,309, mailed on Aug. 1, 2024, 16 pages.
Intention to Grant received for European Patent Application No. 15753796.0, mailed on Jun. 5, 2024, 8 pages.
Intention to Grant received for European Patent Application No. 20720310.0, mailed on Jun. 13, 2024, 13 pages.
Intention to Grant received for European Patent Application No. 20720310.0, mailed on Oct. 7, 2024, 14 pages.
International Preliminary Report on Patentability received for PCT Patent Application No. PCT/US2023/012260, mailed on Aug. 22, 2024, 15 pages.
International Preliminary Report on Patentability received for PCT Patent Application No. PCT/US2023/022410, mailed on Nov. 28, 2024, 18 pages.
International Search Report and Written Opinion received for PCT Patent Application No. PCT/US2024/020743, mailed on Jul. 16, 2024, 19 pages.
International Preliminary Report on Patentability received for PCT Patent Application No. PCT/US2024/023602, mailed on Nov. 26, 2024, 17 pages.
Invitation to Pay Additional Fees and Partial International Search Report received for PCT Patent Application No. PCT/US2024/023602, mailed on Aug. 26, 2024, 11 pages.
Minutes of the Oral Proceedings received for European Patent Application No. 20720310.0, mailed on Jun. 7, 2024, 7 pages.
Non-Final Office Action received for U.S. Appl. No. 17/410,169, mailed on Sep. 10, 2024, 53 pages.
Non-Final Office Action received for U.S. Appl. No. 17/747,613, mailed on Nov. 27, 2024, 27 pages.
Non-Final Office Action received for U.S. Appl. No. 18/102,036, mailed on Sep. 29, 2024, 16 pages.
Non-Final Office Action received for U.S. Appl. No. 18/109,808, mailed on Jul. 5, 2024, 53 pages.
Non-Final Office Action received for U.S. Appl. No. 18/228,597, mailed on Jul. 8, 2024, 17 pages.
Non-Final Office Action received for U.S. Appl. No. 18/499,970, mailed on Aug. 13, 2024, 8 pages.
Notice of Acceptance received for Australian Patent Application No. 2023204647, mailed on Oct. 28, 2024, 3 pages.
Notice of Allowance received for Japanese Patent Application No. 2022-149476, mailed on Aug. 2, 2024, 4 pages (1 page of English Translation and 3 pages of Official Copy).
Notice of Allowance received for U.S. Appl. No. 17/746,807, mailed on Jul. 3, 2024, 23 pages.
Notice of Allowance received for U.S. Appl. No. 17/746,807, mailed on Nov. 14, 2024, 6 pages.
Notice of Allowance received for U.S. Appl. No. 18/109,808, mailed on Oct. 10, 2024, 10 pages.
Notice of Allowance received for U.S. Appl. No. 18/122,625, mailed on Jun. 21, 2024, 7 pages.
Notice of Allowance Received for U.S. Appl. No. 18/122,625, mailed on Sep. 20, 2024, 5 pages.
Notice of Allowance received for U.S. Appl. No. 18/511,778, mailed on Sep. 30, 2024, 17 pages.
Office Action received for Australian Patent Application No. 2023204647, mailed on Jul. 5, 2024, 3 pages.
Office Action received for Australian Patent Application No. 2023204647, mailed on Sep. 19, 2024, 2 pages.
Office Action received for Chinese Patent Application No. 202310794146.7, mailed on Aug. 30, 2024, 18 pages (11 pages of English Translation and 7 pages of Official Copy).
Office Action received for Indian Patent Application No. 202218027229, mailed on Jun. 13, 2024, 8 pages.
Result of Consultation received for European Patent Application No. 20720310.0, mailed on Jun. 4, 2024, 3 pages.
Supplemental Notice of Allowance received for U.S. Appl. No. 17/975,141, mailed on Aug. 12, 2024, 2 pages.
Advisory Action received for U.S. Appl. No. 18/109,808, mailed on May 20, 2024, 6 pages.
Applicant-Initiated Interview Summary received for U.S. Appl. No. 17/410,169, mailed on May 8, 2024, 6 pages.
Applicant-Initiated Interview Summary received for U.S. Appl. No. 17/746,807, mailed on May 21, 2024, 2 pages.
Applicant-Initiated Interview Summary received for U.S. Appl. No. 18/109,808, mailed on Apr. 30, 2024, 5 pages.
Intention to Grant received for European Patent Application No. 22729964.1, mailed on Apr. 24, 2024, 9 pages.
Notice of Allowance received for U.S. Appl. No. 17/975,141, mailed on Apr. 29, 2024, 9 pages.
Office Action received for Chinese Patent Application No. 202080039832.8, mailed on Mar. 23, 2024, 22 pages (12 pages of English Translation and 10 pages of Official Copy).
Office Action received for Japanese Patent Application No. 2022-149476, mailed on Apr. 22, 2024, 8 pages (4 pages of English Translation and 4 pages of Official Copy).
Result of Consultation received for European Patent Application No. 20720310.0, mailed on Apr. 17, 2024, 9 pages.
Final Office Action received for U.S. Appl. No. 18/122,625, mailed on Apr. 5, 2024, 12 pages.
International Preliminary Report on Patentability received for PCT Patent Application No. PCT/US2022/044236, mailed on Apr. 4, 2024, 12 pages.
Non-Final Office Action received for U.S. Appl. No. 18/088,309, mailed on Apr. 9, 2024, 14 pages.
Notice of Allowance received for Chinese Patent Application No. 202211558100.7, mailed on Mar. 29, 2024, 3 pages (2 pages of English Translation and 1 page of Official Copy).
Office Action received for Korean Patent Application No. 10-2022-7032414, mailed on Mar. 26, 2024, 11 pages (5 pages of English Translation and 6 pages of Official Copy).
Applicant-Initiated Interview Summary received for U.S. Appl. No. 17/747,613, mailed on Dec. 18, 2024, 2 pages.
Applicant-Initiated Interview Summary received for U.S. Appl. No. 18/102,036, mailed on Mar. 10, 2025, 3 pages.
Applicant-Initiated Interview Summary received for U.S. Appl. No. 18/228,597, mailed on Jan. 29, 2025, 4 pages.

(56) References Cited

OTHER PUBLICATIONS

Applicant-Initiated Interview Summary received for U.S. Appl. No. 18/499,970. mailed on Feb. 25, 2025, 4 pages.
Corrected Notice of Allowance received for U.S. Appl. No. 17/746,807, mailed on Feb. 26, 2025, 3 pages.
Decision to Grant received for European Patent Application No. 20720310.0, mailed on Dec. 5, 2024, 2 pages.
Extended European Search Report received for European Patent Application No. 24211972.5, mailed on Jan. 2, 2025, 7 pages.
Final Office Action received for U.S. Appl. No. 17/747,613, mailed on Mar. 6, 2025, 26 pages.
Final Office Action received for U.S. Appl. No. 18/228,597, mailed on Jan. 8, 2025, 19 pages,.
Final Office Action received for U.S. Appl. No. 18/499,970, mailed on Dec. 23, 2024, 8 pages.
Non-Final Office Action received for U.S. Appl. No. 18/102,036, mailed on Dec. 20, 2024, 16 pages.
Non-Final Office Action received for U.S. Appl. No. 18/228.597, mailed on Mar. 6, 2025, 20 pages.
Notice of Allowance received for Korean Patent Application No. 10-2022-7032414, mailed on Nov. 27, 2024, 7 pages (2 pages of English Translation and 5 pages of Official Copy).
Office Action received for Chinese Patent Application No. 202310794146.7, mailed on Nov. 13, 2024, 17 pages (11 pages of English Translation and 6 pages of Official Copy).

\* cited by examiner

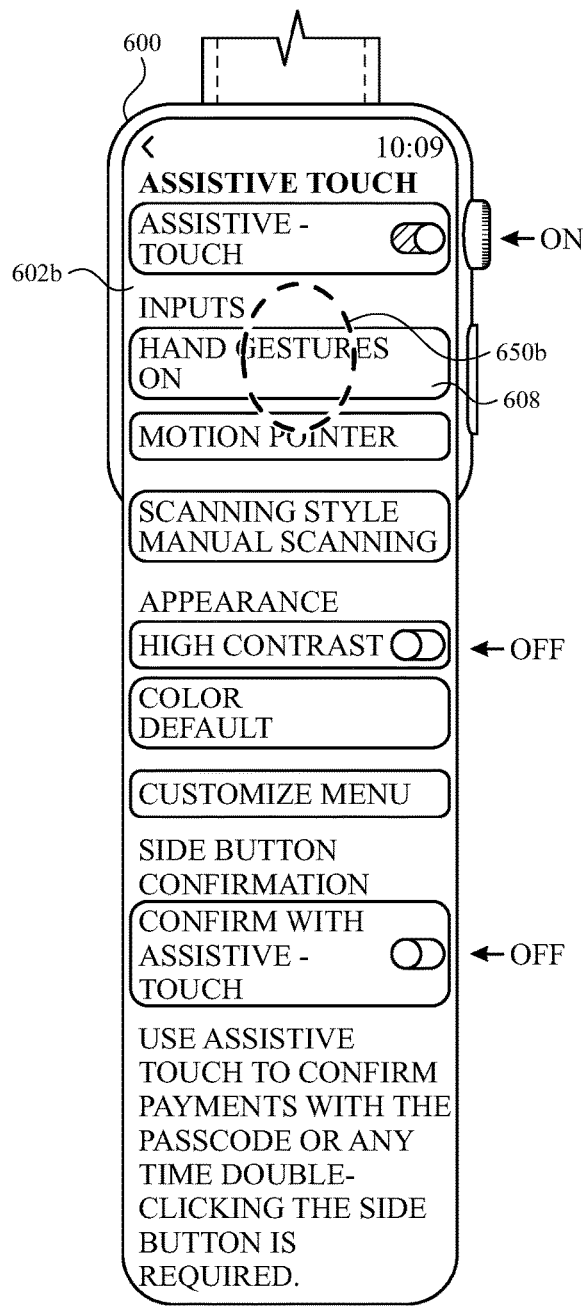 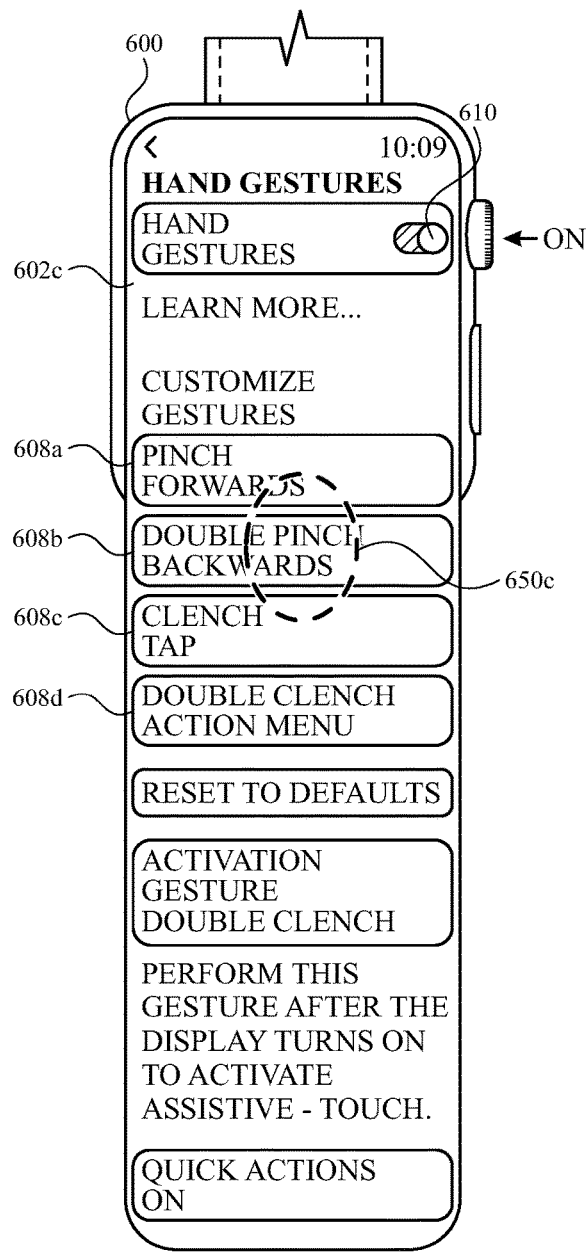
*FIG. 6B*  *FIG. 6C*

USER INTERFACES FOR DEVICE CONTROLS

CROSS-REFERENCE TO RELATED APPLICATIONS

This application claims priority to U.S. Provisional Patent Application 63/343,076, entitled "USER INTERFACES FOR DEVICE CONTROLS," filed May 17, 2022. The content of this application is incorporated herein by reference in its entirety.

FIELD

The present disclosure relates generally to computer user interfaces, and more specifically to techniques for controlling external devices.

BACKGROUND

Computer systems can include hardware and/or software for providing improved techniques for a user preferring to use different input mechanisms and/or for a user having one or more impairments (e.g., motor impairment and/or visual impairment) to interact with the computer.

BRIEF SUMMARY

Users may prefer to use alternative input techniques and/or may have a limited ability to provide certain inputs to control a computer (e.g., using a mouse and/or a touchscreen). A user may configure particular accessibility settings of a computer system to allow the user to more easily control a device. A user may request to control one computer system using a different computer system (e.g., an external device).

Some techniques for controlling external devices using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for controlling external devices. Such methods and interfaces optionally complement or replace other methods for controlling external devices. Such methods and interfaces reduce the cognitive burden on a user and produce a more efficient human-machine interface. For battery-operated computing devices, such methods and interfaces conserve power and increase the time between battery charges. When a user desires to control an external (e.g., remote) device, automatically displaying a particular user interface based on the accessibility settings of the one or more devices (e.g., a local device and/or an external device) reduces the number of inputs required to control the one or more devices. Additionally or alternatively, automatically displaying a particular user interface to control an external device based on an accessibility setting improves a human-machine interface for users.

In accordance with some embodiments, a method performed at a first computer system that is in communication with a display generation component and one or more input devices is described. The method comprises: detecting, via the one or more input devices, an input corresponding to a request to control a second computer system; and in response to detecting the input corresponding to the request to control the second computer system and while in communication with the second computer system: in accordance with a determination that a first set of control criteria is met, displaying one or more first user interface objects that controls a graphical element displayed by the second computer system to navigate one or more user interfaces of the second computer system, wherein a first control criteria of the first set of control criteria is met when a first mode of controlling a computer system is enabled on the second computer system; and in accordance with a determination that the first set of control criteria is not met, forgoing display of the one or more user interface objects that controls a graphical element to navigate the one or more user interfaces of the second computer system.

In accordance with some embodiments, a non-transitory computer-readable storage medium is described. The non-transitory computer-readable storage medium stores one or more programs configured to be executed by one or more processors of a first computer system that is in communication with a display generation component and one or more input devices, the one or more programs including instructions for: detecting, via the one or more input devices, an input corresponding to a request to control a second computer system; and in response to detecting the input corresponding to the request to control the second computer system and while in communication with the second computer system: in accordance with a determination that a first set of control criteria is met, displaying one or more first user interface objects that controls a graphical element displayed by the second computer system to navigate one or more user interfaces of the second computer system, wherein a first control criteria of the first set of control criteria is met when a first mode of controlling a computer system is enabled on the second computer system; and in accordance with a determination that the first set of control criteria is not met, forgoing display of the one or more user interface objects that controls a graphical element to navigate the one or more user interfaces of the second computer system.

In accordance with some embodiments, a transitory computer-readable storage medium is described. The transitory computer-readable storage medium stores one or more programs configured to be executed by one or more processors of a first computer system that is configured to communicate with a display generation component and one or more input devices, the one or more programs including instructions for: detecting, via the one or more input devices, an input corresponding to a request to control a second computer system; and in response to detecting the input corresponding to the request to control the second computer system and while in communication with the second computer system: in accordance with a determination that a first set of control criteria is met, displaying one or more first user interface objects that controls a graphical element displayed by the second computer system to navigate one or more user interfaces of the second computer system, wherein a first control criteria of the first set of control criteria is met when a first mode of controlling a computer system is enabled on the second computer system; and in accordance with a determination that the first set of control criteria is not met, forgoing display of the one or more user interface objects that controls a graphical element to navigate the one or more user interfaces of the second computer system.

In accordance with some embodiments, a first computer system that is configured to communicate with a display generation component and one or more input devices is described. The computer system comprises: one or more processors; and memory storing one or more programs configured to be executed by the one or more processors, the one or more programs including instructions for: detecting, via the one or more input devices, an input corresponding to a request to control a second computer system; and in response to detecting the input corresponding to the request to control the second computer system and while in communication with the second computer system: in accordance with a determination that a first set of control criteria is met, displaying one or more first user interface objects that controls a graphical element displayed by the second computer system to navigate one or more user interfaces of the second computer system, wherein a first control criteria of the first set of control criteria is met when a first mode of controlling a computer system is enabled on the second computer system; and in accordance with a determination that the first set of control criteria is not met, forgoing display of the one or more user interface objects that controls a graphical element to navigate the one or more user interfaces of the second computer system.

In accordance with some embodiments, a first computer system that is configured to communicate with a display generation component and one or more input devices is described. The computer system comprises: means for detecting, via the one or more input devices, an input corresponding to a request to control a second computer system; and means, responsive to detecting the input corresponding to the request to control the second computer system and while in communication with the second computer system, for: in accordance with a determination that a first set of control criteria is met, displaying one or more first user interface objects that controls a graphical element displayed by the second computer system to navigate one or more user interfaces of the second computer system, wherein a first control criteria of the first set of control criteria is met when a first mode of controlling a computer system is enabled on the second computer system; and in accordance with a determination that the first set of control criteria is not met, forgoing display of the one or more user interface objects that controls a graphical element to navigate the one or more user interfaces of the second computer system.

In accordance with some embodiments, a computer program product is described. The computer program product comprises one or more programs configured to be executed by one or more processors of a computer system that is in communication with a display generation component and one or more input devices. The one or more programs include instructions for: detecting, via the one or more input devices, an input corresponding to a request to control a second computer system; and in response to detecting the input corresponding to the request to control the second computer system and while in communication with the second computer system: in accordance with a determination that a first set of control criteria is met, displaying one or more first user interface objects that controls a graphical element displayed by the second computer system to navigate one or more user interfaces of the second computer system, wherein a first control criteria of the first set of control criteria is met when a first mode of controlling a computer system is enabled on the second computer system; and in accordance with a determination that the first set of control criteria is not met, forgoing display of the one or more user interface objects that controls a graphical element to navigate the one or more user interfaces of the second computer system.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for controlling external devices, thereby increasing the effectiveness, efficiency, and user satisfaction with such devices. Such methods and interfaces may complement or replace other methods for controlling external devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for controlling external devices. For example, a technique enables the display of a particular user interface based on what accessibility settings are enabled at one or more devices. Such techniques can reduce the cognitive burden on a user who seeks to control the external device, thereby enhancing productivity. Further, such techniques can reduce processor and battery power otherwise wasted on redundant user inputs.

Figure 6A:
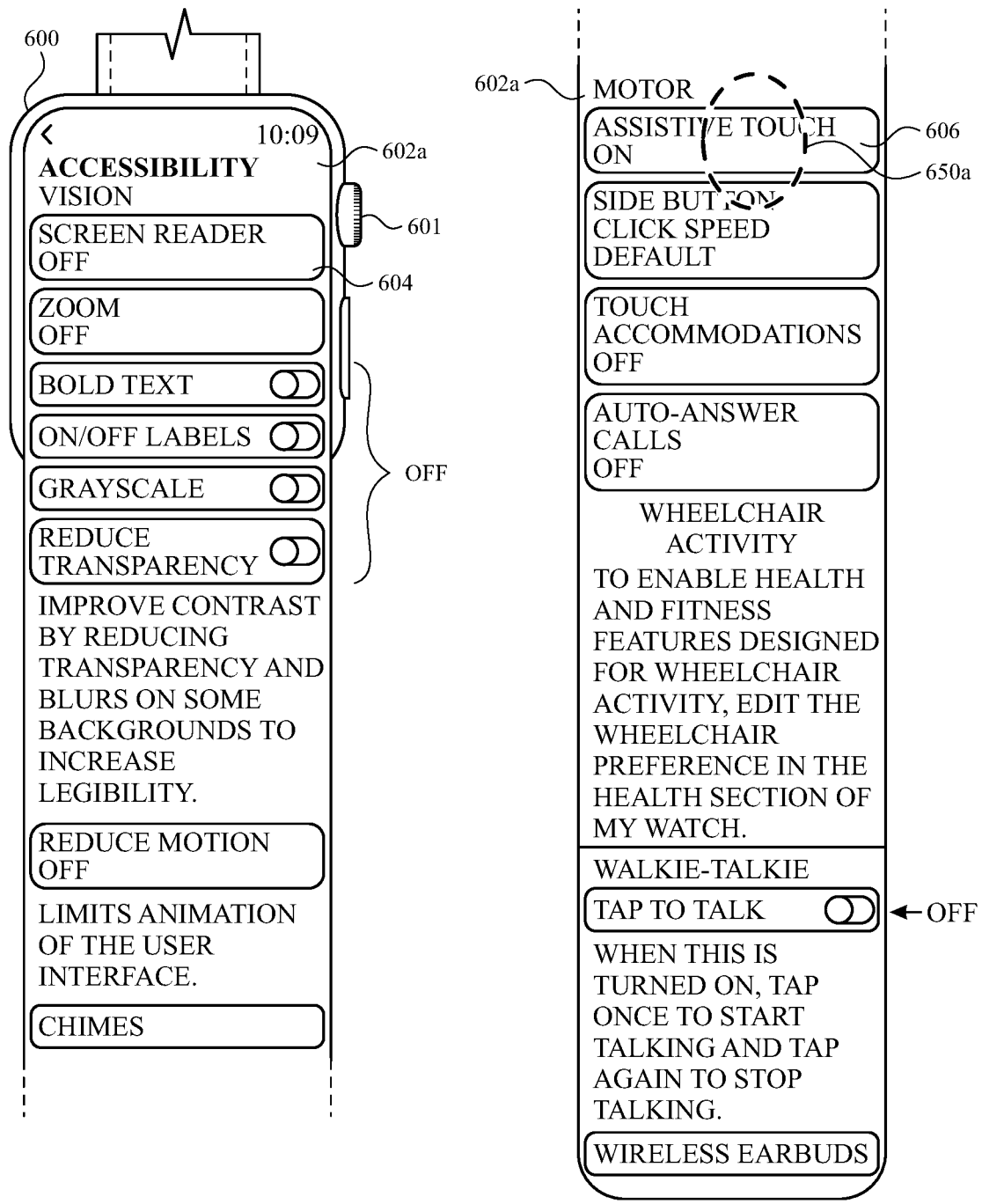
FIGS. 6A-6R illustrate exemplary user interfaces for device controls in accordance with some embodiments.
Figure 6R:
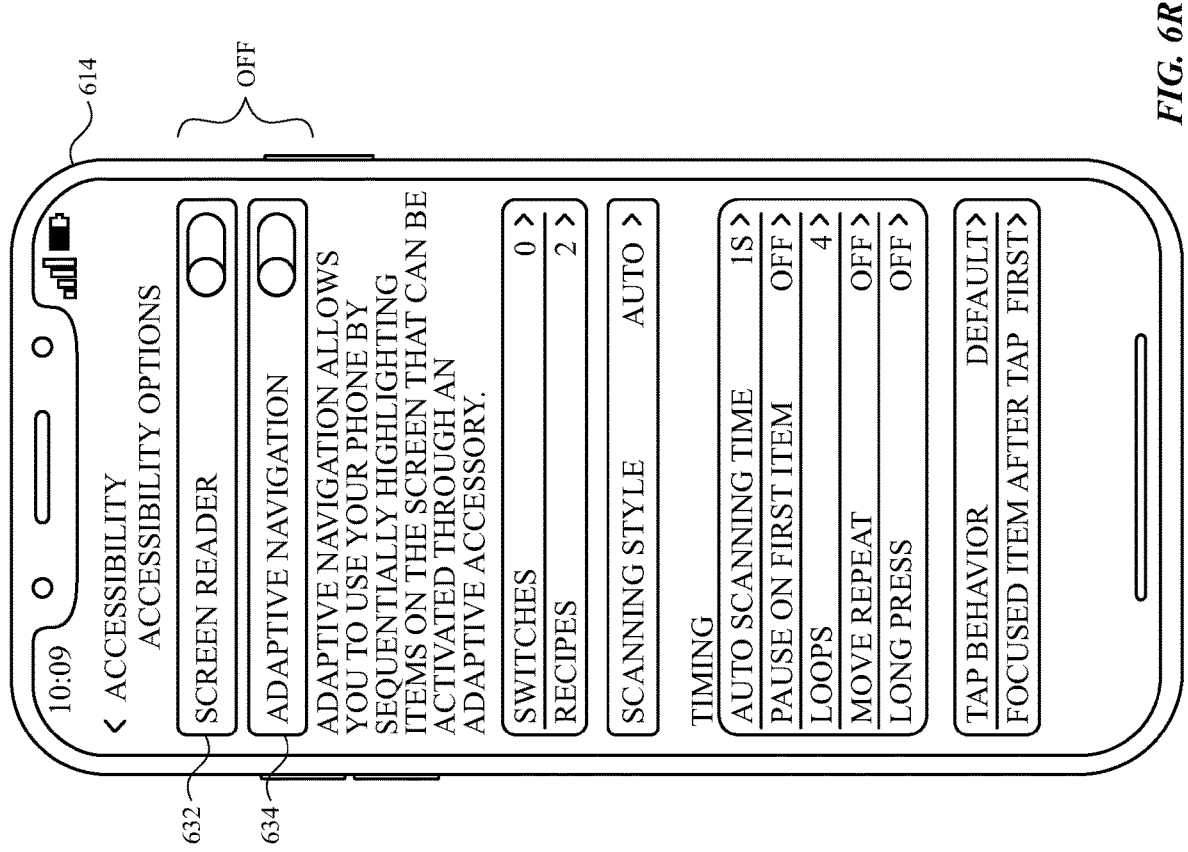
Figure 7:
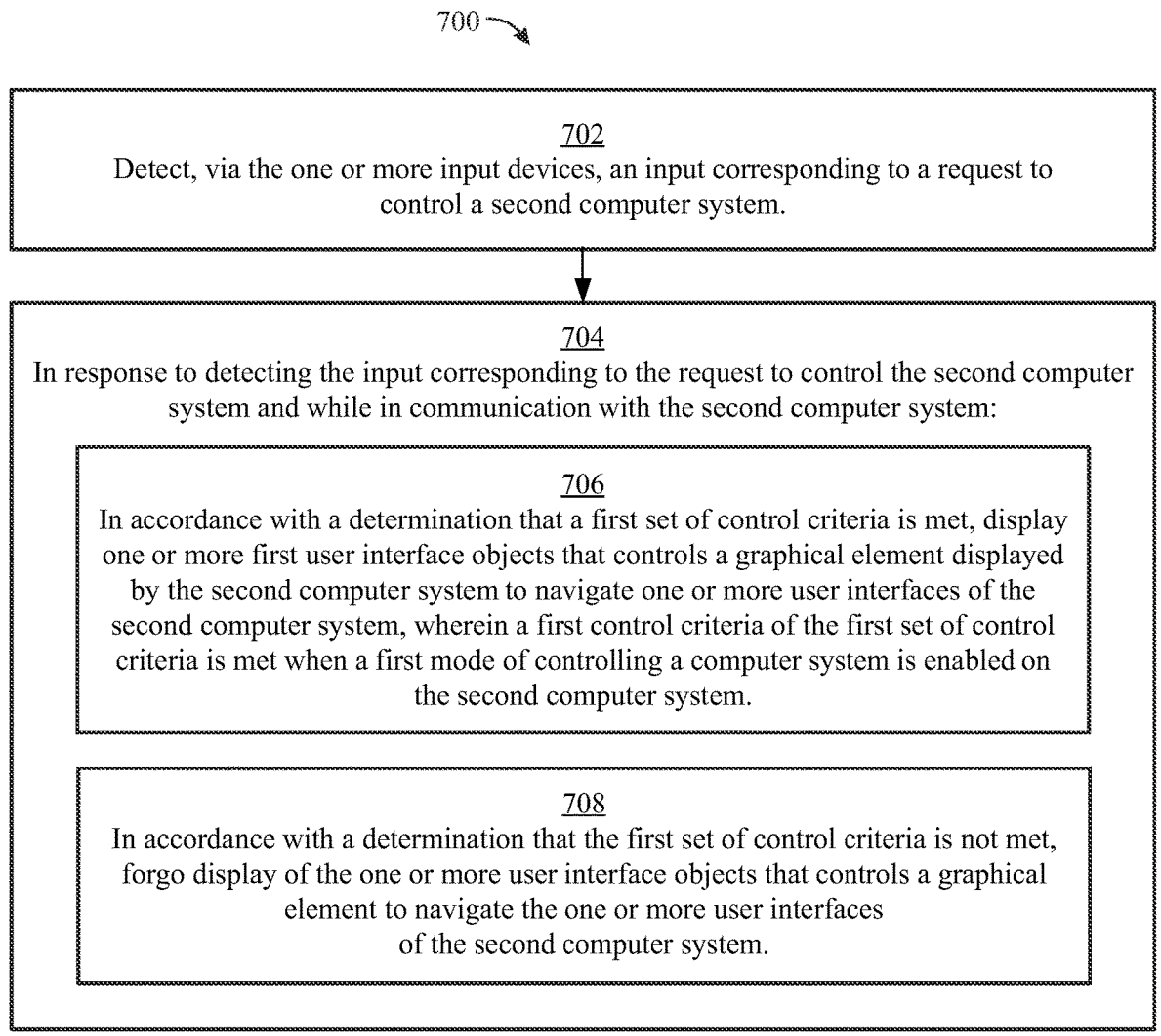
FIG. 7 depicts a flow diagram illustrating a method for displaying a user interface to control a device in accordance with some embodiments.

Below, FIGS. 1A-1B, 2, 3, and 4A-4B, and 5A-5B provide a description of exemplary devices for performing the techniques for managing event notifications. FIGS. 6A-6R illustrate exemplary user interfaces for controlling external devices. FIG. 7 is a flow diagram illustrating methods of displaying a user interface to control a device in accordance with some embodiments. The user interfaces in FIGS. 6A-6R are used to illustrate the processes described below, including the processes in FIG. 7.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, controlling devices having one or more accessibility settings, improving the human-machine interface for a user, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
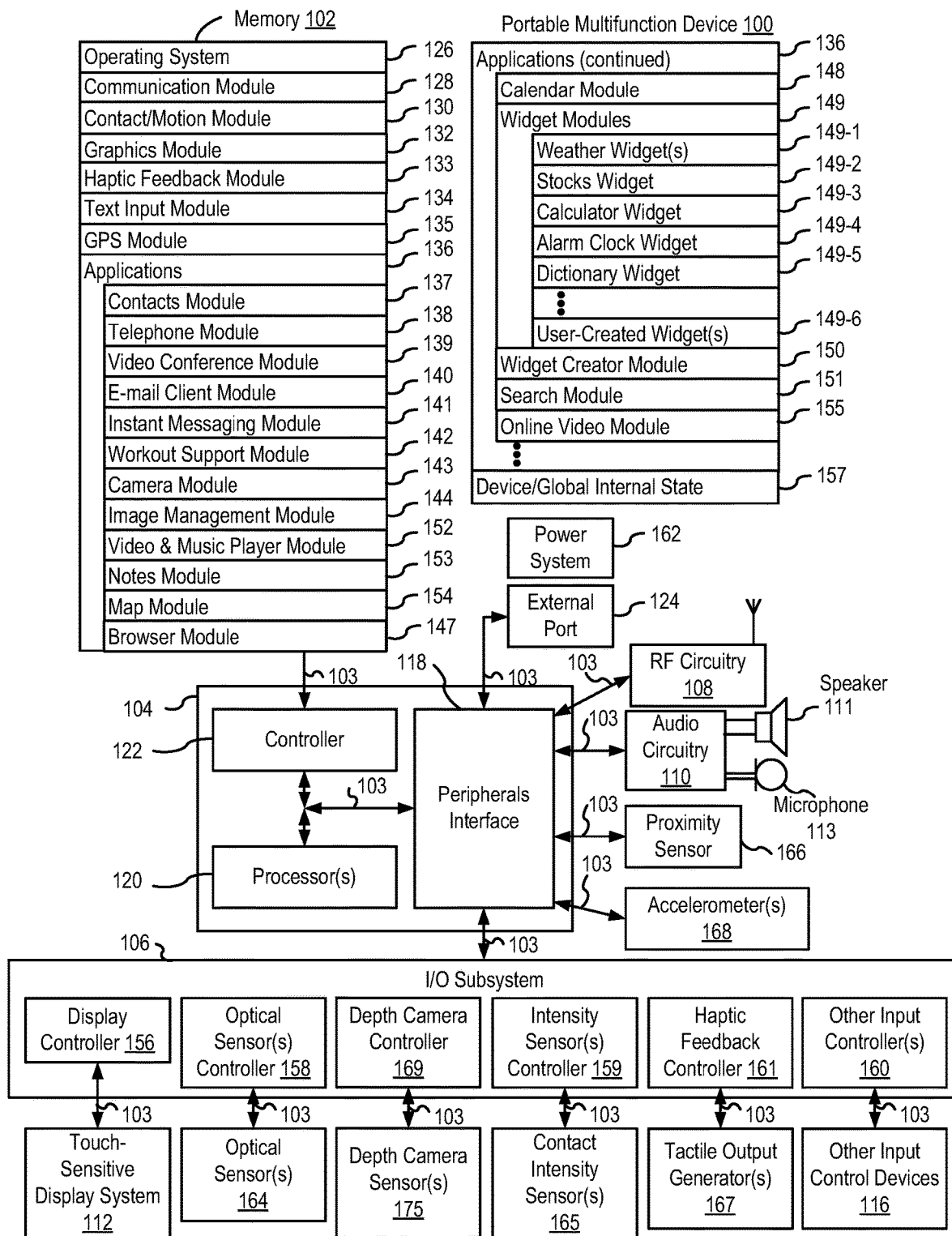
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
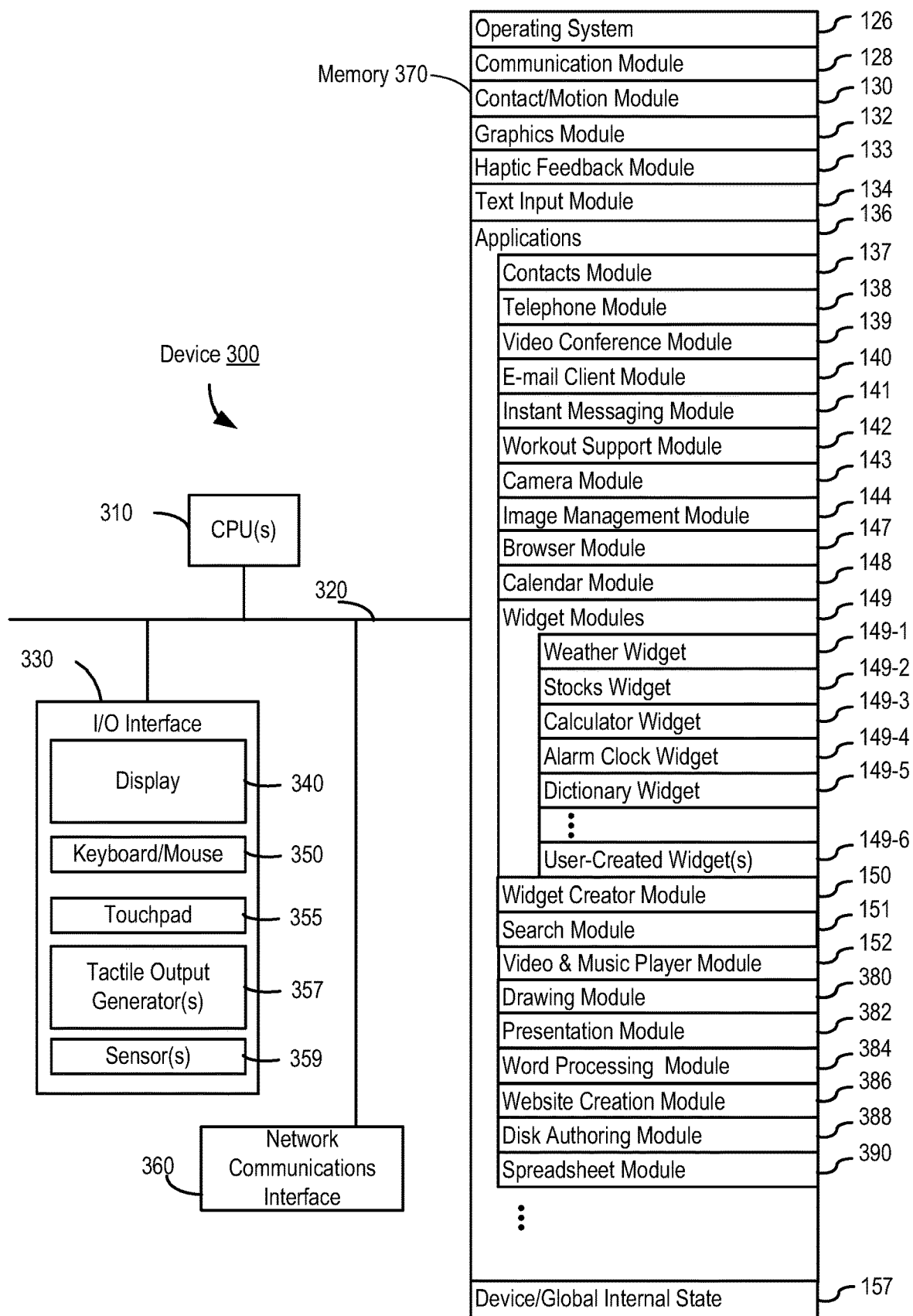
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
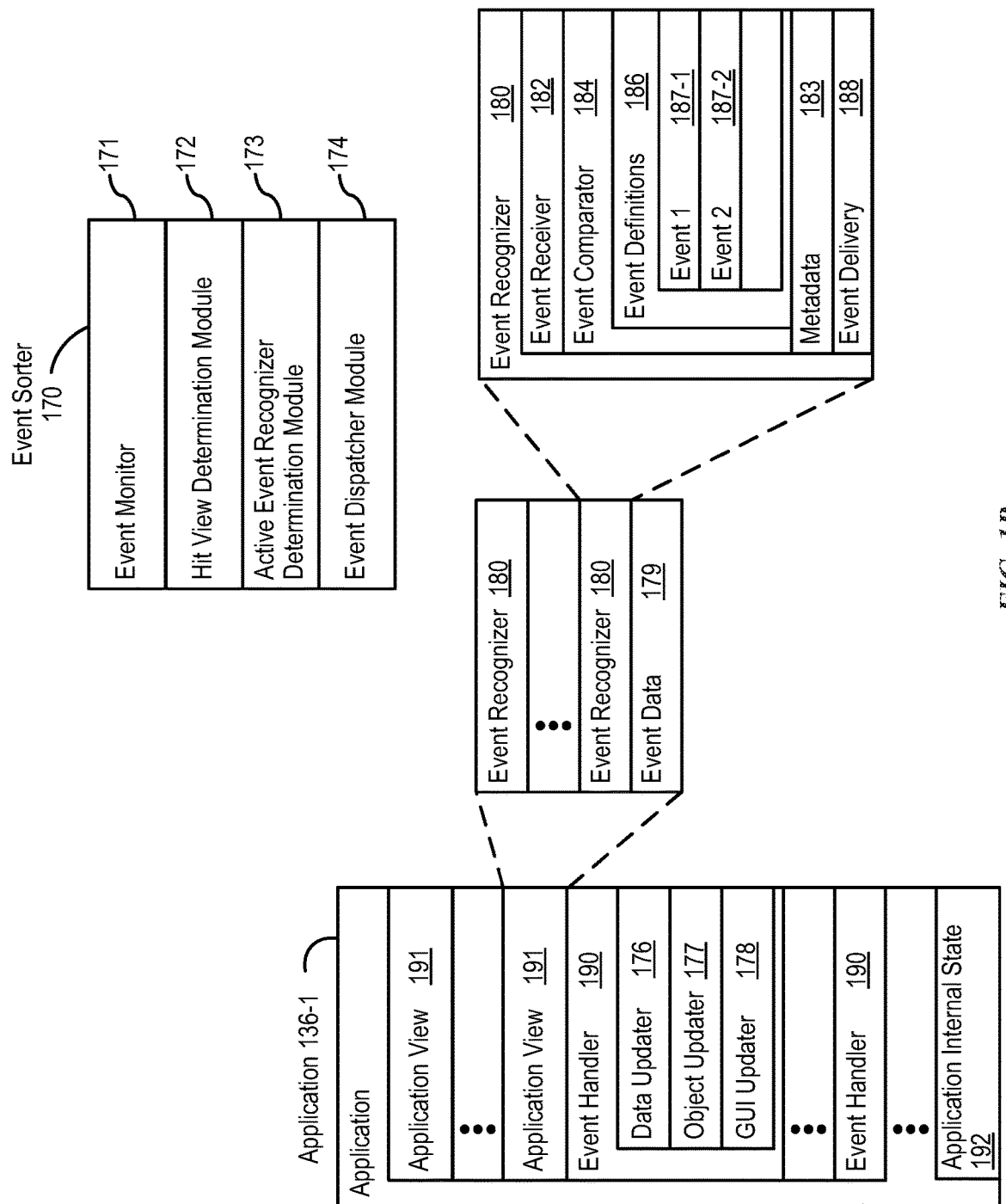
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
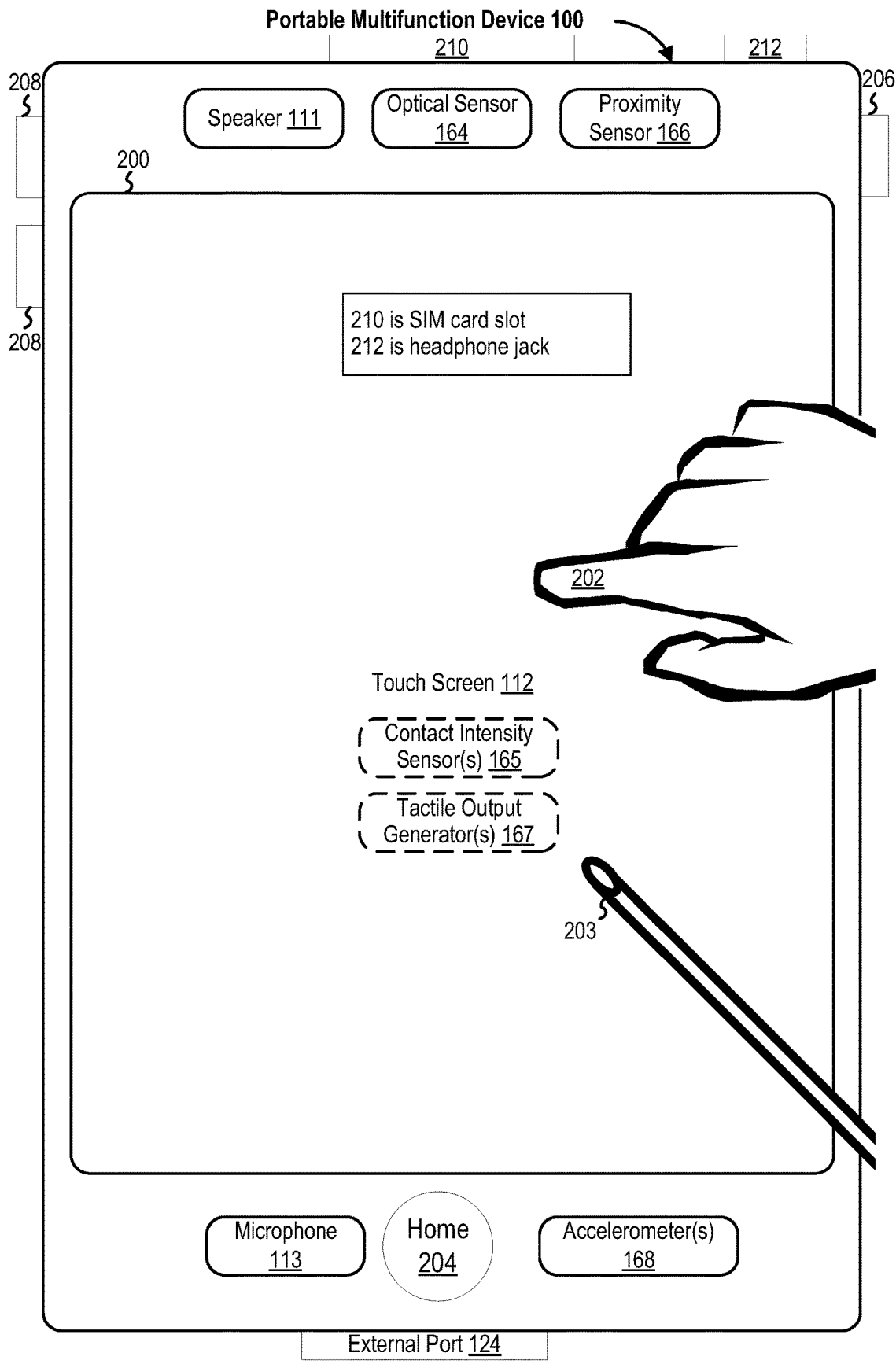
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
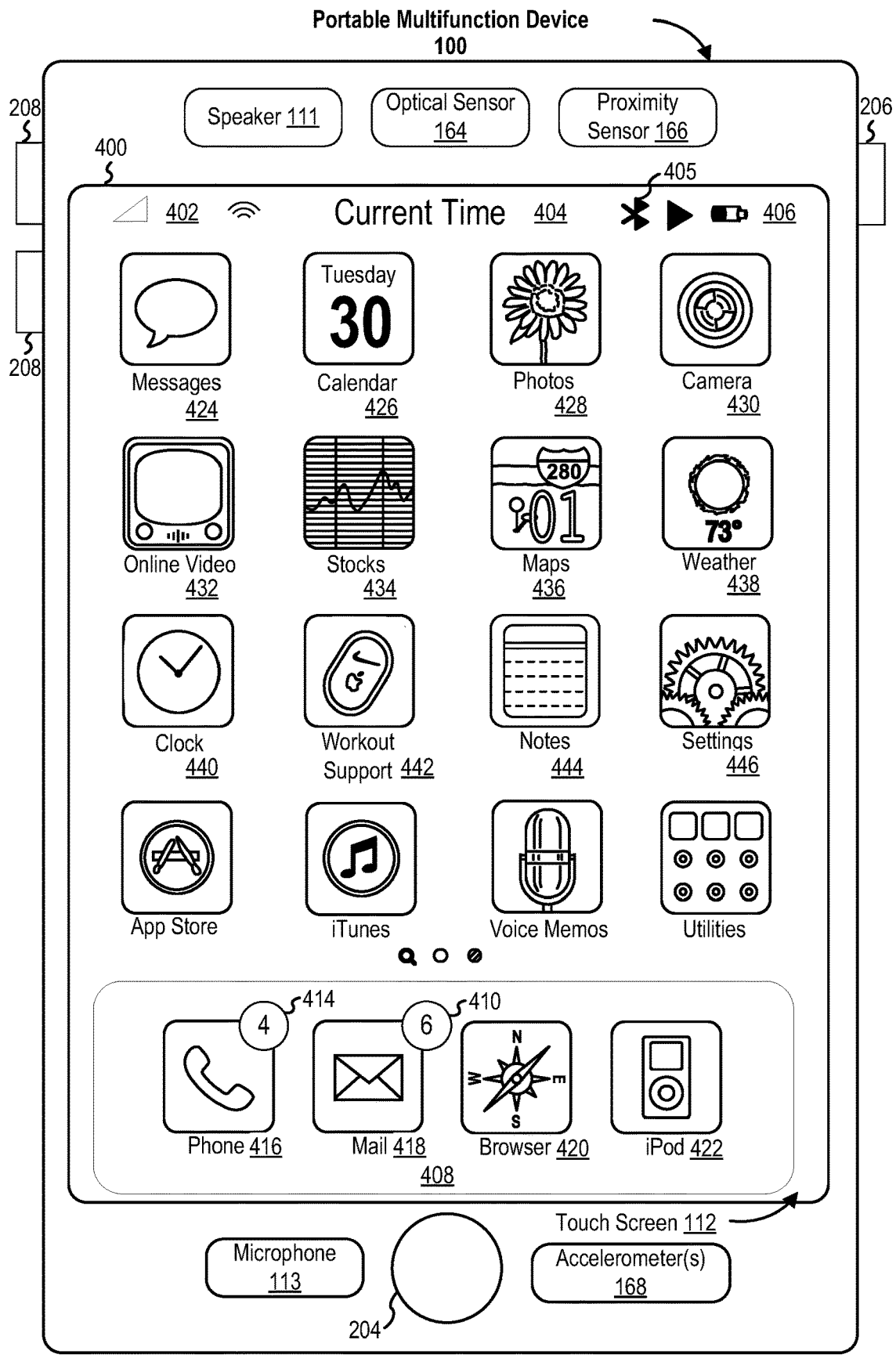
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
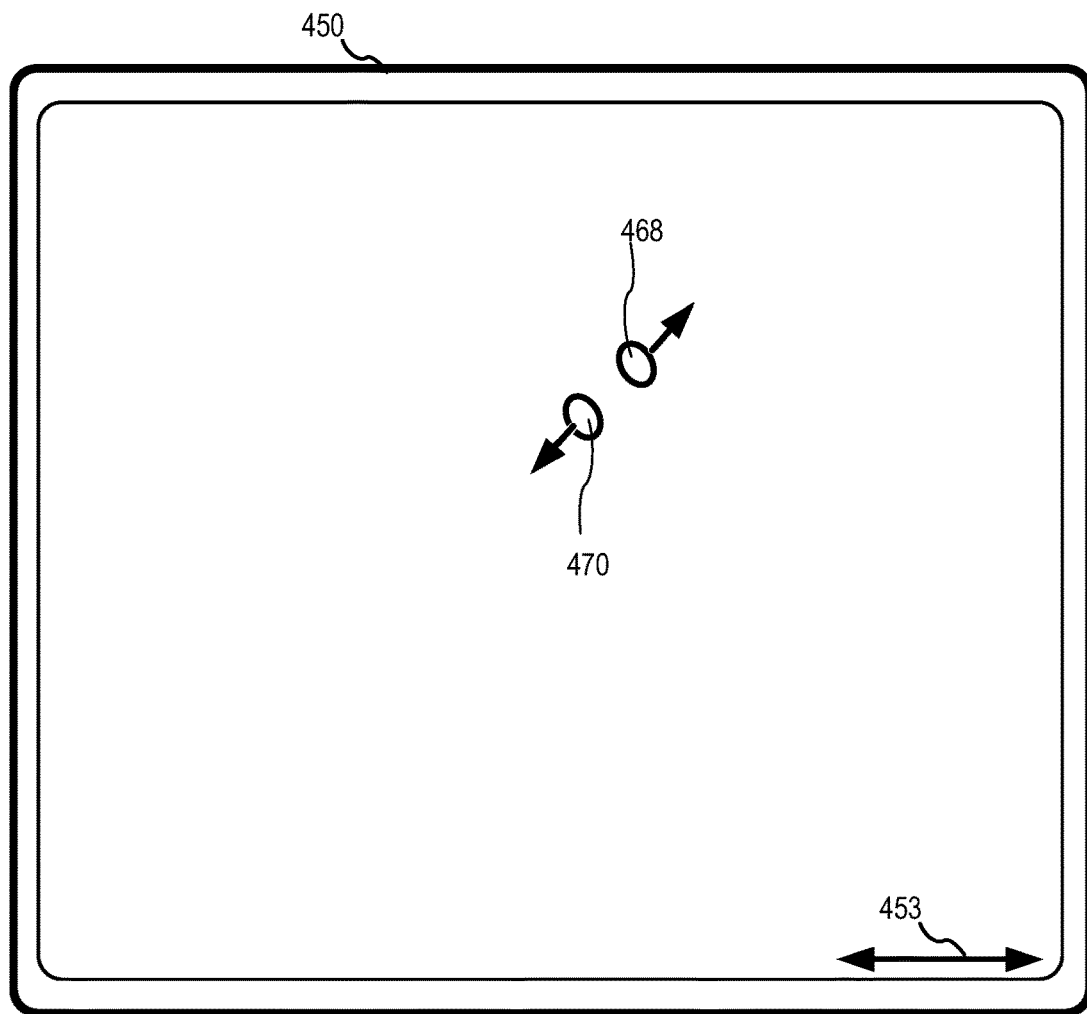
FIG. 4B illustrates an exemplary user interface for a multifunction device with a touch-sensitive surface that is separate from the display in accordance with some embodiments.
Figure 4B:
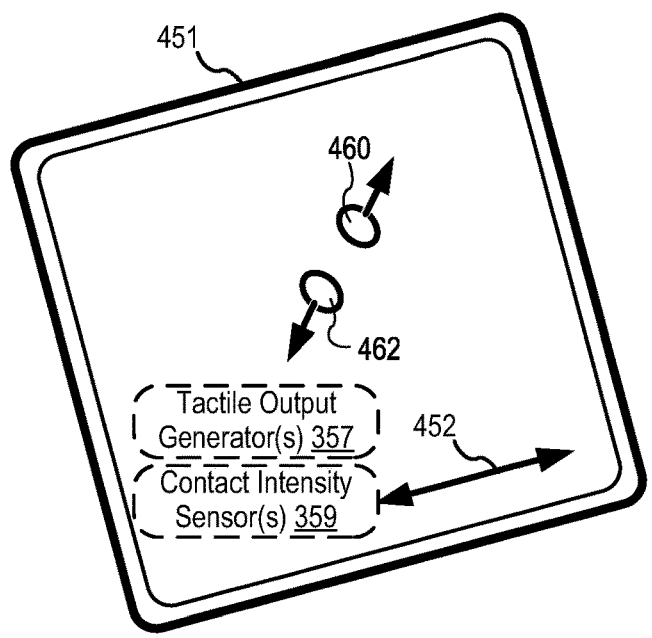

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
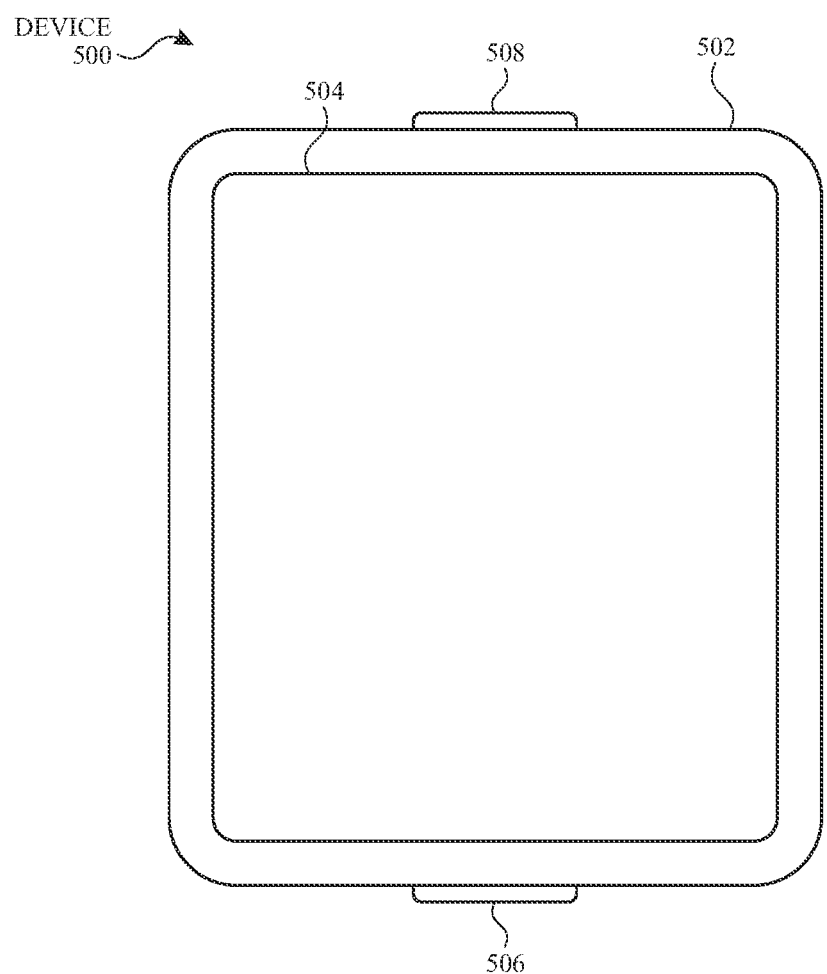
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
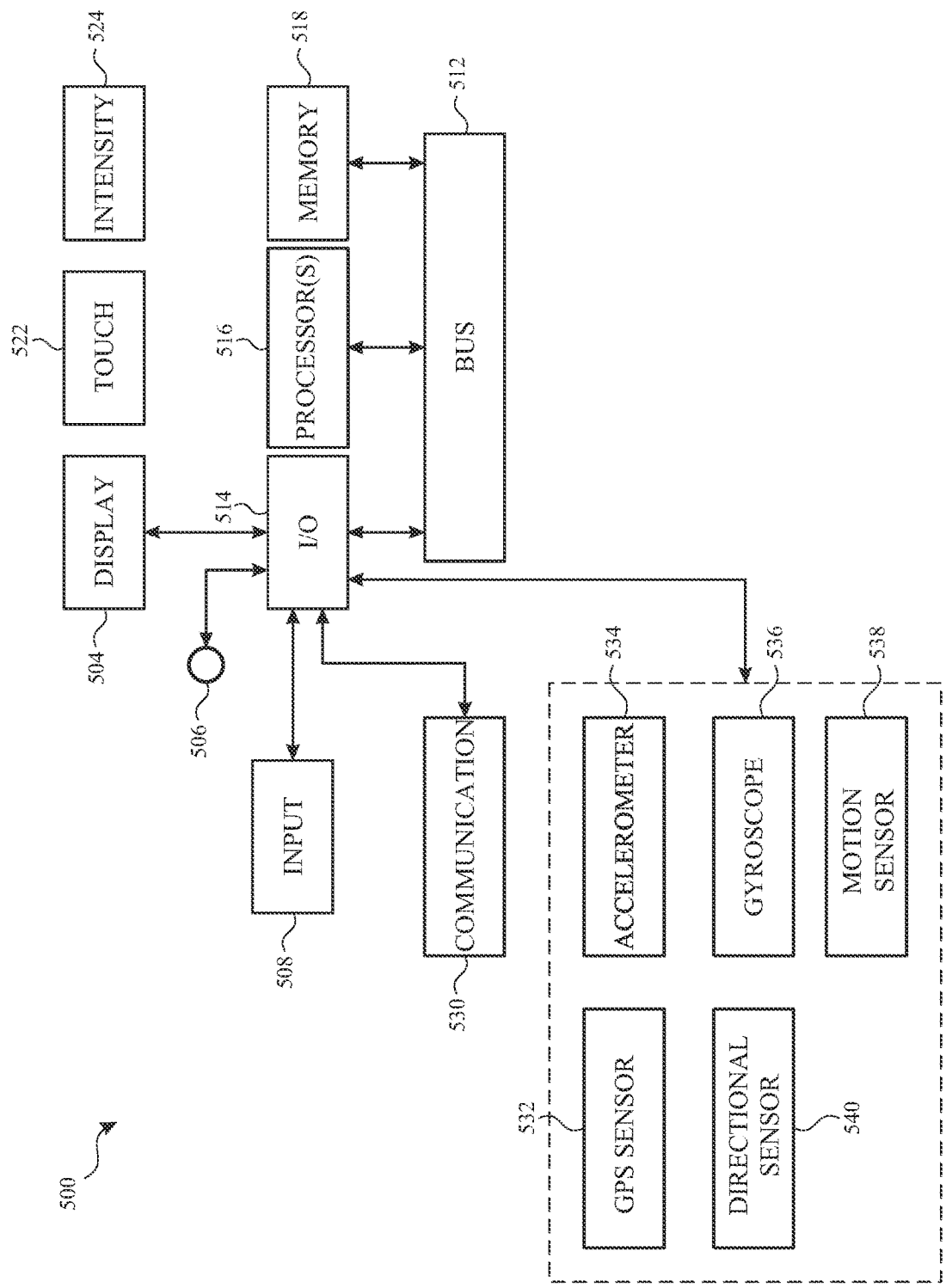
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6R illustrate exemplary user interfaces for controlling a device, in accordance with some embodiments. The user interfaces in these figures are used to illustrate the processes described below, including the processes in FIG. 7.

FIGS. 6A-6D illustrates exemplary graphical user interfaces for accessibility settings. The accessibility settings provide different options that can enable different modes of a device so that a user can better interact with and use devices 600 and 614. These different options in the accessibility settings allow a user to control a local device (e.g., device 600) and/or remote device (e.g., device 614) in different manners.

At FIG. 6A, device 600 displays interface 602a of an accessibility settings menu. In some embodiments, device 600 includes one or more features of devices 100, 300, and/or 500. Interface 602a includes menu option 604 to access a setting for screen reader and menu option 606 to access a setting for hand gestures. As explained in greater detail herein, when screen reader is enabled, device 600 will output a simulated voice of the contents of a user interface being displayed (e.g., sequentially) so that a user can hear different options provided by the user interface. When hand gestures are enabled, device 600 will detect air-based movements or actions when the device is worn by a user (e.g., on a user's wrist and/or on a user's head). Using one or more sensors (e.g., an optical sensor (e.g., a heart rate sensor), a camera), a gyroscope, an accelerometer)), device 600 can distinguish between different hand gestures and execute a corresponding command. In some embodiments, device 600 detects the hand gestures by detecting changes in the user's wrist, blood flow, and/or heartrate, rather than detecting the gestures using a camera (e.g., detecting hand movement or finger placement using the camera). In some embodiments, device 600 does not use a camera that has the user's hand in the field of view of the camera to detect hand gestures.

At FIG. 6A, while displaying interface 602a, device 600 detects input 650a (e.g., a tap gesture, and/or a mouse click). Interface 602a is a settings user interface that enables the user to modify how the user of device 600 interacts/interfaces with device 600. In response to detecting input 650a, device 600 displays interface 602b of a settings menu, as depicted in FIG. 6B.

At FIG. 6B, interface 602b includes menu option 608 to display hand gestures that are available. While displaying interface 602b, device 600 detects input 650b (e.g., a tap gesture and/or a mouse click) directed to menu option 608. In response to detecting input 650b, device 600 displays interface 602c of the settings menu, as depicted in FIG. 6C.

At FIG. 6C, interface 602c includes menu options for customizing a particular gesture to execute a particular command (e.g., function). Interface 602c also includes a toggle 610 to enable (and/or disable) gestures. As illustrated in FIG. 6C, toggle 610 is enabled. As such, device 600 will detect and act on hand gestures that it would otherwise not detect and/or act on had the toggle been disabled. In some embodiments, device 600 can distinguish between different hand gestures using one or more sensors (e.g., an accelerometer, a gyroscope, and/or an optical sensor (e.g., one or more cameras and/or a heart rate sensor)). In some embodiments, the device 600 detects gestures based how device 600 is worn. As illustrated, device 600 is a watch that is worn on a user's wrist. As such, in some embodiments, device 600 detects different hand gestures as described in and referred to as hand gestures in U.S. Provisional Application 63/221,331, which is hereby incorporated by reference in its entirety. In some implementations, hand gestures (e.g., a double-pinch gesture) can initiate commands such as: answer or end a phone call, dismiss a notification, take a photo, play or pause media, and start, pause, or resume a workout on device 600 (and/or device 614). In some embodiments, device 600 (and/or device 614) displays instructions that indicate the hand gesture for executing a particular command using assistive touch (e.g., double pinch to play music). For example, in response to receiving a call a device 600, device 600 can display an instruction to answer the call by using clench gesture 609c.

At FIG. 6C, functions can be customizable for multiple gestures. In some embodiments, to customize a particular hand gesture, device 600 provides an affordance for specific hand gestures, including a pinch affordance 608a for pinch gesture 609a, double-pinch affordance 608b for double-pinch gesture 609b (e.g., two pinches occurring within a period of time and/or in successive order), clench affordance 608c for clench gesture 609c, and/or double-clench affordance 608d for double-clench gesture 609d (e.g., two clenches occurring within a period of time and/or in successive order), in some embodiments. In some embodiments, if device 600 were a device worn on a different part of the body, device 600 provides affordances for different gestures. In embodiments, where device 600 is a head-worn device, gestures associated with affordances 608a-d optionally include a hand gestures performed in such a manner that the gestures are detected in a field of view of one or more cameras of the head-worn device. In some embodiments, for a head-word device, a single gesture includes detected movement of two hands of the user.

At FIG. 6C, while displaying interface 602c, device 600 detects input 650c (e.g., a tap gesture and/or a mouse click) on double pinch affordance 608b. In response to detecting input 650c, device 600 displays interface 602d of a settings menu, as depicted in FIG. 6D.

Figure 6D:
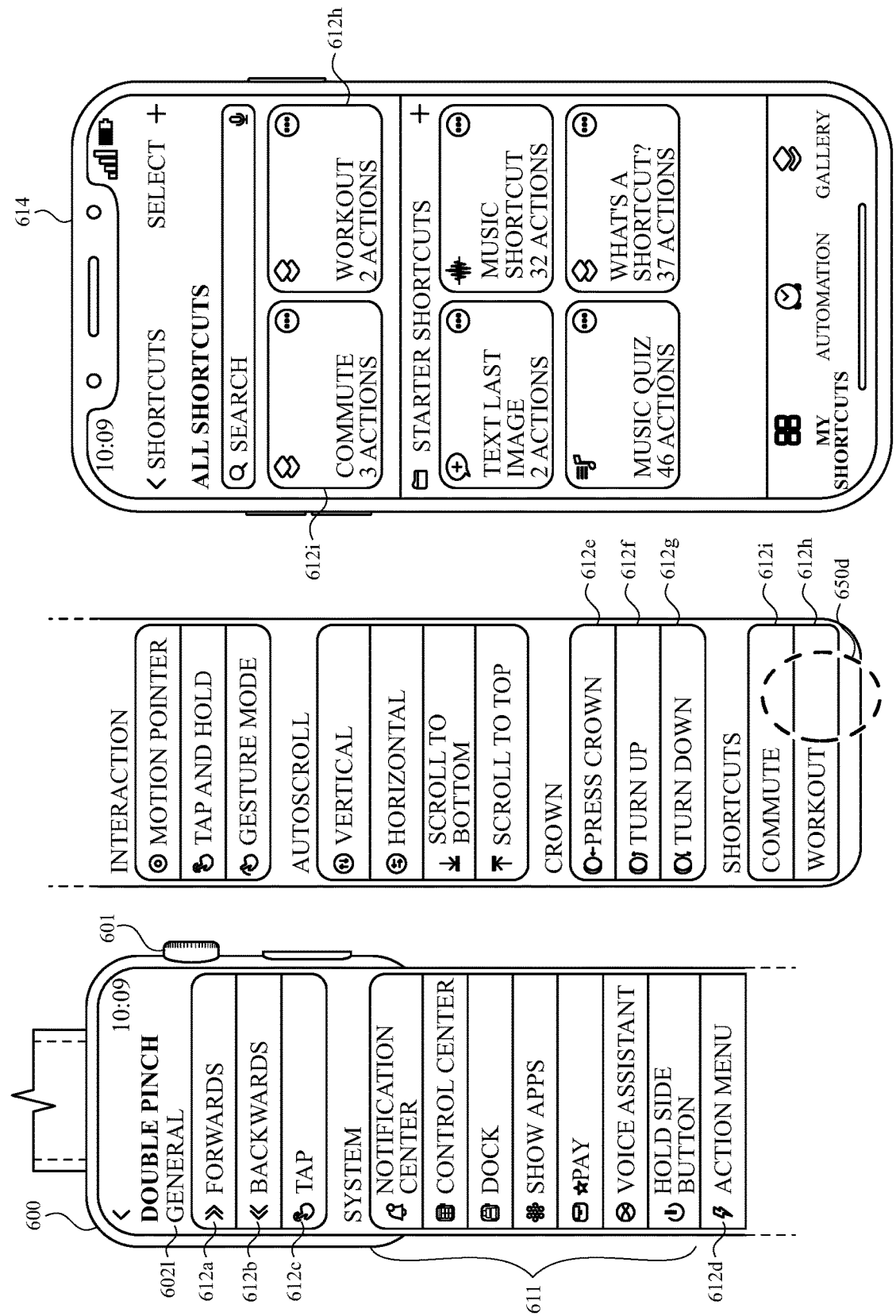

At FIG. 6D, interface 602d includes affordances 612a-c for configuring (e.g., designating or setting) a double-pinch gesture to execute a command (e.g., function and/or operation) of a visual indicator (e.g., visual indicator 622) (e.g., a highlighting and/or a selector). As illustrated, affordances 612a-c include affordance 612a to customize a command for advancing the visual indicator forwards (e.g., onto a subsequent item that is in a series of items) in response to detecting the respective gesture, affordance 612b to customize a command for moving the visual indicator backwards (e.g., onto a preceding item that is in the series of items) in response to detecting the respective gesture, and/or affordance 612c to customize a command that initiates a selection (e.g., of an item identified by the visual indicator and/or of a highlighted item) in response to detecting the respective gesture.

At FIG. 6D, options 612 includes options to execute a system action (e.g., displaying a user interface for notification and/or displaying a control user interface). As illustrated, options 612 provides an option for configuring a gesture to display action menu 612d, as described in greater detail below. Referring briefly to FIG. 6C, device 600 is configured so a double-clench executes a command to display action menu 612d.

At FIG. 6D, affordances 612e-612g include affordances to execute an input provided by rotatable input device 601 in response to detecting a hand gesture. As illustrated, affordances 612e-612g include affordance 612e to configure simulating a press (e.g., depress) of rotatable input device 601 to a hand gesture, affordance 612f to configure simulating rotation of rotatable input device 601 in a first direction (e.g., up and/or clockwise) to a hand gesture, and/or affordance 612g to configure simulating rotation of rotatable input device 601 in a second direction (e.g., down and/or counter-clockwise) to a hand gesture.

At FIG. 6D, options 612 include options to execute a shortcut. Shortcuts can include one or more (e.g., two or three successive commands) commands that are configured by the user, such as a shortcut for opening specific applications, automatically taking an action within the application, and/or modifying system settings (e.g., silence notifications and/or turn on airplane mode). As illustrated, interface 602d includes an option to execute workout shortcut 612h, as described in greater detail with respect to FIG. 6F. In some embodiments, interface 602 includes other shortcuts, such as a commute shortcut 612i.

At FIG. 6D, in some embodiments, shortcuts are configurable by device 600 and/or device 614. In some embodiments, device 600 and device 614 are in wireless communication, where system settings, modes, locations, and/or commands (e.g., inputs and/or system actions) are communicated between the devices. In some embodiments, device 600 and device 614 are logged into the same user account and communicate over a network. In some embodiments, device 600 and device 614 communicate directly, for example, using short-range wireless communications.

At FIG. 6D, options 612 are displayed with respect to a double-pinch gesture. However, options 612 can be configured for other hand gestures, such as for a pinch gesture, a clench gesture, and a double clench gesture.

At FIG. 6D, while displaying the option to execute workout shortcut 612h, device 600 detects an input 650d (e.g., a tap and/or mouse click) on the option to execute workout shortcut 612h. In response, device 600 configures a double pinch gesture to correspond to a command that executes workout shortcut 612h. Once the double pinch gesture is corresponded to (assigned to) the command that executes workout shortcut 612h, device 600 will execute workout shortcut 612h in response to detecting that the user of device 600 has performed the double pinch gesture.

Figure 6E:
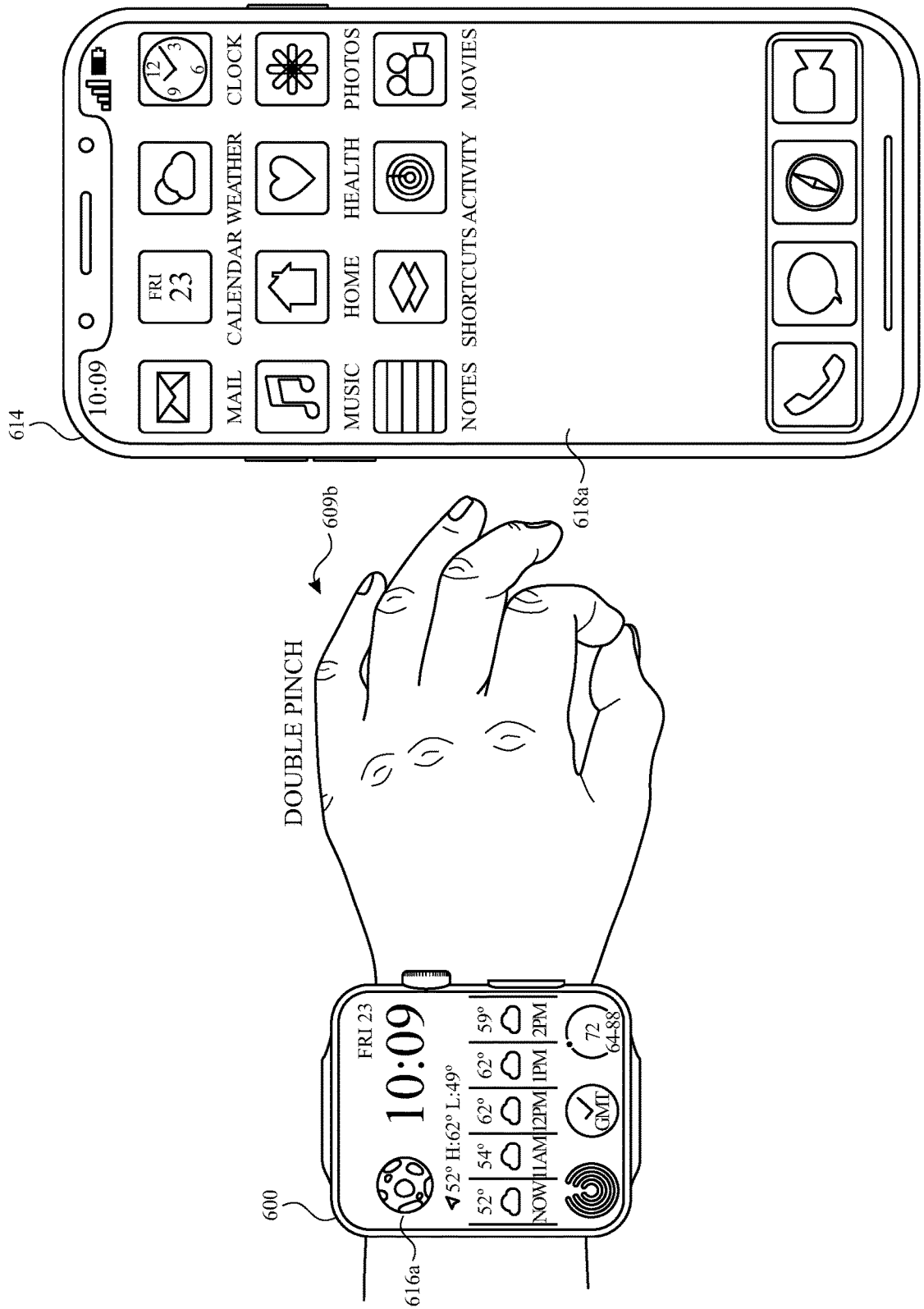

At FIG. 6E, a user has navigated device 600 to user interface 616a. While displaying interface 616a, device 600 detects double pinch gesture 609b (e.g., in the air, without touching a touch-sensitive display, and/or without touching a button of device 600). In response to detecting double pinch gesture 609b, device 600 executes workout shortcut 612k, which includes causing device 600 and/or device 614 to display respective workout interface 616b, as depicted in FIG. 6F.

Figure 6F:
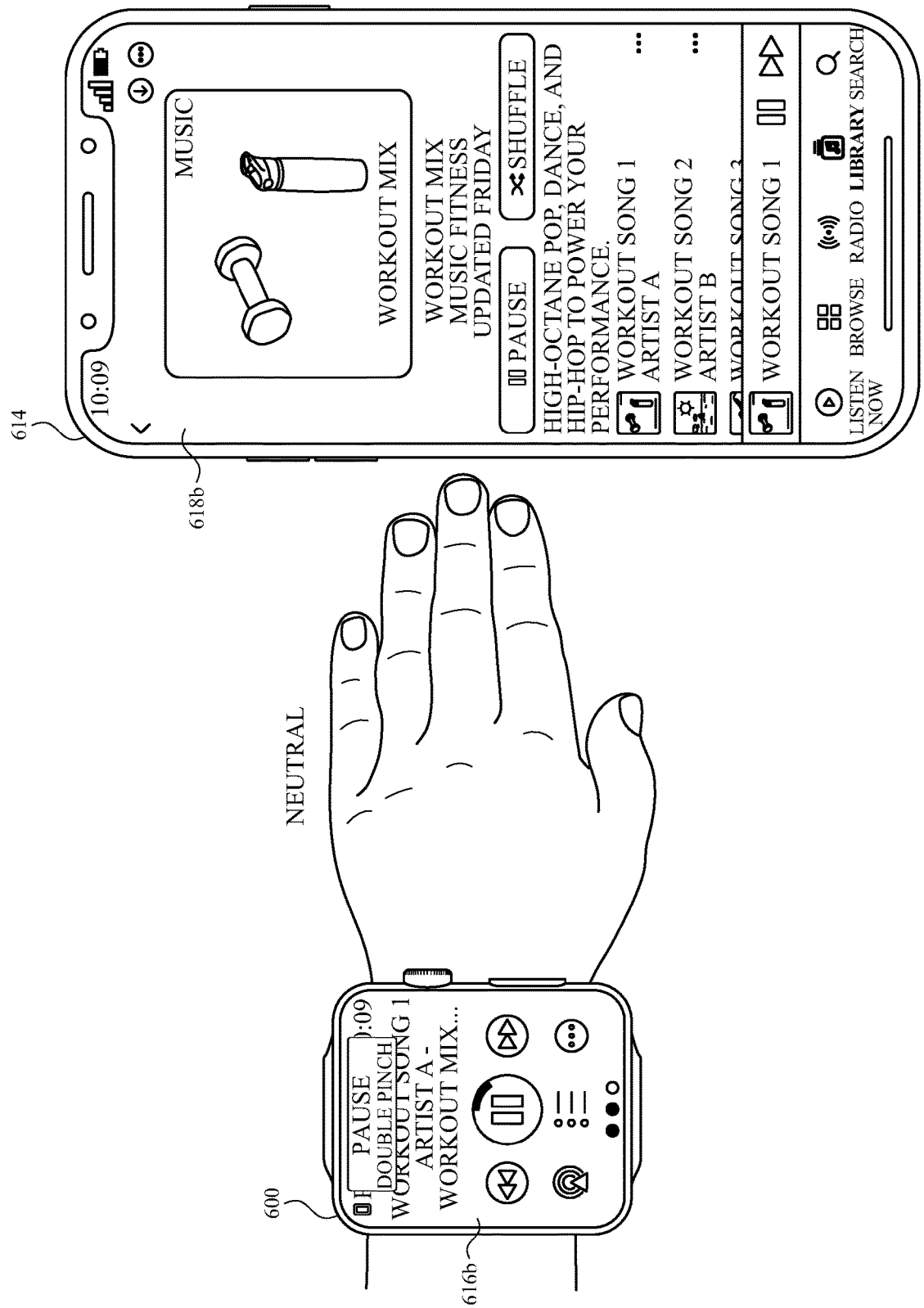

At FIG. 6F, device 600 has executed workout shortcut 612h. Workout shortcut 612h optionally includes a command to open a media application and a command play (e.g., automatically play) a song using the media application. As such, multiple commands can be executed in response to detecting a gesture (e.g., a single hand gesture). As illustrated, "workout song 1" is playing in user interface 616b of the media application.

At FIG. 6F, in some embodiments, hand gestures detected by device 600 cause a command to be executed at device 614 (and/or device 600). In some embodiments, device 600 (and/or device 614) displays instructions that indicate the hand gesture for executing a particular command using assistive touch. For example, while displaying interface 618b, device 600 (and/or device 614) can display an indication that a specific gesture causes device 600 (and/or device 614) to play and/or pause the music (e.g., double pinch to pause music) (e.g., as opposed to launch a shortcut). In some embodiments, the indication indicates that double pinch gesture 609b pauses music. In some embodiments, the indication indicates that a triple pinch gesture pauses music. In some embodiments, the indication indicates that a triple pinch gesture plays the music. In some embodiments, hand gestures detected by device 600 cause device 600 to launch a shortcut. For example, in response to detecting double pinch gesture 609b at FIG. 6E, device 614 executes workout shortcut 612h, which causes display of the media application at device 614, as depicted in FIG. 6F. In some embodiments, based on a set of criteria (e.g., proximity of device 600 and device 614, device 600 and device 614 are signed in the same user account, device 600 and device 614 are both unlocked, and/or device 600 and device 614 are paired), device 600 causes device 614 to display the media application when workout shortcut 612h is executed. In some embodiments, the shortcut causes display of respective media applications at both devices 600 and 614. In some embodiments, workout shortcut causes display of the media application at only one of devices 600 and 614 (and not at the other).

Figure 6G:
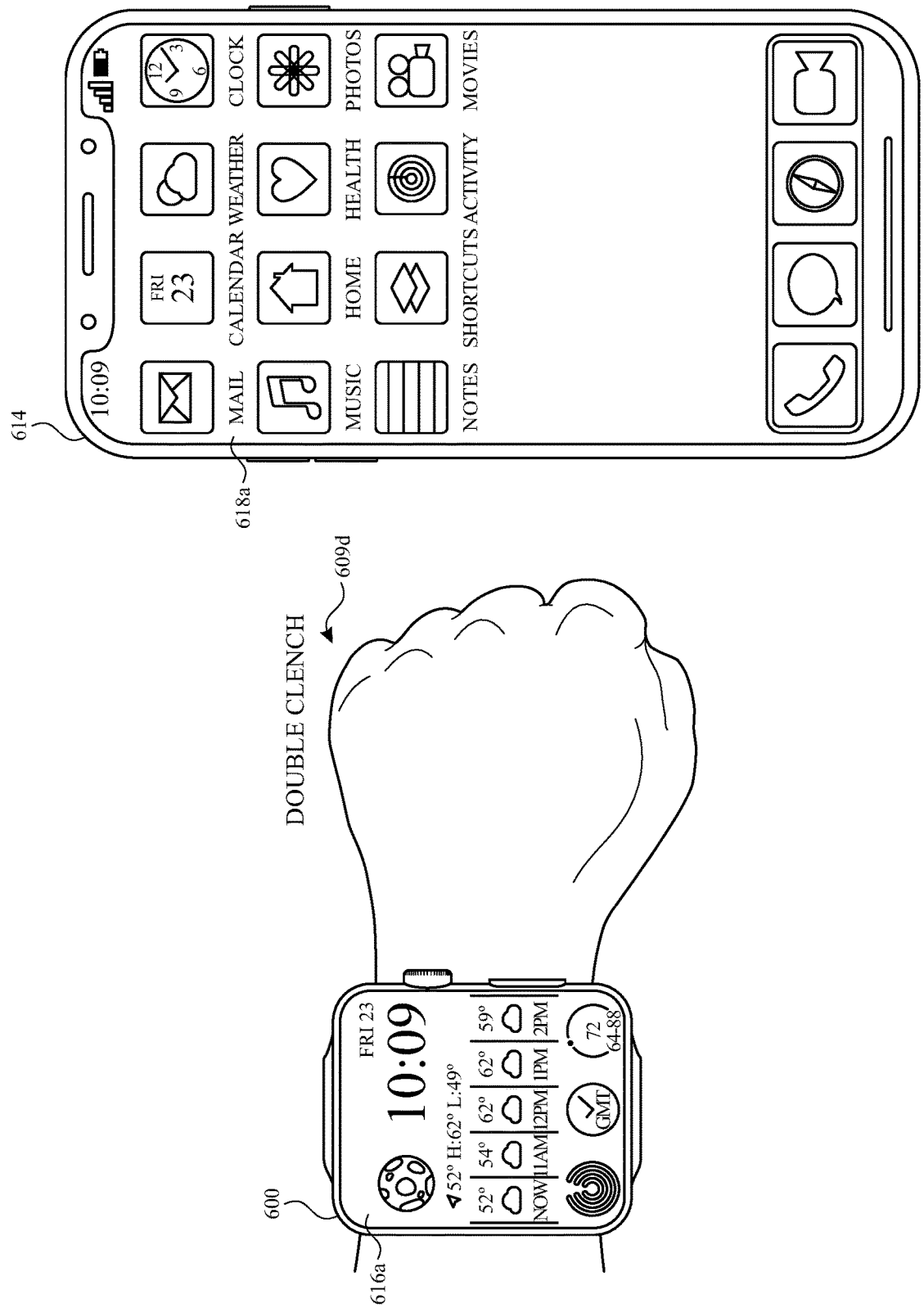

At FIG. 6G, a user has navigated back to interface 616a and device 614 is displaying interface 618a. In some embodiments, device 614 displays a lock screen instead of interface 618a. In some embodiments, device 614 is in a low power state and/or has a dim display (e.g., in response to timing out and/or not receiving user input for a threshold period of time) while displaying interface 618a or the lockscreen.

At FIG. 6G, while displaying interface 616a, device 600 detects an input (e.g., a series of touch inputs to display action menu 612d and/or double clench gesture 609d). In response to detecting the input at FIG. 6G, device 600 displays action menu 612d, as depicted in FIG. 6H.

Figure 6H:
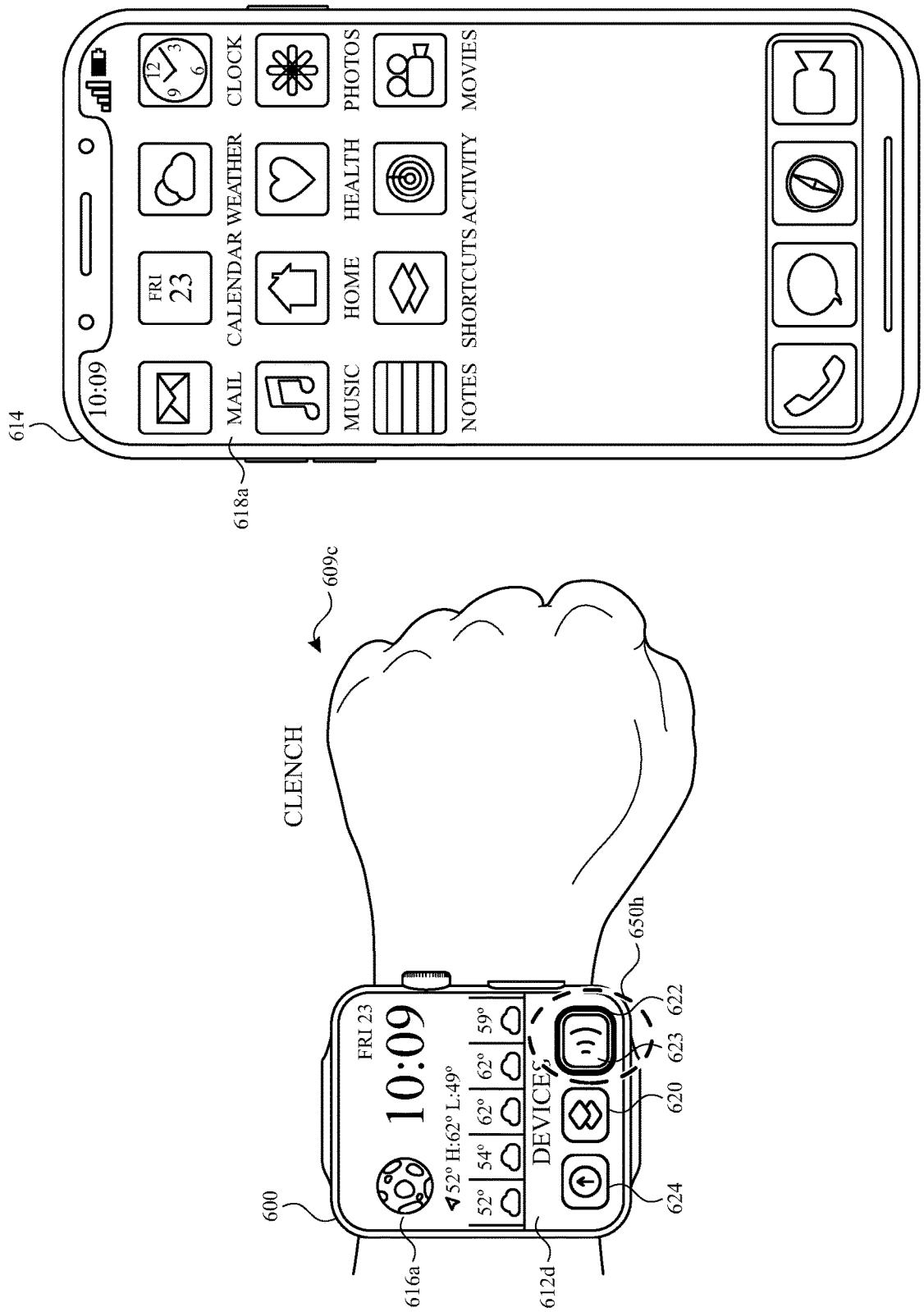

At FIG. 6H, action menu 612d includes affordances to perform specific actions. As illustrated, action menu 612d includes affordance 620 which, when selected, causes display of one or more shortcuts (e.g., commute shortcut 612i and/or workout shortcut 612h). Action menu 612d also includes affordance 623 which, when selected, causes display of a list of external (e.g., remote) devices that are controllable by device 600, as described in greater detail below.

At FIG. 6H, device 600 displays visual indicator 622 (e.g., highlighting, shading, symbol, cross-hairs, and/or shape) to distinguish affordance 624 from affordance 623. Visual indicator 622 provides an indication that device 600 will execute a command (e.g., selection and/or touch and drag) with respect to the user interface object (e.g., application icon, menu option, and/or affordance) that visual indicator 622 is associated with. In some embodiments, device 600 will move (e.g. translate and/or shift) visual indicator 622 from one user interface object to another in response to detecting user input (e.g., hand gestures). In some embodiments, device 600 displays an animation of visual indicator 622 moving. In some embodiments, device 600 does not display an animation of visual indicator 622 moving.

At FIG. 6H, prior to displaying visual indicator 622 on affordance 623, device 600 displays visual indicator 622 on affordance 624 (e.g., upon initial display of action menu 612d). Device 600 moves visual indicator 622 sequentially through action menu 612d in response to detecting an input corresponding to a request to move visual indicator 622. For example, in response to detecting an input (e.g., pinch gesture 609a and/or touch input 650a), device 600 ceases to display visual indicator 622 at affordance 624 and displays visual indicator 622 on affordance 620. In response to detecting another input (e.g., pinch gesture 609a and/or touch input), device 600 ceases to display visual indicator 622 on affordance 620 and displays visual indicator 622 on affordance 623.

At FIG. 6H, while displaying visual indicator 622 on affordance 623, device 600 detects an input (e.g., clench gesture 609c, mouse click, and/or tap 650h) to select affordance 623. In response to detecting the input to select affordance 623, device 600 displays device selector menu 626, as depicted in FIG. 6I.

Figure 6I:
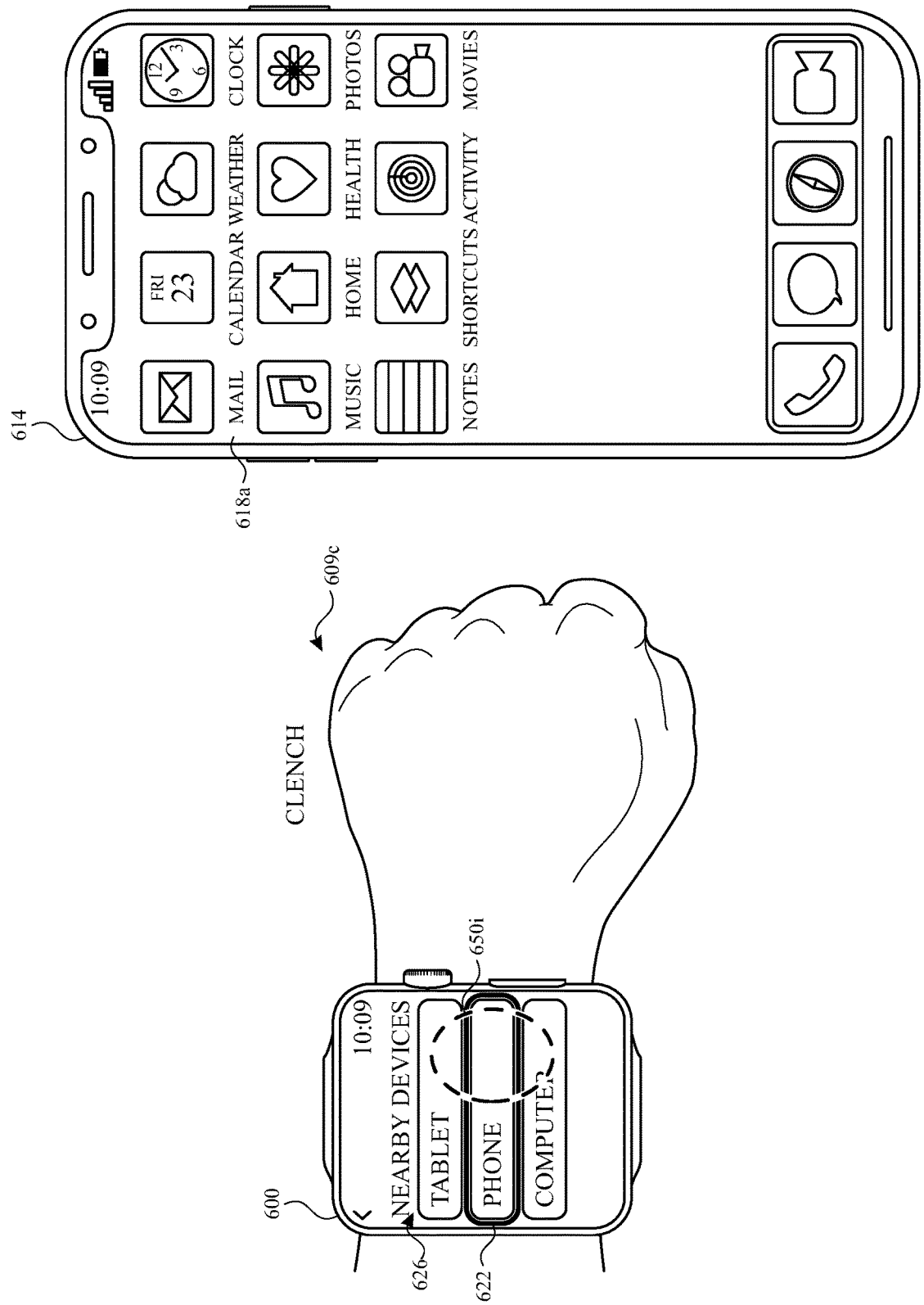

At FIG. 6I, device 600 displays device selector menu 626. Device selector menu 626 provides options to select an external device, such as device 614 or a different external device, to control. In some embodiments, device selector menu 626 includes options to control a tablet computer, a phone (e.g., device 614), and/or a computer (e.g., laptop and/or desktop). In some embodiments, other computer systems (e.g., smart TVs and/or a head mounted device) can be controlled by device 626.

At FIG. 6I, in some embodiments, device 600 and device 614 (and/or other devices in device selector menu 626) are logged into the same user account. In some embodiments, device selector menu 626 includes (e.g., only) options to control devices that are logged into the same account as device 600. In some embodiments, device selector menu 626 includes options to control devices that are within a threshold distance of each other (e.g., both devices are located in the same room, home, and/or city). For instance, device 600 and/or device 614 can communicate distance based on GPS data, based on being within short-range communication range, and/or based on being connected to the same LAN. In some embodiments, device selector menu 626 includes a first set of device types and excludes a second set of device types different than the first set of device types. For instance, larger devices (e.g., larger display area and/or physical dimensions) than device 600 are included while devices with displays that are smaller than device 600 are excluded (even if the devices with smaller displays are within the threshold distance and/or logged into the same user account as device 600). As a further example, phones, tablets, laptops, and/or desktops are included in device selector menu 626 while smart televisions and/or streaming computing devices for a television are not (even if the devices are within the threshold distance and/or logged into the same user account as device 600).

At FIG. 6I, in some embodiments, device 600 and device 614 are in communication (e.g., wireless communication, such as LAN, Bluetooth, and/or via a network) prior to receiving the input selecting the option to control device 614. In some embodiments, device 600 and device 614 are/stay in communication after receiving input of FIG. 6I (e.g., while device 600 controls device 614 at FIGS. 6J-6P). In some embodiments, device 600 and device 614 stay in communication when device 600 is no longer controlling device 614.

At FIG. 6I, in some embodiments, device 600 and device 614 are in wireless communication, where system settings (e.g., accessibility settings), modes, and/or commands (e.g., inputs, system actions, and/or shortcuts) are communicated between the devices prior to receiving an input selecting an option to control device 614. In some embodiments, system settings (e.g., accessibility settings), modes, and/or commands (e.g., inputs and/or system actions) are communicated between devices 600 and 614 in response to receiving an input at device 600 selecting an option to control device 614.

At FIG. 6I, while displaying device selector menu 626, device 600 detects an input (e.g., clench gesture 609c, mouse click, and/or tap 650i) selecting an option to control device 614. In response to detecting the input selecting an option to control device 614, device 600 displays a specific user interface depending on how accessibility settings are configured at device 614 and/or device 600. As described herein, at FIGS. 6J-6L, device 600 displays user interface 630 in response to the input selecting the option to control device 614 and when screen reader is disabled on device 600 and adaptive navigation is enabled on device 614. At FIGS. 6M-6P, device 600 displays user interface 632 in response to detecting the input selecting the option to control device 614 and when screen reader is enabled on device 600 and adaptive navigation is disabled on device 614. Automatically displaying user interface 630 or user interface 632 based on how devices 600 and device 614 are configured causes device 600 to display the appropriate controls based on how devices 600 and device 614 are configured, which reduces the number of inputs at device 600 (and/or device 614) and provides visual feedback as to how each device is configured.

Figure 6J:
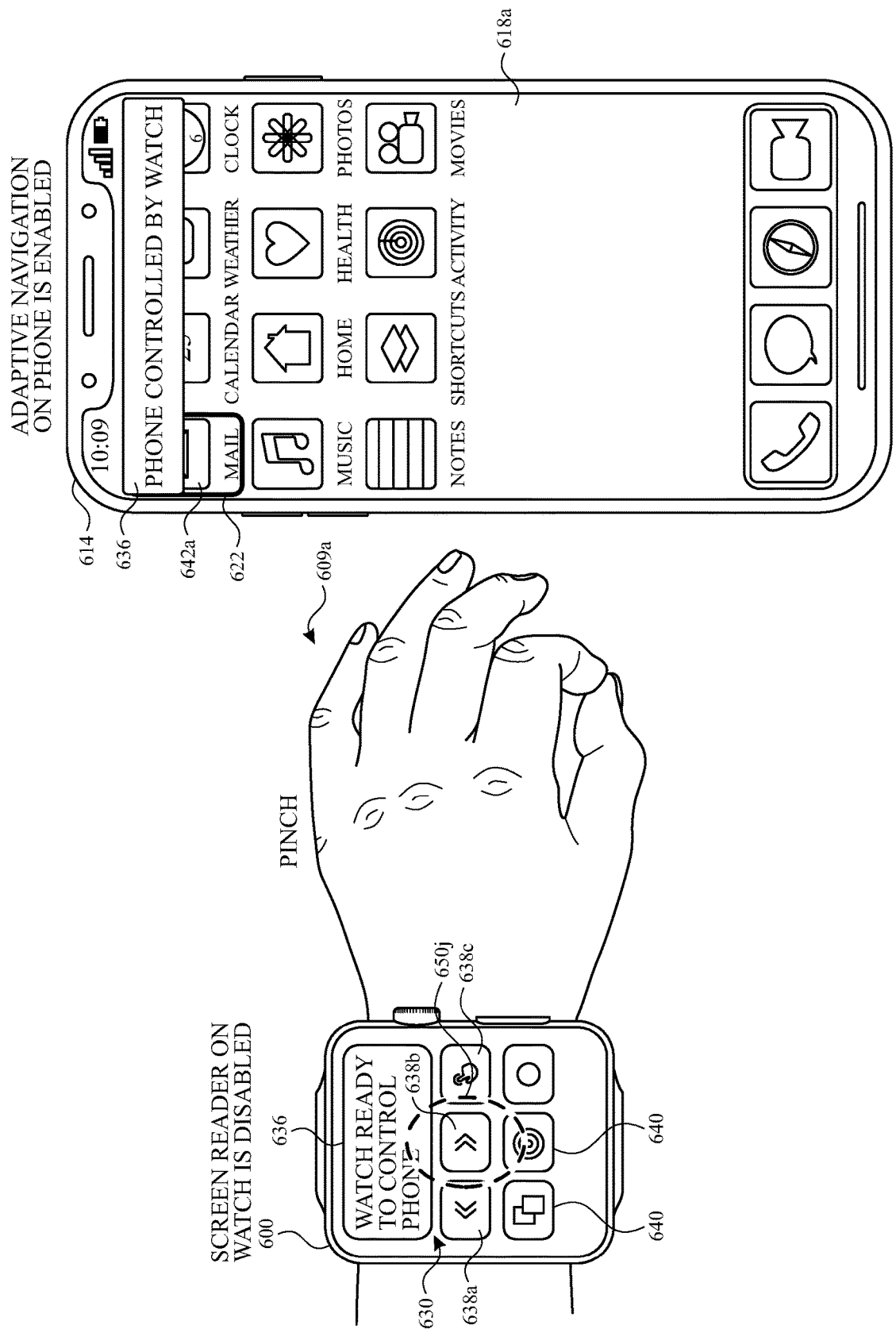
Figure 6K:
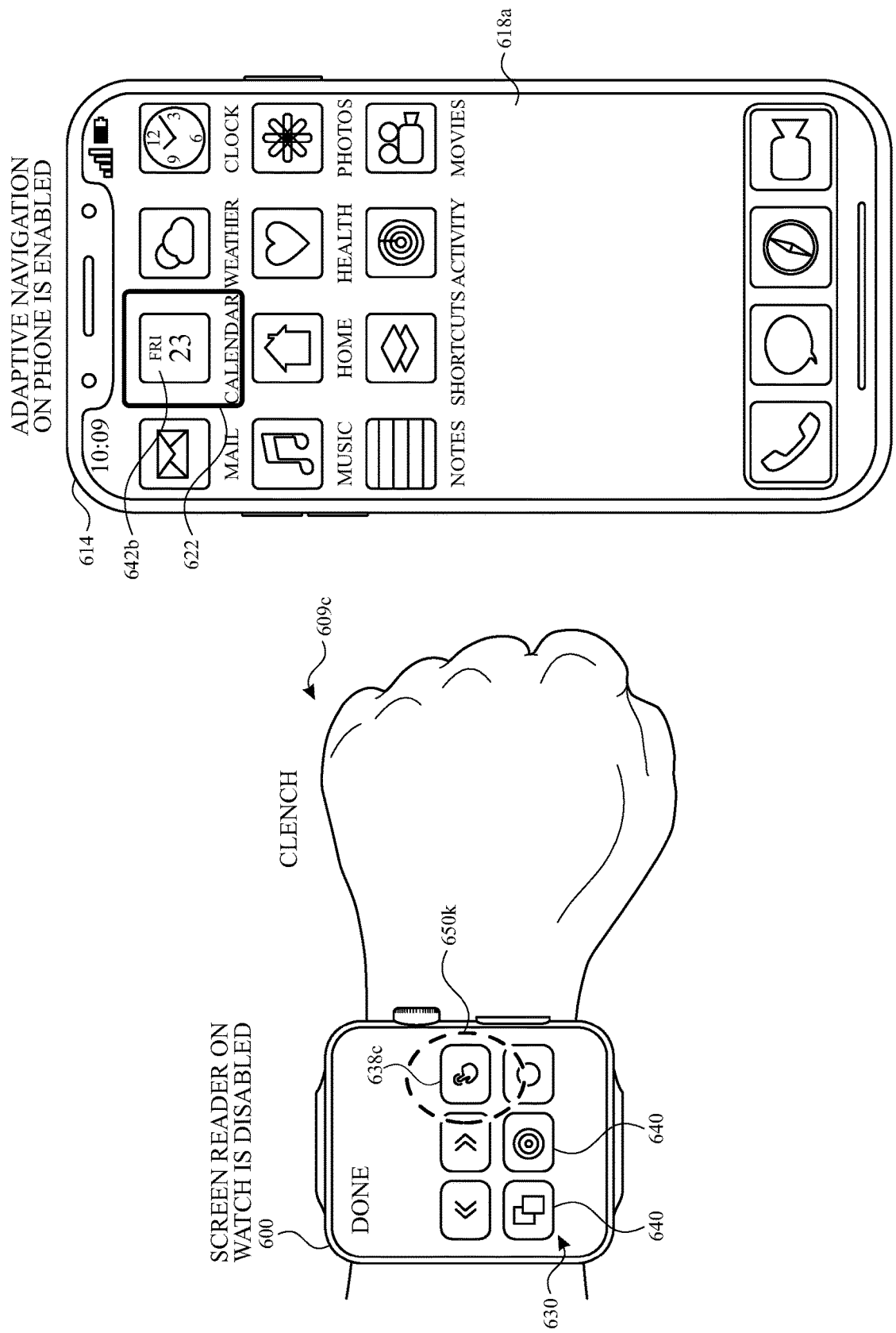
Figure 6L:
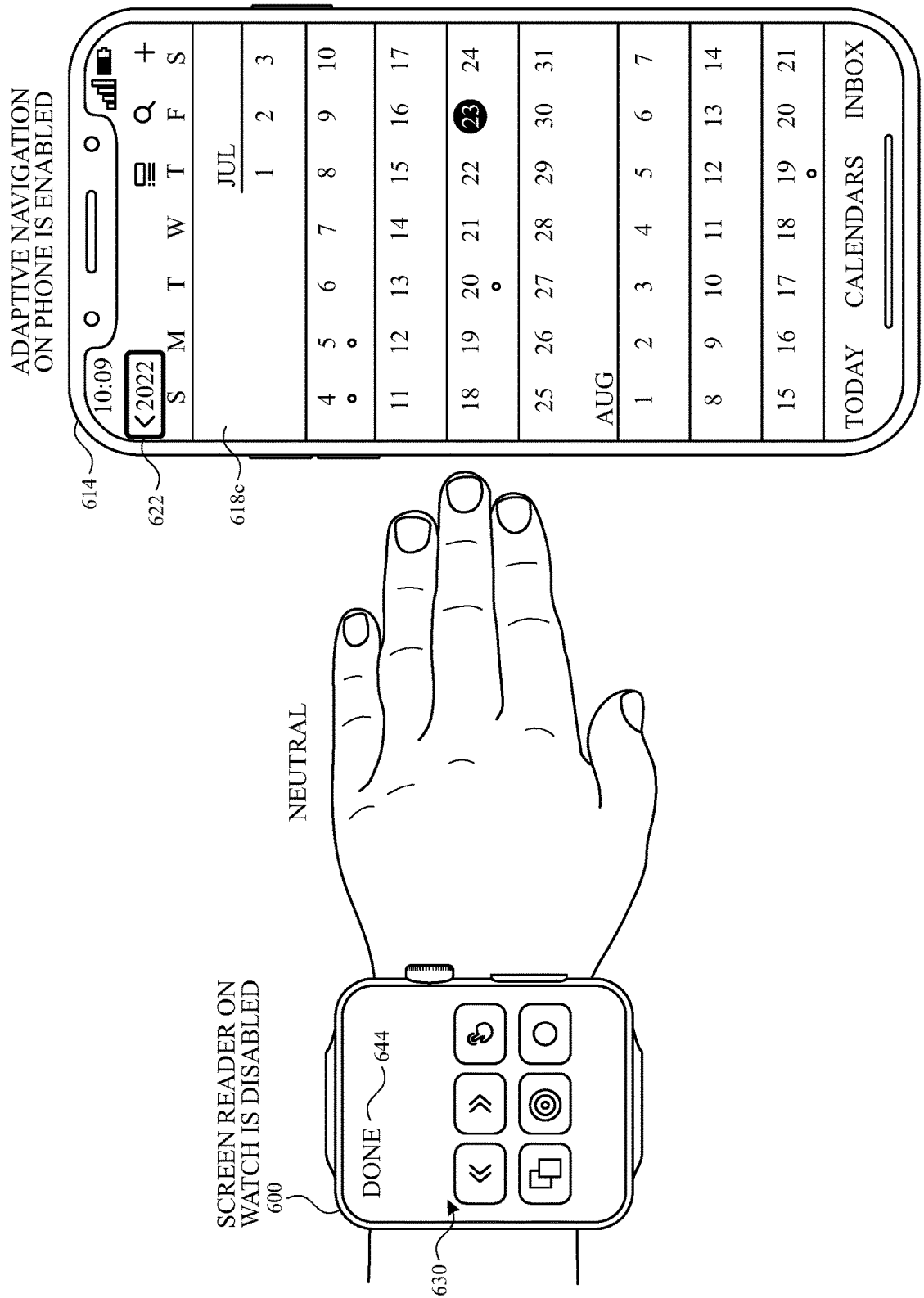

At FIGS. 6J-6L, screen reader is disabled on device 600 and adaptive navigation is enabled on device 614. Adaptive navigation is an additional (or, optionally, alternative) input setting that allows a user (e.g., a user with a motor impairment) to navigate a user interface using user-configurable controls and/or devices. Turning briefly to FIG. 6R, adaptive navigation is enabled (e.g., using a toggle and/or button) under a system setting (e.g., accessibility setting) of device 614. Screen reader is enabled at device 600 by navigating into menu option 605 for accessibility settings, described in FIG. 6A.

At FIG. 6J, device 614 displays visual indicator 622 based on adaptive navigation being enabled at device 614. In some embodiments, adaptive navigation is enabled at device 614 (e.g., by user input detected at device 614) prior to device 600 controlling device 614. In some embodiments, device 614 displays visual indicator 622 prior to device 600 controlling device 614 if adaptive navigation is enabled prior to device 600 controlling device 614. In some embodiments, prior to (or after) using device 600 to control device 614, a user controls device 614 using visual indicator 622 and inputs at device 614. In some embodiments, visual indicator 622 displayed on device 614 has a similar or different appearance as visual indicator 622 that is displayed on device 600. In some embodiments, visual indicator 622 that is displayed on device 600 ceases to be displayed in response to detecting that device 600 is controlling device 614. In some embodiments, visual indicator 622 continues to be displayed on device 600 while device 600 controls device 614. In such embodiments, visual indicator 622 at device 600 is controlled using hand gestures to navigate and select affordances (e.g., affordances 638 and/or system affordances 640) which, in turn, initiates a command to move visual indicator 622 at device 614.

At FIG. 6J, in some embodiments, a device displays notification 636 (e.g., a notification overlaid on a user interface) that a device is being controlled (or is controlling) another device. As illustrated, device 600 displays notification 636 indicating that device 600 is ready to control device 614. Device 614 displays notification 636 indicating that device 614 is controlled by device 600. In some embodiments, notification 636 is persistent (e.g., always displayed while device 600 controls device 614). In some embodiments, notification 636 is temporary (e.g., device 614 displays notification 636 for a threshold amount of time and then ceases to display notification 636 once the threshold amount of time is reached).

At FIG. 6J, in response to the input received at FIG. 6I, and based on screen reader being disabled at device 600 and adaptive navigation being enabled at device 614, device 600 displays interface 630. Interface 630 is an interface that includes one or more user interface objects for controlling device 614. As illustrated, interface 630 includes one or more affordances 638 (e.g., next affordance 638a to advance forwards, back affordance 368b to advance backwards, and select affordance 638c) (e.g., similar to input controls 612a-612c of FIG. 6D) for controlling visual indicator 622 displayed on device 614. Interface 630 includes one or more system affordances 640 for controlling system actions (similar to system actions 611 of FIG. 6D) of device 614. In some embodiments, one or more system affordances 640 include an affordance for displaying open applications (e.g., an application switcher) of device 614 and/or an affordance for displaying a home screen of device 614.

At FIG. 6J, in some embodiments, device 614 responds to inputs received at device 614 (e.g., a user can still control device 614 as the user typically would despite device 614 concurrently being controlled by device 600). For instance, controlling device 614 by input at 600 does not disable device 614 from detecting input received at device 614. In some embodiments, device 614 does not respond to input at device 614 while controlled by device 600 (e.g., a user cannot control device 614 using input at device 614 based on being controlled by device 600). In some embodiments, device 614 does not display interface 630 (e.g., and/or one or more of its user interface objects) while device 600 displays interface 630.

At FIG. 6J, while displaying interface 630, device 600 detects an input (e.g., pinch gesture 609a and/or tap 650j on next affordance 638) to move visual indicator 622. In response to detecting the input to move visual indicator 622, device 600 initiates a command for device 614 to move (e.g., advance) visual indicator 622 in user interface 618a (e.g., from mail application 642a to calendar application 642b), as depicted in FIG. 6K.

At FIG. 6K, while displaying interface 630, device 600 detects an input (e.g., clench gesture 609c and/or tap 650k) corresponding to a selection. In response to device 600 detecting the input corresponding to the selection, device 600 initiates a command for device 614 to perform a selection. Because visual indicator 622 is on calendar application 642b when the input (e.g., clench gesture 609c and/or tap 650k) is received, device 614 selects calendar application 642b which causes display of user interface 618a, as depicted in FIG. 6L.

At FIG. 6L, device 614 displays user interface 618c of calendar application 642b. In some embodiments, in response to detecting further inputs (e.g., hand gestures and/or touch inputs) at device 600, device 600 optionally moves visual indicator 622 displayed on device 614. As described in further detail with reference to FIG. 6N, in some embodiments, visual indicator 622 is moved through a user interface (e.g., interface 618a and/or user interface 618c) more rapidly in response to device 600 detecting a rotational input of rotatable input device 601 and/or a hand gesture corresponding to (e.g., simulating) crown rotation (e.g., hand gesture corresponding to (e.g., simulating) a rotation of rotatable input device 601 in the first direction and/or a rotation of rotatable input device 601 in the second direction).

In some embodiments, interface 630 includes done affordance 644 that terminates the session of device 600 controlling device 614 using interface 630. In some embodiments, device 600 is in communication with device 614 after receiving an input directed at affordance 644 and/or after device 600 is no longer controlling visual indicator 622 of device 614. In some embodiments device 600 is paired with device 614.

At FIGS. 6M-6P, device 600 displays user interface 632 in response to the input selecting the option to control device 614. As illustrated, screen reader is enabled on device 600 and adaptive navigation is disabled on device 614. Screen reader is an additional (or, optionally, alternative) input setting that allows a user (e.g., a user with a visual impairment) to navigate a user interface on a device. In some embodiments, screen reader includes display of visual indicator 622. In some embodiments, visual indicator 622 for screen reader has a similar or different appearance as visual indicator 622 for adaptive navigation. When operating with screen reader enabled, information about a graphical user interface object (e.g., the name of the object and/or the function the object will perform) in which the visual indicator 622 is on will be output via a simulated voice by a device (e.g., device 600, device 614, a wirelessly connected headphone, and/or another device will provide audio output).

Turning briefly to FIG. 6R, in some embodiments, screen reader is enabled or disabled via user input at device 614 (e.g., using a toggle and/or button) under a system setting (e.g., an accessibility setting) of device 614.

Figure 6M:
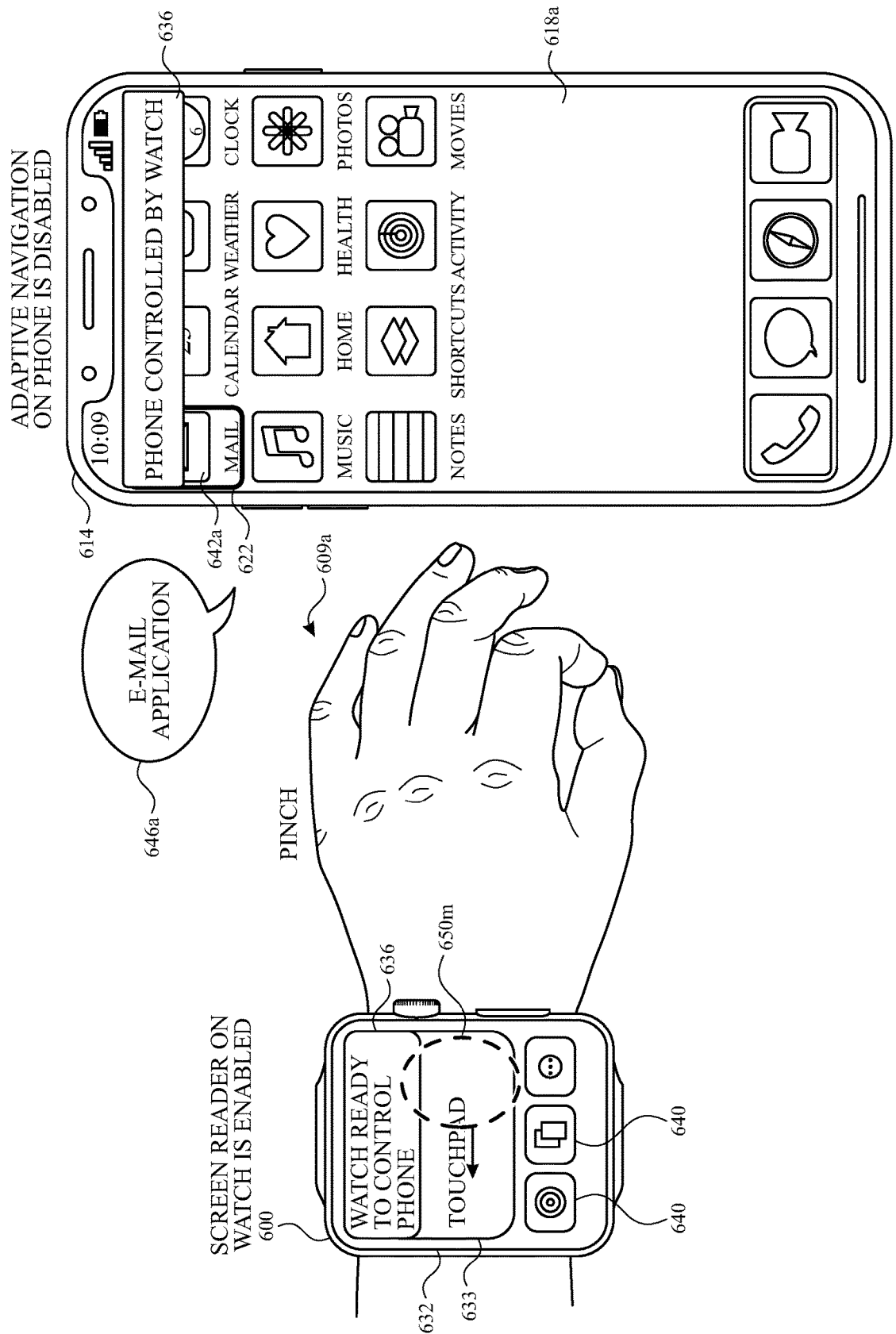

At FIG. 6M, in some embodiments, screen reader is enabled (e.g., automatically) on device 614 when screen reader at device 600 is enabled and device 600 begins controlling device 614. For instance, in some embodiments, when screen reader is enabled on device 600 and in response to device 600 detecting the input to select affordance 623 of FIG. 6I, device 600 initiates a command to enable screen reader on device 614. In response to receiving the command to enable screen reader on device 614, device 614 enables screen reader.

At FIG. 6M, device 614 provides audio output 646a of mail application 642a ("e-mail application"). In some embodiments, the audio output includes audio output corresponding to the function being performed (e.g., "open e-mail application"). In some embodiments, device 600 provides audio output 646a of mail application 642a ("e-mail application") (e.g., in addition to device 614 providing the audio output and/or instead of device 614 providing the audio output).

At FIG. 6M, in some embodiments, device 600 and device 614 display notification 636. As described above, in some embodiments, device 614 responds to input at device 614 (e.g., a user can still control device 614 despite being controlled by device 600). For instance, controlling device 614 by input detected at device 600 does not disable device 614 from detecting input received at device 614. In some embodiments, device 614 does not respond to input at device 614 while being controlled by device 600 (e.g., a user cannot control device 614 using input at device 614 based on being controlled by device 600). In some embodiments, device 614 does not display interface 632 (e.g., and/or one or more of its user interface objects) while device 600 displays interface 632.

At FIG. 6M, in response to screen reader being enabled at device 600 and adaptive navigation being disabled at device 614, device 600 displays interface 632. As illustrated, interface 632 includes touchpad area 633 for controlling device 614. In some embodiments, touchpad area 633 is occupies an area of the user interface and corresponds to a region where the device 600 detects one or more touch inputs (e.g., a tap, a swipe, a two-finger swipe, and/or a two-finger rotation). The one or more touch inputs allow a user of device 600 to navigate user interfaces of device 614. In some embodiments, the one or more touch inputs control visual indicator 622 (e.g., move forward, move backward, and/or select) (e.g., similar to commands associated with affordances 612a-c of FIG. 6D). In some embodiments, one or more touch inputs (e.g., a set of inputs and/or all of the inputs) that are detectable at device 614 when screen reader is enable at device 614 are detectable via touchpad area 633 (and performs the same operation had the input been detected by device 614). In some embodiments, touchpad area 633 controls device 614 beyond (e.g., additionally and/or alternatively) controlling visual indicator 622 (e.g., execute a zoom command using a pinch and/or execute a scroll based on two finger swipe). In some embodiments, interface 632 includes one or more user interface objects for controlling device 614. As illustrated, interface 632 includes one or more system affordances 640 for controlling system actions (similar to system actions 611 of FIG. 6D) of device 614.

At FIG. 6M, while displaying interface 632, device 600 detects an input (e.g., pinch 609a and/or swipe 650m) to move visual indicator 622. In response to detecting the input to move visual indicator 622, device 600 instructs device 614 to move visual indicator 622 from mail application 642a to calendar application 642b, as depicted in FIG. 6N.

Figure 6N:
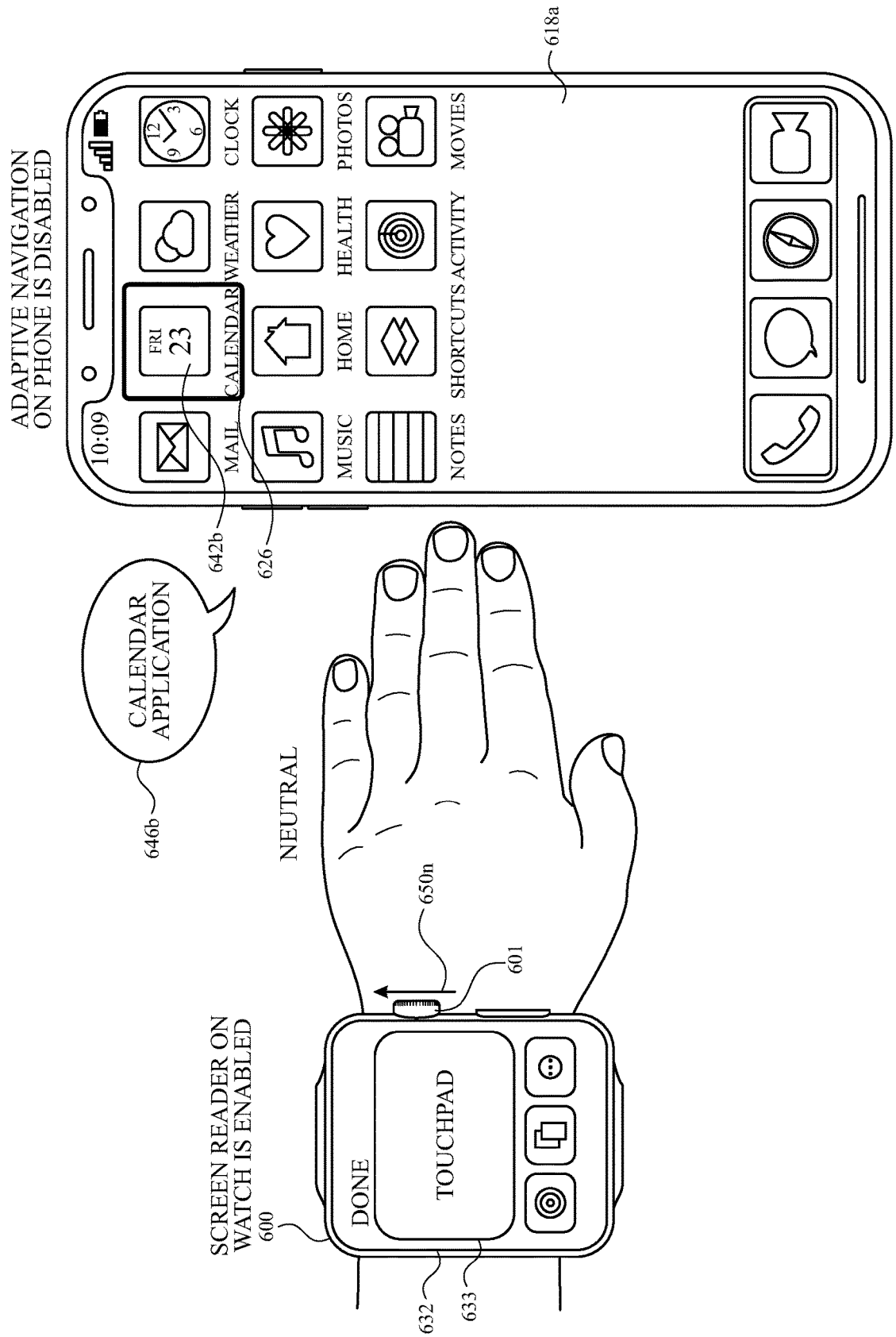

At FIG. 6N, device 614 displays visual indicator 622 on calendar application 642b. In some embodiments, device 614 (and/or device 600) provides audio output 646b corresponding to calendar application 642b (e.g., a simulated voice used to output audio corresponding to "calendar application" and/or "open calendar application").

At FIG. 6N, in some embodiments, visual indicator 622 moves through the user interface more rapidly in response to a rotational input of rotatable input device 601 and/or a gesture corresponding to (e.g., simulating) rotational input control (e.g., hand gesture corresponding to (simulating) rotation of rotatable input device 601 in the first direction and/or rotation of rotatable input device 601 in the second direction)). In some embodiments, while displaying interface 630, device 600 detects an input (e.g., a hand gesture configured to execute (simulating) a rotational input and/or rotational input 650n of rotatable input device 601). In response to detecting the input, device 600 instructs device 614 to move visual indicator 622 from mail application 642a to movie application 642c, as depicted in FIG. 6O.

Figure 6O:
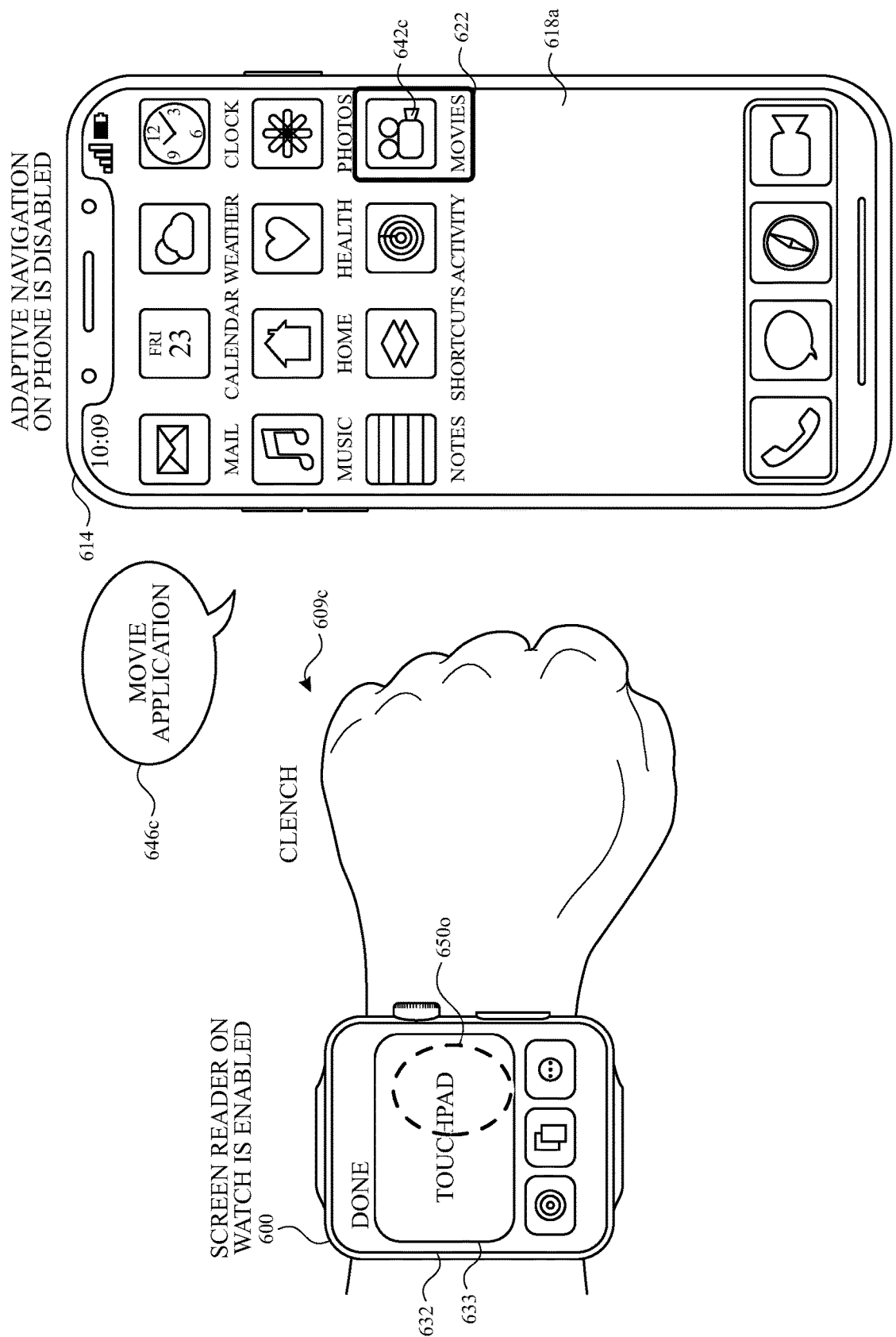

At FIG. 6O, visual indicator 622 is displayed on movie application 642c. As illustrated, device 614 provides audio output 646 corresponding to movie application 642c (e.g., "movie application" and/or "open movie application"). while displaying interface 632, device 600 detects an input (e.g., clench 609c and/or tap 650o) corresponding to a selection. In response to device 600 detecting the input corresponding to the selection, device 600 instructs device 614 to perform a selection. Because visual indicator 622 is on movie application 642c, device 614 displays user interface 618d of movie application 642c, as depicted in FIG. 6P.

Figure 6P:
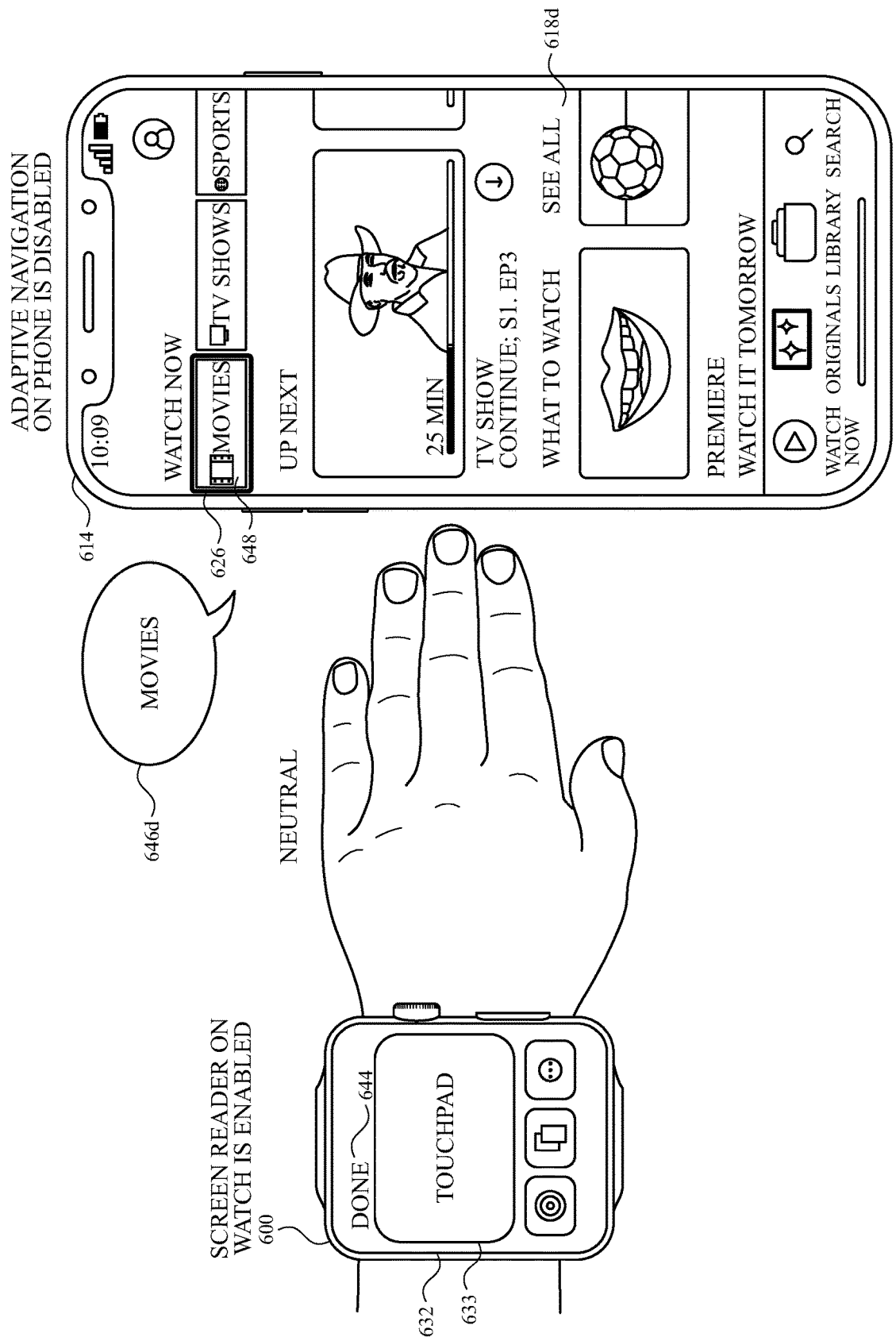

At FIG. 6P, device 614 displays user interface 618d of movie application 642c. Device 614 provides audio output 646d corresponding to movies category 648 (e.g., "movies" and/or "open movies category"). In some embodiments, in response to detecting further inputs (e.g., hand gestures and/or touch inputs) at device 600, device 600 can control visual indicator 622 on device 614. In some embodiments, interface 630 includes done affordance 644 that terminates the session of device 600 controlling device 614 using interface 632. In some embodiments, device 600 is in communication with device 614 after receiving an input directed at done affordance 644 and/or after device 600 is no longer controlling device 614.

Figure 6Q:
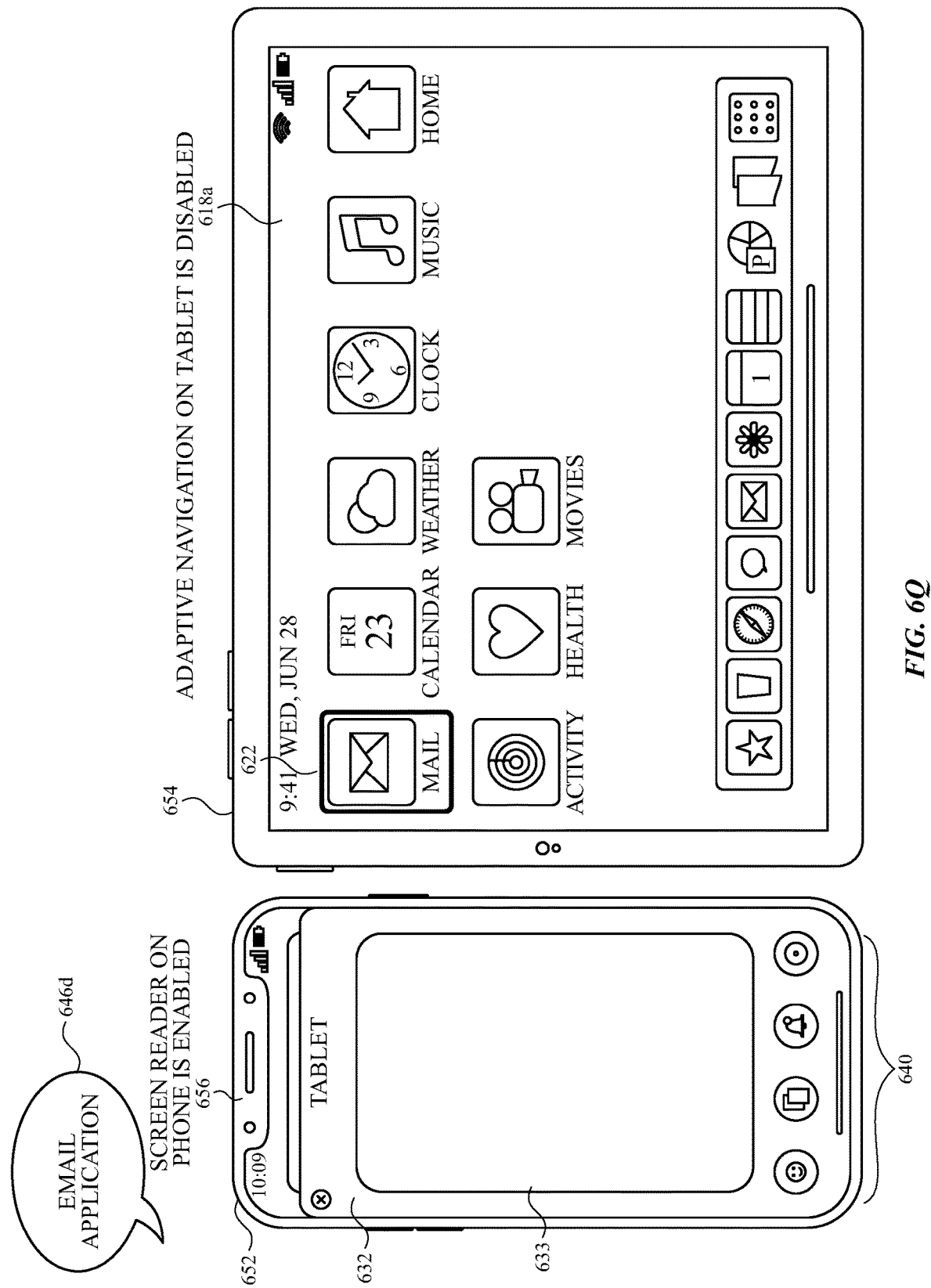

At FIG. 6Q, embodiments described with respect to device 600 and device 614 apply to device 652 (e.g., a smartphone) and device 654 (e.g., a tablet computer). In some embodiments, device 652 can be utilized to control device 654 using the similar techniques (e.g., user interfaces, inputs, and/or gestures (e.g., detected using one or more cameras 656, such as a camera that has a user in a field-of-view) described with respect to device 600 and device 614. In some embodiments, device 652 displays interface 630 or interface 632 based on the accessibility settings that are enabled at one or more devices. As illustrated, screen reader is enabled at device 652 while adaptive navigation is disabled at device 654. As such, device 652 displays interface 632 to control device 654 and provides audio output 646a (e.g., "e-mail application"). Additionally or alternatively, if screen reader is disable at device 652 and adaptive navigation is enabled at device 654, then device 652 displays interface 630 to control device 654.

At FIG. 6Q, in some embodiments, if adaptive navigation is enabled at device 652 (and/or device 600) while screen reader is enabled at device 654 (and/or device 614), device 652 (and/or device 600) displays interface 630 (and forgoes displaying interface 632) (e.g., interface 630 will be prioritized over interface 632). In some embodiments, if adaptive navigation is enabled at device 652 (and/or device 600) while screen reader is enabled at device 654 (and/or device 614), device 652 (and/or device 600) displays interface 632 (and forgoes displaying interface 630) (e.g., interface 632 will be prioritized over interface 630). In some embodiments, if adaptive navigation is enabled at device 652 while screen reader is enabled at device 652, device 652 (and/or device 600) displays interface 630 (and forgoes displaying interface 632) (e.g., interface 630 will be prioritized over interface 632).

At FIG. 6R, device 614 displays screen reader and adaptive navigation as being disabled. Screen reader or adaptive navigation can be enabled by user input at device 614 (e.g., using a toggle and/or button) under a system setting (e.g., an accessibility setting). At FIG. 6R, in some embodiments, when screen reader is disabled at device 600 and adaptive navigation is disabled at device 614, device 600 can still control device 614. In such embodiments, device 600 displays a user interface including one or more affordances for controlling system actions (one or more system affordances 640). Additionally or alternatively, hand gestures detected by device can initiate commands to launch a shortcut at device 614, such as shortcut 612i and/or shortcut 614h. In some implementations, hand gestures (e.g., a double-pinch gesture) can initiate commands such as: answer or end a phone call, dismiss a notification, take a photo, play or pause media, and start, pause, or resume a workout.

FIG. 7 is a flow diagram illustrating a method for controlling a second computer using a first computer system in accordance with some embodiments. Method 700 is performed at a first computer system (e.g., 100, 300, 500, 600, and/or 652) (e.g., a smartwatch, a smartphone, a tablet, a laptop computer, and/or a head mounted device (e.g., a head mounted augmented reality and/or extended reality device)) that is in communication with a display generation component (e.g., a display of device 600) (e.g., a display controller, a touch-sensitive display system, a monitor, and/or a head mounted display system) and one or more input devices (e.g., a touch-sensitive surface, a keyboard, a controller, a rotatable input device, microphone, and/or a mouse). In some embodiments, the computer system is in communication with one or more sensors (e.g., one or more cameras, one or more biometric sensors (e.g., a heart rate sensor), a gyroscope, an accelerometer)). Some operations in method 700 are, optionally, combined, the orders of some operations are, optionally, changed, and some operations are, optionally, omitted.

As described below, method 700 provides an intuitive way for displaying a user interface with device controls. The method reduces the cognitive burden on a user for controlling devices, thereby creating a more efficient human-machine interface. For battery-operated computing devices, enabling a user to control devices faster and more efficiently conserves power and increases the time between battery charges.

The first computer system (e.g., 600) detects (702), via the one or more input devices, an input (e.g., 650i and/or 609c) corresponding to a request to control a second computer system (e.g., 614, 654) (e.g., a smartwatch, a smartphone, a tablet, a laptop computer, and/or a head mounted device (e.g., a head mounted augmented reality and/or extended reality device)). In response (704) to detecting the input corresponding to the request to control (e.g., execute commands at and/or navigate user interfaces of) the second computer system and while in communication with the second computer system (e.g., using a wired or wireless connection with the second computer system), and in accordance with a determination that a first set of control criteria is met, the first computer system displays (706) (e.g., via the display generation component) one or more first user interface objects (e.g., one or more of the user interface objects of interface 630, including 638a-c, and/or 640) (e.g., a user interface object that is activated a first type of input and/or a user interface object that has a first size) that controls a graphical element (e.g., 622) displayed by the second computer system (e.g., cursor, pointer, and/or highlighter) (e.g., that indicates a respective function (e.g., opening an application, executing a function within an application, and/or closing the application) will be executed on the second computer system, such as when a confirmation input is received) to navigate one or more user interfaces (e.g., 618a and/or 618b) of the second computer system, wherein a first control criteria of the first set of control criteria is met when a first mode of controlling a computer system (e.g., by navigating a graphical user interface and/or executing a function on the computer system) is enabled (e.g., an input setting is active, a setting that provides one or more additional (and/or alternative) options to control how input is detected, and/or a mode in which a particular input would not cause a function to be performed unless a particular input setting is active) on the second computer system (e.g., adaptive navigation is enabled on device 614 as described in FIGS. 6J-6L).

In response (704) to detecting the input corresponding to the request to control (e.g., execute commands at and/or navigate user interfaces of) the second computer system and while in communication with the second computer system (e.g., using a wired or wireless connection with the second computer system), and in accordance with a determination that the first set of control criteria is not met, the first computer system forgoes (708) display of the one or more user interface objects that controls a graphical element to navigate the one or more user interfaces of the second computer system (e.g., 638*a-c* and/or 640). In some embodiments, the first computer system wirelessly connects to the second computer system in response to the input corresponding to the request to control the second computer system. In some embodiments, the first mode of controlling a computer system is enabled via a system setting (e.g., the first mode is enabled or disabled through a system settings menu). In some embodiments, the first computer system uses one or more sensors (e.g., a biometric sensor (e.g., a heartrate sensor and/or an optical heartrate sensor), an accelerometer, and/or gyroscope) to detect and differentiate among various gestures performed by a hand (and/or other body part) of the user while the first computer system is worn (e.g., on the user's wrist and/or other body part) by the user. In some embodiments, the various gestures can be used to initiate (e.g., transmit and/or send) one or more commands to be executed by the second computer system. In some embodiments, the various gestures do not include input at a button or touch-sensitive surface of the computer system. In some embodiments, the one or more user interface objects that controls the graphical element displayed at the second computer system are not displayed at the second computer system (and/or are displayed only at the first computer system). In some embodiments, the first computer system (and/or the second computer system) displays an indication (e.g., a notification and/or a banner) (e.g., a non-persistent indication and/or a persistent indication) that the first computer system (and/or the second computer system) is controlling the second computer system (and/or the first computer system). In some embodiments, the first mode of the second computer system is enabled independently of communication with the first computer system. In some embodiments, the first mode of the second computer system is not enabled in response to the second computer system communicating with the first computer system. In some embodiments, the first mode of the second computer system is enabled prior the second computer system communicating to communicating with the first computer system. In some embodiments, the first mode of the second computer system is enabled after the second computer system communicates with the first computer system. In some embodiments, the first mode of the second computer system is manually enabled (e.g., by the user). In some embodiments, the first mode of the second computer system is enabled locally at the second computer system (and/or cannot be enabled via the first computer system). Automatically displaying particular controls when an accessibility setting is enabled on the second computer system allows a user to better control the second device when the user has a physical impairment and provides a user visual feedback as to the state of the second computer system, which enhances the user-machine interface for users having physical impairments and provides improved visual feedback as to the state of the second computer system.

In some embodiments, in response to detecting the input corresponding to the request to control the second computer system and while in communication with the second computer system: in accordance with the determination that the first set of control criteria is not met, the first computer system displays, via the display generation component, a control user interface object (e.g., 640) (e.g., a selectable user interface object and/or toggle) (e.g., one or more) that controls a function (e.g., navigate to a home screen, view one or more open applications (e.g., application switcher and/or an application navigation view), and/or open a notification center) of the second computer system (e.g., a system action as depicted in FIG. 6D and as described in reference to FIG. 6J). In some embodiments, the user interface object that controls the function of the second computer system is displayed when the first set of control criteria is met. Automatically displaying controls when an accessibility setting is not enabled on the second computer system allows a user to better control the second computer system so as to efficiently perform different operations at the second computer system, which enhances the user-machine interface and provides improved visual feedback as to the state of the second computer system.

In some embodiments, in response to detecting the input corresponding to the request to control the second computer system and while in communication with the second computer system: in accordance with a determination that a second set of control criteria is met, the first computer system displays, via the display generation component, one or more second user interface objects (e.g., one or more of the interface objects of interface 632, including 633 and/or 640) (e.g., a user interface object that is activated using a second type of input and/or a user interface objects that has a second size) that controls a graphical element (e.g., 622) displayed by the second computer system, wherein the one or more second user interface objects is different from the one or more first user interface objects (e.g., the second user interface object is activated using at least one type of input that does not activate the first user interface object (or vice versa) and/or the second user interface object has a different (greater or smaller) size than the first user interface object), and wherein the second set of control criteria includes a first control criterion that is met when a second mode, different from the first mode, of controlling a computer system (e.g., by navigating a graphical user interface and/or executing a function on the computer system) is enabled (e.g., an input setting is active, a setting that provides one or more additional (and/or alternative) options to control how input is detected, and/or a mode in which a particular input would not cause a function to be performed unless a particular input setting is active) on the first computer system (e.g., screen reader on device 600 or device 652 is enabled as described in FIGS. 6M-6Q). In some embodiments, a screen reader is enabled when a computer system is in the second mode. In some embodiments, the screen reader is not enabled when a computer system is in the first mode. In some embodiments, the computer system displays a second option (e.g., an affordance and/or toggle) (e.g., the same as the first option and/or different from the first option) that controls a function (e.g., navigate to a home screen, view one or more open applications (e.g., "application switcher" and/or an application navigation view), and/or open a notification center) of the second computer system. In some embodiments, the second option is displayed when the second set of control criteria is met. Automatically displaying particular controls when a particular accessibility setting (e.g., a screen reader or text reader) is enabled on the first computer system allows a user to better control the second computer system when the user has a physical impairment and provides a user visual feedback as to the state of the second computer system, which enhances the user-machine interface for users having physical impairments and provides improved visual feedback as to the state of the first computer system.

In some embodiments, the first set of control criteria includes a second control criterion that is met when the second set of control criteria is not met. In other words, first set of control criteria is not met and, therefore, the one or more first user interface objects are not displayed when the second set of control criteria are met. Not displaying particular controls (e.g., non-screen reader and/or non-text reader controls) at the first computer system when a particular setting (e.g., a screen reader or text reader) is enabled on the first computer system decreases the number of controls displayed at the first computer system, which enhances the user-machine interface for users having physical impairments and declutters the user interface at the first computer system.

In some embodiments, the second set of control criteria does not include a control criterion that is based on whether the second mode of controlling a computer system is enabled (or, optionally, disabled) on the second computer system. In some embodiments, the second set of control criteria is met or not met independent of whether the second mode of controlling a computer system is enabled on the second computer system. Displaying particular controls when an accessibility setting (e.g., a screen reader or text reader) is enabled on the first computer system allows a user to better control the second computer system as it prioritizes a local accessibility setting and how the user is using the first computer system based on his or her a physical impairment, which enhances the user-machine interface for users having physical impairments and provides improved visual feedback as to the state of the first computer system.

In some embodiments, in response to detecting the input corresponding to the request to control the second computer system and while in communication with the second computer system: in accordance with the determination that the second set of control criteria is met (and/or, optionally, in accordance with a determination that the second mode is disabled on the second computer system), the first computer system initiates a command (e.g., initiating a transmission and/or instructing) to enable the second mode on the second computer system (e.g., device 600 initiates a command to enable screen reader on device 614 in FIG. 6M). Enabling a particular accessibility setting (e.g., a screen reader or text reader) at a remote device when the particular accessibility setting is enabled on a first computer system allows a user to control the second computer system according to how the user is controlling the first computer system, which enhances the user-machine interface for users having physical impairments.

In some embodiments, while the second mode is enabled on the second computer system, the one or more second user interface objects are not displayed at the second computer system (e.g., the user interface objects of interface 632 are not displayed on device 614 and/or device 654). Not displaying, at a remote device, control options that are displayed at a first computer system allows a user to control the second computer system and limits the amount of control options displayed at the second computer system, which provides additional control options without cluttering the user interface.

In some embodiments, the second set of control criteria does not include a criterion that is based on whether the first mode is enabled on the second computer system (e.g., interface 632 is displayed at device 600 and/or device 652 regardless of whether adaptive navigation is enabled at device 614 and/or device 654) (e.g., the one or more second user interface objects are displayed independent of the first set of criteria being met). Displaying controls independent of a particular accessibility setting that is enabled on the second computer system allows a user to better control the second computer system as the first computer system displays the one or more second user interface objects regardless of whether the first mode is enabled on the second computer system which enhances the user-machine interface for users having physical impairments and provides improved visual feedback as to the state of the first computer system.

In some embodiments, wherein the first set of control criteria includes a third criterion that the second mode is enabled on the first computer system and the first mode is enabled on the second computer system (e.g., 638a-c and/or 640 is displayed when screen reader is enabled on device 600 and adaptive navigation is enabled on device 614). In some embodiments, the second set of control criteria includes a criterion that the second mode is enable at first computer system and the first mode is enabled on the second computer system. Displaying controls for a particular accessibility setting when two different modes are enabled on the respective devise allows a user to better control the second computer system as it prioritizes the display of particular interface objects at the first computer system based on how the user is using the second computer system, which enhances the user-machine interface for users having physical impairments and provides improved visual feedback as to the state of the second computer system.

In some embodiments, displaying the one or more second user interface objects includes displaying a touch input area (e.g., 633) (e.g., a touchpad area and/or trackpad area). In some embodiments, while displaying the touch input area, the first computer system detects, via the one or more input devices, a gesture (e.g., 650m) at the touch input area. In response to detecting the gesture at the touch input area, the first computer system transmits, to the second computer system, an indication of the gesture (e.g., swipe 650 causes device 614 to move visual indicator 622 as depicted in FIGS. 6M-6N) (e.g., transmitting a location, direction, duration, and/or path of the gesture to the second computer system). In some embodiments, the touch input area is used for controlling the second computer system using motion-based gestures (e.g., a swipe and/or a rotation). In some embodiments the touch input area (e.g., for detecting motion-based gestures) allows for detecting multi-finger inputs (e.g., two finger tap and/or three finger swipe). Providing a touch input area at a first computer system, which receives input that is typically received at the remote device, allows a user to better control the second computer system through motion-based gestures received at the first computer system, which enhances the user-machine interface for users having physical impairments.

In some embodiments, in response to detecting the input corresponding to the request to control the second computer system and while in communication with the second computer system, in accordance with a determination that the first set of control criteria is met, the first computer system forgoes display of the touch input area (e.g., interface 630 does not include touchpad area 633). In some embodiments, the one or more first user interface objects includes an affordance for controlling the graphical element displayed by the second computer system that is not included in the one or more second user interface objects. Not providing the touchpad area at the first computer system when a particular accessibility setting (e.g., an accessibility setting other than a screen reader setting) is enabled on the second computer system limits the number of unnecessary graphical objects based on the user's physical impairments, which enhances the user-machine interface for users having physical impairments by including relevant controls.

In some embodiments, the first computer system includes a rotatable input device (e.g., 601) (e.g., a rotatable input mechanism and/or crown). In some embodiments, the first computer system detects, via the rotatable input device, a rotational input (e.g., 650*n*). In response to detecting the rotational input, the first computer system transmits, to the second computer system, a scroll instruction to scroll content displayed at the second computer system (e.g., content displayed on device 614 is scrolled and/or as indicator 622 moves through content of a user interface displayed on device 614, device 614 scrolls the content displayed). In some embodiments, the scroll instructions include a direction of scroll (first direction vs second direction), a rate of scroll (a first rate vs. a second rate), and/or a duration of scroll (first duration vs. second duration). In some embodiments, in response to detecting the rotational input, the computer system transmits instructions to the second computer system to move the graphical element displayed by the second computer system. Scrolling through items on a second computer system in response to a crown or wheel rotation at a first computer system allows a user to better control the second computer system as it provides an efficient way to quickly move the graphical indicator through a remote user interface, which enhances the user-machine interface for users having physical impairments and provides additional control options without cluttering the user interface.

In some embodiments, while displaying the one or more first user interface objects, the first computer system detects, via one or more sensors (e.g., a biometric sensor (e.g., a heartrate sensor and/or an optical heartrate sensor), an accelerometer, and/or gyroscope), a non-touch hand gesture (e.g., 609*a* and/or 609*c* as described in FIGS. 6J-6L) (e.g., a gesture made in the air, such as an air-pinch or hand clench). In response to detecting the non-touch hand gesture, the first computer system initiates a command (e.g., initiating a transmission and/or instructing the second computer system) to perform an operation (e.g., move visual indicator 622 as described in FIGS. 6J-6K and/or select calendar application as described in FIGS. 6K-6L) (move the graphical indicator, make a selection, and/or open a notification center) at the second computer system. In some embodiments, the hand gesture does not include input at a button or touch-sensitive surface of the computer system. Controlling a second computer system in response to detecting a gesture (e.g., an air-pinch or clench) made by the user at a first computer system provides the user with additional control options without requiring the user to press a button and/or touch-sensitive surface, which enhances the user-machine interface for users having physical impairments and provides additional control options without cluttering the user interface.

In some embodiments, initiating the command to perform the operation includes: in accordance with a determination that that the non-touch hand gesture is a first type of non-touch hand gesture (e.g., 609*a*), the first computer system transmits, to the second computer system, a first command (e.g., move visual indicator 622 as described in FIGS. 6J-6K); and in accordance with a determination that that the non-touch hand gesture is a second type of non-touch hand gesture (e.g., 609*c*) different from the first type of non-touch hand gesture, the first computer system transmits, to the second computer system, a second command (e.g., select calendar application as described in FIGS. 6K-6L). Performing different operations at a second computer system in response to detecting, at a first computer system, a gesture (e.g., an air-pinch or clench) made by the user provides the user with additional control options without requiring the user to press a button and/or touch-sensitive surface to perform the same operation at the second computer system, which enhances the user-machine interface for users having physical impairments and provides additional control options without cluttering the user interface.

In some embodiments, the first computer system displays, via the display generation component, a plurality of options to control a plurality of computer systems (e.g., 626), including a first option to control the second computer system (e.g., the option to phone in FIG. 6I) and a second option to control a third computer system (e.g., the option to control tablet and/or the option to control computer in FIG. 6I) that is different from the first computer system and the second computer system. In some embodiments, detecting the input corresponding to a request to control the second computer system includes detecting, via the one or more input devices, selection of the first option to control the second computer system (e.g., 650*i* and/or 609*c*). Displaying multiple computer system to control provides the user an ability to select which computer system the user would like to control using a respective accessibility setting, which enhances the user-machine interface for users having physical impairments and provides additional control options.

In some embodiments, displaying the plurality of options to control the plurality of computer systems includes: in accordance with a determination that a respective computer system satisfies a set of one or more display conditions, the first computer system displays, via the display generation component, an option to control the respective computer system. In some embodiments, the set of one or more display conditions includes a first display condition that is satisfied when the respective computer system is logged into the same user account as the first computer system (e.g., device 600 is logged into the same user account as device 614, device 600 is logged into the same user account as a tablet computer associated with the tablet option displayed in device selector menu 626, and/or device 600 is logged into the same user account as a computer associated with the computer option displayed in device selector menu 626). In some embodiments, displaying the plurality of options to control the plurality of computer systems includes: in accordance with a determination that the respective computer system does not satisfy the set of one or more display conditions, the first computer system forgoes display of the option to control the respective computer system (e.g., devices that are not signed into the same user account are not displayed in device selector menu 626). Displaying multiple computer systems based on whether the device is logged into the same user account provides the user an ability to select which computer system the user would like to control, which enhances the user-machine interface for users having physical impairments and provides additional control options.

In some embodiments, the set of one or more display conditions includes a second display condition that is satisfied when the respective computer system is within a threshold distance of the first computer system (e.g., device 600 is located within 200 feet of device 614). In some embodiments, the first computer system receives an indication (e.g., from a server, from a global positioning satellite, and/or from the respective computer system (e.g., using a local area network and/or Bluetooth) that the respective computer system is within the threshold distance of the first computer system. Displaying multiple devices based on whether the device is within a threshold distance of the computer system provides the user an ability to select nearby devices that the user would like to control and limiting the number of inputs to identify nearby devices, which enhances the user-machine interface for users having physical impairments and reduces the number of inputs needed to perform an operation.

In some embodiments, the first computer system receives, via the one or more input devices, user input to correspond a user-specified non-touch hand gesture (e.g., 609*b*, 609*d*, and/or 609*c*) (e.g., an air gesture and/or gesture detected independent of a touch-sensitive surface of the first computer system) to a first function (e.g., a rotate) of the rotatable input device of the first computer system (e.g., device 600 receives an input to correspond to one of the gestures associated with affordances 608*a-d* with a rotation of rotatable input device 601 that is associated with affordance 612*f* and/or affordance 612*g*), where the user-specified non-touch hand gesture does not use the rotatable input device of the first computer system. In some embodiments, while the user-specified non-touch hand gesture corresponds to the first function of the rotatable input device of the first computer system: the first computer system receives, via the one or more input devices, the user-specified non-touch hand gesture. In response to receiving the user-specified non-touch hand gesture, the first computer performs a first operation (e.g., a scroll operation) that corresponds to the first function of the rotatable input device of the first computer system (e.g., the first computer system would perform the same operation had the computer system detected input using the first function (e.g., rotation) of the rotatable input device). In some embodiments, subsequent to performing the first operation that corresponds to the first function of the rotatable input device, the first computer system receives, via the one or more input devices, user input to correspond the user-specified non-touch hand gesture (e.g., an air gesture and/or gesture detected independent of a touch-sensitive surface of the first computer system) to a second function (e.g., a rotate or press input) (e.g., device 600 receives an input to correspond one of the gestures associated with affordances 608*a-d* with a press (e.g., depress) of rotatable input device 601 that is associated with affordance 612*g*), different from the first function, of the rotatable input device of the first computer system, where the user-specified non-touch hand gesture does not use the rotatable input device of the first computer system. In some embodiments, while the user-specified non-touch hand gesture corresponds to the second function of the rotatable input device of the first computer system: the first computer system receives, via the one or more input devices, the user-specified non-touch hand gesture. In response to receiving the user-specified non-touch hand gesture, the computer system performs a second operation that corresponds to the second function (e.g., press input of) of the rotatable input device of the first computer system (e.g., the computer system would perform the same operation had the computer system detected input using the second function (e.g., press input) of the rotatable input device). In some embodiments, the computer system receives user input to confirm non-touch gestures that don't use the rotatable input device to mimic (or substitute for) functions of the rotatable input device. Customizing a hand gesture (e.g., an air-pinch or clench) made by the user to perform an operation typically detected by a crown or wheel provides a user with alternative ways to provide an input so as to control a device (local or remote), which enhances the user-machine interface for users having physical impairments and provides additional control options.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to customize user profiles and/or improve what accessibility settings are provided to a user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of accessibility settings, the present technology can be configured to allow users to select to "opt in" or "opt out" of participation in the collection of personal information data during registration for services or anytime thereafter. In another example, users can select not to provide accessibility settings data for targeted content delivery services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, information about accessibility settings can be selected and delivered to users by inferring preferences based on non-personal information data or a bare minimum amount of personal information, such as the content being requested by the device associated with a user, other non-personal information available to the content delivery services, or publicly available information.

What is claimed is:

1. A first computer system configured to communicate with a display generation component and one or more input devices, comprising:
   one or more processors; and
   memory storing one or more programs configured to be executed by the one or more processors, the one or more programs including instructions for:
   detecting, via the one or more input devices, an input corresponding to a request to control a second computer system; and
   in response to detecting the input corresponding to the request to control the second computer system and when in communication with the second computer system:
   in accordance with a determination that a first set of control criteria is met, displaying, via the display generation component, one or more first user interface objects that controls a first graphical element displayed by the second computer system to navigate one or more user interfaces of the second computer system, wherein a first control criteria of the first set of control criteria is met when a system setting for a first mode of controlling a computer system is enabled on the second computer system, and wherein the first computer system initiates a command to move the first graphical element from a first selectable graphical object to a second selectable graphical object displayed at the second computer system in response to the first computer system detecting an input directed to at least one of the one or more first user interface objects; and
   in accordance with a determination that a second set of control criteria, different from the first set of control criteria, is met, displaying, via the display generation component, one or more second user interface objects that controls a second graphical element displayed by the second computer system to navigate the one or more user interfaces of the second computer system, wherein the determination that the second set of control criteria is met is based on one or more system settings for controlling the first computer system and/or one or more system settings for controlling the second computer system, wherein the one or more second user interface objects is different from the one or more first user interface objects, and wherein the first computer system initiates a command to move the second graphical element from a third selectable graphical object to a fourth selectable graphical object in response to the first computer system detecting an input directed to at least one of the one or more second user interface objects.

2. The first computer system of claim 1, the one or more programs including instructions for:

in response to detecting the input corresponding to the request to control the second computer system and when in communication with the second computer system:
in accordance with the determination that the first set of control criteria is not met, displaying, via the display generation component, a control user interface object that controls a function of the second computer system.

3. The first computer system of claim 1, wherein the second set of control criteria includes a first control criterion that is met when a second mode, different from the first mode, of controlling a computer system is enabled on the first computer system.

4. The first computer system of claim 3, wherein the first set of control criteria includes a second control criterion that is met when the second set of control criteria is not met.

5. The first computer system of claim 3, wherein the second set of control criteria does not include a control criterion that is based on whether the second mode of controlling a computer system is enabled on the second computer system.

6. The first computer system of claim 3, the one or more programs including instructions for:
in response to detecting the input corresponding to the request to control the second computer system and when in communication with the second computer system:
in accordance with the determination that the second set of control criteria is met, initiating a command to enable the second mode on the second computer system.

7. The first computer system of claim 6, wherein, when the second mode is enabled on the second computer system, the one or more second user interface objects are not displayed at the second computer system.

8. The first computer system of claim 3, wherein the second set of control criteria does not include a criterion that is based on whether the first mode is enabled on the second computer system.

9. The first computer system of claim 3, wherein the first set of control criteria includes a third criterion that the second mode is enabled on the first computer system and the first mode is enabled on the second computer system.

10. The first computer system of claim 3, wherein displaying the one or more second user interface objects includes displaying a touch input area, the one or more programs including instructions for:
when displaying the touch input area, detecting, via the one or more input devices, a gesture at the touch input area; and
in response to detecting the gesture at the touch input area, transmitting, to the second computer system, an indication of the gesture.

11. The first computer system of claim 10, the one or more programs including instructions for:
in response to detecting the input corresponding to the request to control the second computer system and when in communication with the second computer system, in accordance with a determination that the first set of control criteria is met, forgoing display of the touch input area.

12. The first computer system of claim 3, wherein the first computer system includes a rotatable input device, the one or more programs including instructions for:
detecting, via the rotatable input device, a rotational input; and
in response to detecting the rotational input, transmitting, to the second computer system, a scroll instruction to scroll content displayed at the second computer system.

13. The first computer system of claim 1, the one or more programs including instructions for:
when displaying the one or more first user interface objects, detecting, via one or more sensors, a non-touch hand gesture; and
in response to detecting the non-touch hand gesture, initiating a command to perform an operation at the second computer system.

14. The first computer system of claim 13, wherein initiating the command to perform the operation includes:
in accordance with a determination that the non-touch hand gesture is a first type of non-touch hand gesture, transmitting, to the second computer system, a first command; and
in accordance with a determination that that the non-touch hand gesture is a second type of non-touch hand gesture different from the first type of non-touch hand gesture, transmitting, to the second computer system, a second command.

15. The first computer system of claim 1, the one or more programs including instructions for:
displaying, via the display generation component, a plurality of options to control a plurality of computer systems, including a first option to control the second computer system and a second option to control a third computer system that is different from the first computer system and the second computer system; and
wherein detecting the input corresponding to a request to control the second computer system includes detecting, via the one or more input devices, selection of the first option to control the second computer system.

16. The first computer system of claim 15, wherein displaying the plurality of options to control the plurality of computer systems includes:
in accordance with a determination that a respective computer system satisfies a set of one or more display conditions, displaying, via the display generation component, an option to control the respective computer system, wherein the set of one or more display conditions includes a first display condition that is satisfied when the respective computer system is logged into a same user account as the first computer system; and
in accordance with a determination that the respective computer system does not satisfy the set of one or more display conditions, forgoing display of the option to control the respective computer system.

17. The first computer system of claim 16, wherein the set of one or more display conditions includes a second display condition that is satisfied when the respective computer system is within a threshold distance of the first computer system.

18. The first computer system of claim 1, the one or more programs including instructions for:
receiving, via the one or more input devices, user input to correspond a user-specified non-touch hand gesture to a first function of a rotatable input device of the first computer system, wherein the user-specified non-touch hand gesture does not use the rotatable input device of the first computer system;
when the user-specified non-touch hand gesture corresponds to the first function of the rotatable input device of the first computer system:
receiving, via the one or more input devices, the user-specified non-touch hand gesture; and in response to receiving the user-specified non-touch hand gesture, performing a first operation that corresponds to the first function of the rotatable input device of the first computer system;
subsequent to performing the first operation that corresponds to the first function of the rotatable input device, receiving, via the one or more input devices, user input to correspond the user-specified non-touch hand gesture to a second function, different from the first function, of the rotatable input device of the first computer system, wherein the user-specified non-touch hand gesture does not use the rotatable input device of the first computer system; and
when the user-specified non-touch hand gesture corresponds to the second function of the rotatable input device of the first computer system:
receiving, via the one or more input devices, the user-specified non-touch hand gesture; and
in response to receiving the user-specified non-touch hand gesture, performing a second operation that corresponds to the second function of the rotatable input device of the first computer system.

19. The first computer system of claim 1, the one or more programs including instructions for:
receiving, via the one or more input devices, user input to correspond a user-specified non-touch hand gesture to a first set of commands for one or more applications and/or one or more settings, wherein the user-specified non-touch hand gesture does not include a touch input;
when the user-specified non-touch hand gesture corresponds to the first set of commands for the one or more applications and/or the one or more settings:
receiving, via the one or more input devices, the user-specified non-touch hand gesture; and
in response to receiving the user-specified non-touch hand gesture, performing a first set of operations that corresponds to the first set of commands for the one or more applications and/or the one or more settings;
subsequent to performing the first set of operations that corresponds to the first set of commands for the one or more applications and/or the one or more settings, receiving, via the one or more input devices, user input to correspond the user-specified non-touch hand gesture to a second set of commands, different from the first set of commands, for one or more applications and/or one or more settings, wherein the user-specified non-touch hand gesture does not include a touch input; and
when the user-specified non-touch hand gesture corresponds to the second set of commands for the one or more applications and/or the one or more settings:
receiving, via the one or more input devices, the user-specified non-touch hand gesture; and
in response to receiving the user-specified non-touch hand gesture, performing a second set of operations that corresponds to the second set of commands for the one or more applications and/or the one or more settings.

20. The first computer system of claim 1, wherein a first control criteria of the second set of control criteria is met when the system setting for the first mode of controlling the computer system is not enabled on the second computer system.

21. A non-transitory computer-readable storage medium storing one or more programs configured to be executed by one or more processors of a first computer system that is in communication with a display generation component and one or more input devices, the one or more programs including instructions for:
detecting, via the one or more input devices, an input corresponding to a request to control a second computer system; and
in response to detecting the input corresponding to the request to control the second computer system and when in communication with the second computer system:
in accordance with a determination that a first set of control criteria is met, displaying, via the display generation component, one or more first user interface objects that controls a first graphical element displayed by the second computer system to navigate one or more user interfaces of the second computer system, wherein a first control criteria of the first set of control criteria is met when a first mode of controlling a computer system is enabled on the second computer system, and wherein the first computer system initiates a command to move the first graphical element from a first selectable graphical object to a second selectable graphical object displayed at the second computer system in response to the first computer system detecting an input directed to at least one of the one or more first user interface objects; and
in accordance with a determination that a second set of control criteria, different from the first set of control criteria, is met, displaying, via the display generation component, one or more second user interface objects that controls a second graphical element displayed by the second computer system to navigate the one or more user interfaces of the second computer system, wherein the determination that the second set of control criteria is met is based on one or more system settings for controlling the first computer system and/or one or more system settings for controlling the second computer system, wherein the one or more second user interface objects is different from the one or more first user interface objects, and wherein the first computer system initiates a command to move the second graphical element from a third selectable graphical object to a fourth selectable graphical object in response to the first computer system detecting an input directed to at least one of the one or more second user interface objects.

22. The non-transitory computer-readable storage medium of claim 21, the one or more programs including instructions for:
in response to detecting the input corresponding to the request to control the second computer system and when in communication with the second computer system:
in accordance with the determination that the first set of control criteria is not met, displaying, via the display generation component, a control user interface object that controls a function of the second computer system.

23. The non-transitory computer-readable storage medium of claim 21, wherein the second set of control criteria includes a first control criterion that is met when a second mode, different from the first mode, of controlling a computer system is enabled on the first computer system.

24. The non-transitory computer-readable storage medium of claim 23, wherein the first set of control criteria includes a second control criterion that is met when the second set of control criteria is not met.

25. The non-transitory computer-readable storage medium of claim 23, wherein the second set of control criteria does not include a control criterion that is based on whether the second mode of controlling a computer system is enabled on the second computer system.

26. The non-transitory computer-readable storage medium of claim 23, the one or more programs including instructions for:
   in response to detecting the input corresponding to the request to control the second computer system and when in communication with the second computer system:
      in accordance with the determination that the second set of control criteria is met, initiating a command to enable the second mode on the second computer system.

27. The non-transitory computer-readable storage medium of claim 26, wherein, when the second mode is enabled on the second computer system, the one or more second user interface objects are not displayed at the second computer system.

28. The non-transitory computer-readable storage medium of claim 23, wherein the second set of control criteria does not include a criterion that is based on whether the first mode is enabled on the second computer system.

29. The non-transitory computer-readable storage medium of claim 23, wherein the first set of control criteria includes a third criterion that the second mode is enabled on the first computer system and the first mode is enabled on the second computer system.

30. The non-transitory computer-readable storage medium of claim 23, wherein displaying the one or more second user interface objects includes displaying a touch input area, the one or more programs including instructions for:
   when displaying the touch input area, detecting, via the one or more input devices, a gesture at the touch input area; and
   in response to detecting the gesture at the touch input area, transmitting, to the second computer system, an indication of the gesture.

31. The non-transitory computer-readable storage medium of claim 30, the one or more programs including instructions for:
   in response to detecting the input corresponding to the request to control the second computer system and when in communication with the second computer system, in accordance with a determination that the first set of control criteria is met, forgoing display of the touch input area.

32. The non-transitory computer-readable storage medium of claim 23, wherein the first computer system includes a rotatable input device, the one or more programs including instructions for:
   detecting, via the rotatable input device, a rotational input; and
   in response to detecting the rotational input, transmitting, to the second computer system, a scroll instruction to scroll content displayed at the second computer system.

33. The non-transitory computer-readable storage medium of claim 21, the one or more programs including instructions for:
   when displaying the one or more first user interface objects, detecting, via one or more sensors, a non-touch hand gesture; and
   in response to detecting the non-touch hand gesture, initiating a command to perform an operation at the second computer system.

34. The non-transitory computer-readable storage medium of claim 33, wherein initiating the command to perform the operation includes:
   in accordance with a determination that the non-touch hand gesture is a first type of non-touch hand gesture, transmitting, to the second computer system, a first command; and
   in accordance with a determination that that the non-touch hand gesture is a second type of non-touch hand gesture different from the first type of non-touch hand gesture, transmitting, to the second computer system, a second command.

35. The non-transitory computer-readable storage medium of claim 21, the one or more programs including instructions for:
   displaying, via the display generation component, a plurality of options to control a plurality of computer systems, including a first option to control the second computer system and a second option to control a third computer system that is different from the first computer system and the second computer system; and
   wherein detecting the input corresponding to a request to control the second computer system includes detecting, via the one or more input devices, selection of the first option to control the second computer system.

36. The non-transitory computer-readable storage medium of claim 35, wherein displaying the plurality of options to control the plurality of computer systems includes:
   in accordance with a determination that a respective computer system satisfies a set of one or more display conditions, displaying, via the display generation component, an option to control the respective computer system, wherein the set of one or more display conditions includes a first display condition that is satisfied when the respective computer system is logged into a same user account as the first computer system; and
   in accordance with a determination that the respective computer system does not satisfy the set of one or more display conditions, forgoing display of the option to control the respective computer system.

37. The non-transitory computer-readable storage medium of claim 36, wherein the set of one or more display conditions includes a second display condition that is satisfied when the respective computer system is within a threshold distance of the first computer system.

38. The non-transitory computer-readable storage medium of claim 21, the one or more programs including instructions for:
   receiving, via the one or more input devices, user input to correspond a user-specified non-touch hand gesture to a first function of a rotatable input device of the first computer system, wherein the user-specified non-touch hand gesture does not use the rotatable input device of the first computer system;
   when the user-specified non-touch hand gesture corresponds to the first function of the rotatable input device of the first computer system:
      receiving, via the one or more input devices, the user-specified non-touch hand gesture; and
      in response to receiving the user-specified non-touch hand gesture, performing a first operation that corresponds to the first function of the rotatable input device of the first computer system;

subsequent to performing the first operation that corresponds to the first function of the rotatable input device, receiving, via the one or more input devices, user input to correspond the user-specified non-touch hand gesture to a second function, different from the first function, of the rotatable input device of the first computer system, wherein the user-specified non-touch hand gesture does not use the rotatable input device of the first computer system; and when the user-specified non-touch hand gesture corresponds to the second function of the rotatable input device of the first computer system:
receiving, via the one or more input devices, the user-specified non-touch hand gesture; and
in response to receiving the user-specified non-touch hand gesture, performing a second operation that corresponds to the second function of the rotatable input device of the first computer system.

39. The non-transitory computer-readable storage medium of claim 21, the one or more programs including instructions for:
receiving, via the one or more input devices, user input to correspond a user-specified non-touch hand gesture to a first set of commands for one or more applications and/or one or more settings, wherein the user-specified non-touch hand gesture does not include a touch input;
when the user-specified non-touch hand gesture corresponds to the first set of commands for the one or more applications and/or the one or more settings:
receiving, via the one or more input devices, the user-specified non-touch hand gesture; and
in response to receiving the user-specified non-touch hand gesture, performing a first set of operations that corresponds to the first set of commands for the one or more applications and/or the one or more settings;
subsequent to performing the first set of operations that corresponds to the first set of commands for the one or more applications and/or the one or more settings, receiving, via the one or more input devices, user input to correspond the user-specified non-touch hand gesture to a second set of commands, different from the first set of commands, for one or more applications and/or one or more settings, wherein the user-specified non-touch hand gesture does not include a touch input; and
when the user-specified non-touch hand gesture corresponds to the second set of commands for the one or more applications and/or the one or more settings:
receiving, via the one or more input devices, the user-specified non-touch hand gesture; and
in response to receiving the user-specified non-touch hand gesture, performing a second set of operations that corresponds to the second set of commands for the one or more applications and/or the one or more settings.

40. The non-transitory computer-readable storage medium of claim 21, wherein a first control criteria of the second set of control criteria is met when the system setting for the first mode of controlling the computer system is not enabled on the second computer system.

41. A method, comprising:
at a first computer system that is in communication with a display generation component and one or more input devices:
detecting, via the one or more input devices, an input corresponding to a request to control a second computer system; and in response to detecting the input corresponding to the request to control the second computer system and when in communication with the second computer system:
in accordance with a determination that a first set of control criteria is met, displaying, via the display generation component, one or more first user interface objects that controls a first graphical element displayed by the second computer system to navigate one or more user interfaces of the second computer system, wherein a first control criteria of the first set of control criteria is met when a first mode of controlling a computer system is enabled on the second computer system, and wherein the first computer system initiates a command to move the first graphical element from a first selectable graphical object to a second selectable graphical object displayed at the second computer system in response to the first computer system detecting an input directed to at least one of the one or more first user interface objects; and
in accordance with a determination that a second set of control criteria, different from the first set of control criteria, is met, displaying, via the display generation component, one or more second user interface objects that controls a second graphical element displayed by the second computer system to navigate the one or more user interfaces of the second computer system, wherein the determination that the second set of control criteria is met is based on one or more system settings for controlling the first computer system and/or one or more system settings for controlling the second computer system, wherein the one or more second user interface objects is different from the one or more first user interface objects, and wherein the first computer system initiates a command to move the second graphical element from a third selectable graphical object to a fourth selectable graphical object in response to the first computer system detecting an input directed to at least one of the one or more second user interface objects.

42. The method of claim 41, further comprising:
in response to detecting the input corresponding to the request to control the second computer system and when in communication with the second computer system:
in accordance with the determination that the first set of control criteria is not met, displaying, via the display generation component, a control user interface object that controls a function of the second computer system.

43. The method of claim 41, wherein the second set of control criteria includes a first control criterion that is met when a second mode, different from the first mode, of controlling a computer system is enabled on the first computer system.

44. The method of claim 43, wherein the first set of control criteria includes a second control criterion that is met when the second set of control criteria is not met.

45. The method of claim 43, wherein the second set of control criteria does not include a control criterion that is based on whether the second mode of controlling a computer system is enabled on the second computer system.

46. The method of claim 43, further comprising:
in response to detecting the input corresponding to the request to control the second computer system and when in communication with the second computer system:
in accordance with the determination that the second set of control criteria is met, initiating a command to enable the second mode on the second computer system.

47. The method of claim 46, wherein, when the second mode is enabled on the second computer system, the one or more second user interface objects are not displayed at the second computer system.

48. The method of claim 43, wherein the second set of control criteria does not include a criterion that is based on whether the first mode is enabled on the second computer system.

49. The method of claim 43, wherein the first set of control criteria includes a third criterion that the second mode is enabled on the first computer system and the first mode is enabled on the second computer system.

50. The method of claim 43, wherein displaying the one or more second user interface objects includes displaying a touch input area, further comprising:
when displaying the touch input area, detecting, via the one or more input devices, a gesture at the touch input area; and
in response to detecting the gesture at the touch input area, transmitting, to the second computer system, an indication of the gesture.

51. The method of claim 50, further comprising:
in response to detecting the input corresponding to the request to control the second computer system and when in communication with the second computer system, in accordance with a determination that the first set of control criteria is met, forgoing display of the touch input area.

52. The method of claim 43, wherein the first computer system includes a rotatable input device, further comprising:
detecting, via the rotatable input device, a rotational input; and
in response to detecting the rotational input, transmitting, to the second computer system, a scroll instruction to scroll content displayed at the second computer system.

53. The method of claim 41, further comprising:
when displaying the one or more first user interface objects, detecting, via one or more sensors, a non-touch hand gesture; and
in response to detecting the non-touch hand gesture, initiating a command to perform an operation at the second computer system.

54. The method of claim 53, wherein initiating the command to perform the operation includes:
in accordance with a determination that the non-touch hand gesture is a first type of non-touch hand gesture, transmitting, to the second computer system, a first command; and
in accordance with a determination that that the non-touch hand gesture is a second type of non-touch hand gesture different from the first type of non-touch hand gesture, transmitting, to the second computer system, a second command.

55. The method of claim 41, further comprising:
displaying, via the display generation component, a plurality of options to control a plurality of computer systems, including a first option to control the second computer system and a second option to control a third computer system that is different from the first computer system and the second computer system; and
wherein detecting the input corresponding to a request to control the second computer system includes detecting, via the one or more input devices, selection of the first option to control the second computer system.

56. The method of claim 55, wherein displaying the plurality of options to control the plurality of computer systems includes:
in accordance with a determination that a respective computer system satisfies a set of one or more display conditions, displaying, via the display generation component, an option to control the respective computer system, wherein the set of one or more display conditions includes a first display condition that is satisfied when the respective computer system is logged into a same user account as the first computer system; and
in accordance with a determination that the respective computer system does not satisfy the set of one or more display conditions, forgoing display of the option to control the respective computer system.

57. The method of claim 56, wherein the set of one or more display conditions includes a second display condition that is satisfied when the respective computer system is within a threshold distance of the first computer system.

58. The method of claim 41, further comprising:
receiving, via the one or more input devices, user input to correspond a user-specified non-touch hand gesture to a first function of a rotatable input device of the first computer system, wherein the user-specified non-touch hand gesture does not use the rotatable input device of the first computer system;
when the user-specified non-touch hand gesture corresponds to the first function of the rotatable input device of the first computer system:
receiving, via the one or more input devices, the user-specified non-touch hand gesture; and
in response to receiving the user-specified non-touch hand gesture, performing a first operation that corresponds to the first function of the rotatable input device of the first computer system;
subsequent to performing the first operation that corresponds to the first function of the rotatable input device, receiving, via the one or more input devices, user input to correspond the user-specified non-touch hand gesture to a second function, different from the first function, of the rotatable input device of the first computer system, wherein the user-specified non-touch hand gesture does not use the rotatable input device of the first computer system; and
when the user-specified non-touch hand gesture corresponds to the second function of the rotatable input device of the first computer system:
receiving, via the one or more input devices, the user-specified non-touch hand gesture; and
in response to receiving the user-specified non-touch hand gesture, performing a second operation that corresponds to the second function of the rotatable input device of the first computer system.

59. The method of claim 41, further comprising:
receiving, via the one or more input devices, user input to correspond a user-specified non-touch hand gesture to a first set of commands for one or more applications and/or one or more settings, wherein the user-specified non-touch hand gesture does not include a touch input;

when the user-specified non-touch hand gesture corresponds to the first set of commands for the one or more applications and/or the one or more settings:
receiving, via the one or more input devices, the user-specified non-touch hand gesture; and
in response to receiving the user-specified non-touch hand gesture, performing a first set of operations that corresponds to the first set of commands for the one or more applications and/or the one or more settings;
subsequent to performing the first set of operations that corresponds to the first set of commands for the one or more applications and/or the one or more settings, receiving, via the one or more input devices, user input to correspond the user-specified non-touch hand gesture to a second set of commands, different from the first set of commands, for one or more applications and/or one or more settings, wherein the user-specified non-touch hand gesture does not include a touch input; and
when the user-specified non-touch hand gesture corresponds to the second set of commands for the one or more applications and/or the one or more settings:
receiving, via the one or more input devices, the user-specified non-touch hand gesture; and
in response to receiving the user-specified non-touch hand gesture, performing a second set of operations that corresponds to the second set of commands for the one or more applications and/or the one or more settings.

60. The method of claim 41, wherein a first control criteria of the second set of control criteria is met when the system setting for the first mode of controlling the computer system is not enabled on the second computer system.

* * * * *

UNITED STATES PATENT AND TRADEMARK OFFICE
CERTIFICATE OF CORRECTION

Page 1 of 1

PATENT NO. : 12,386,428 B2
APPLICATION NO. : 18/197681
DATED : August 12, 2025
INVENTOR(S) : Yoonju Han et al.

It is certified that error appears in the above-identified patent and that said Letters Patent is hereby corrected as shown below:

In the Claims

Column 52, Line 28: In Claim 14, delete "that that" and insert -- that --.

Column 56, Line 11: In Claim 34, delete "that that" and insert -- that --.

Column 59, Line 58: In Claim 54, delete "that that" and insert -- that --.

Signed and Sealed this
Twenty-first Day of October, 2025

John A. Squires
*Director of the United States Patent and Trademark Office*